US011300976B2

(12) United States Patent
Tomita et al.

(10) Patent No.: US 11,300,976 B2
(45) Date of Patent: Apr. 12, 2022

(54) WORK VEHICLE AUTOMATIC TRAVELING SYSTEM

(71) Applicant: Kubota Corporation, Osaka (JP)

(72) Inventors: Sakura Tomita, Amagasaki (JP); Tomohiko Sano, Amagasaki (JP); Kazuo Sakaguchi, Amagasaki (JP); Tetsuya Nakajima, Sakai (JP); Makoto Oshitani, Sakai (JP); Kenichi Iwami, Sakai (JP); Osamu Yoshida, Amagasaki (JP)

(73) Assignee: Kubota Corporation, Osaka (JP)

( * ) Notice: Subject to any disclaimer, the term of this patent is extended or adjusted under 35 U.S.C. 154(b) by 153 days.

(21) Appl. No.: 16/466,056

(22) PCT Filed: Nov. 29, 2017

(86) PCT No.: PCT/JP2017/042873
§ 371 (c)(1),
(2) Date: Jun. 3, 2019

(87) PCT Pub. No.: WO2018/116770
PCT Pub. Date: Jun. 28, 2018

(65) Prior Publication Data
US 2020/0064863 A1    Feb. 27, 2020

(30) Foreign Application Priority Data

Dec. 19, 2016   (JP) .............................. JP2016-245801
Dec. 19, 2016   (JP) .............................. JP2016-245803
Nov. 16, 2017   (JP) .............................. JP2017-221342

(51) Int. Cl.
*G05D 1/02*    (2020.01)
*G08G 1/00*    (2006.01)

(52) U.S. Cl.
CPC ......... *G05D 1/0289* (2013.01); *G05D 1/0219* (2013.01); *G05D 1/0291* (2013.01); *G08G 1/20* (2013.01); *G05D 2201/0201* (2013.01)

(58) Field of Classification Search
CPC .. G05D 1/0289; G05D 1/0219; G05D 1/0291; G05D 2201/0201; G05D 1/0297; G08G 1/20; A01D 41/1278; A01B 9/008
See application file for complete search history.

(56) References Cited

U.S. PATENT DOCUMENTS

2009/0037041 A1 * 2/2009 Sennett ................ G05D 1/0219
701/23
2011/0112730 A1    5/2011 Rekow
(Continued)

FOREIGN PATENT DOCUMENTS

AU    2015347784 A1    6/2017
EP    3104245 A1    12/2016
(Continued)

*Primary Examiner* — Rodney A Butler
(74) *Attorney, Agent, or Firm* — The Webb Law Firm

(57) ABSTRACT

A work vehicle automatic traveling system includes a route element selecting unit that, on the basis of state information, sequentially selects a next travel route element on which a work vehicle is to travel next, from a travel route element set and a circling route element set. The route element selecting unit includes a cooperative route element selection rule, which is employed when a plurality of work vehicles carry out work travel cooperatively in an area CA to be worked, and an independent route element selection rule, which is employed when a single independent work vehicle among the work vehicles carries out work travel independently in the area CA to be worked. Also described is selecting the next travel route element based on the independent route element selection rule.

10 Claims, 24 Drawing Sheets

(56) References Cited

U.S. PATENT DOCUMENTS

| | | | |
|---|---|---|---|
| 2014/0336818 A1* | 11/2014 | Posselius | G05D 1/0297 700/248 |
| 2015/0094944 A1 | 4/2015 | Baumann | |
| 2016/0174453 A1 | 6/2016 | Matsuzaki et al. | |
| 2017/0168501 A1 | 6/2017 | Ogura et al. | |
| 2017/0177002 A1* | 6/2017 | Ogura | G05D 1/0278 |
| 2017/0336787 A1* | 11/2017 | Pichlmaier | G05D 1/0274 |

FOREIGN PATENT DOCUMENTS

| | | | |
|---|---|---|---|
| JP | 9120313 A | 5/1997 |
| JP | 2015112071 A | 6/2015 |
| JP | 201631649 A | 3/2016 |
| JP | 2016093125 A | 5/2016 |
| JP | 2016170580 A | 9/2016 |

\* cited by examiner

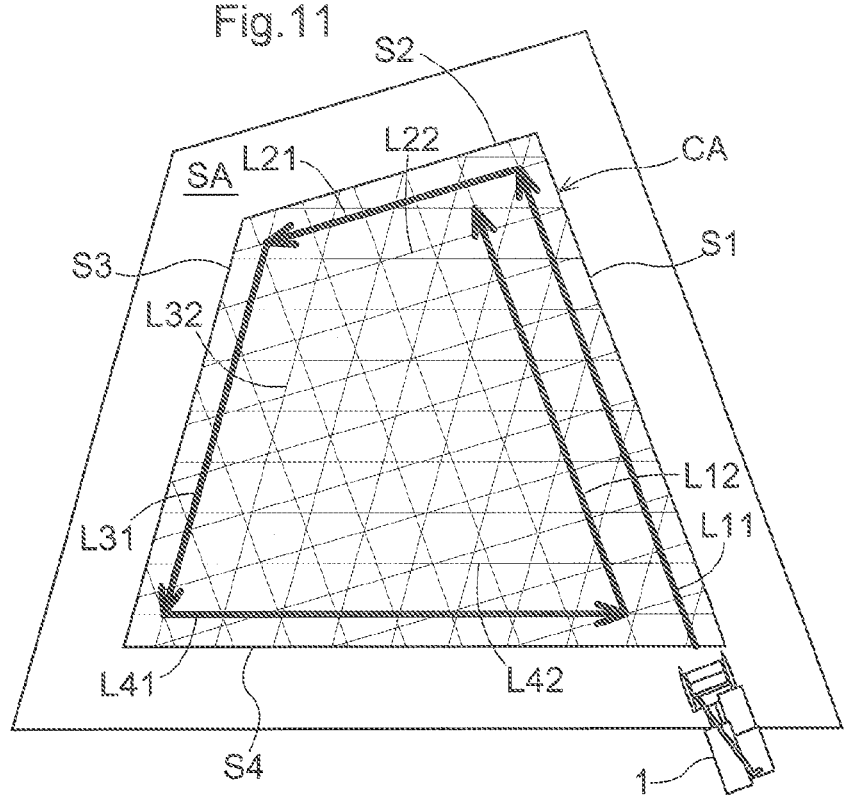
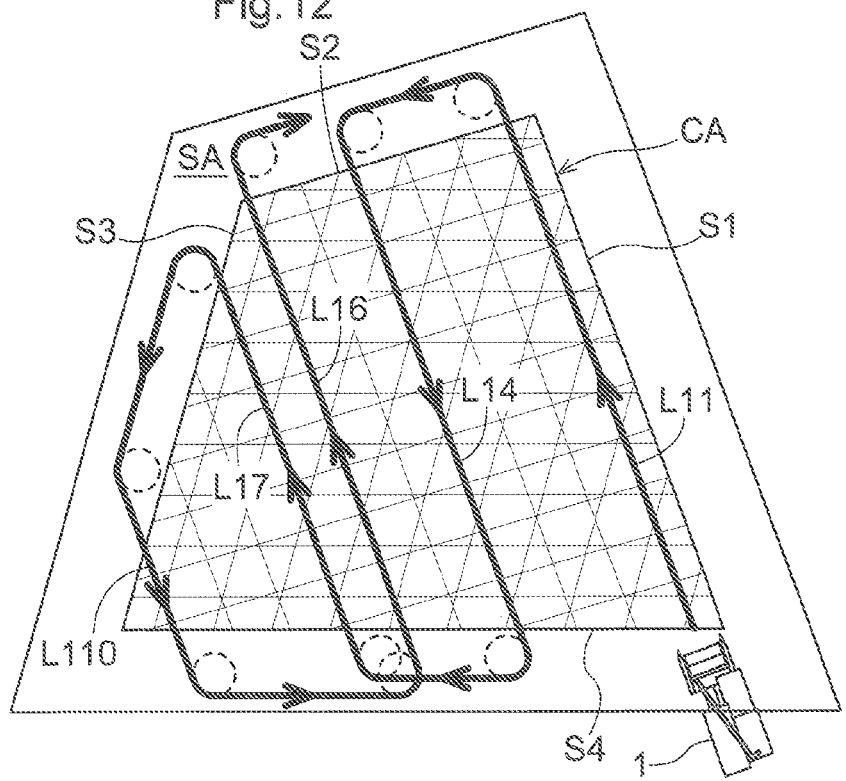

WORK VEHICLE AUTOMATIC TRAVELING SYSTEM

CROSS-REFERENCE TO RELATED APPLICATIONS

This application is the United States national phase of International Application No. PCT/JP2017/042873 filed Nov. 29, 2017, and claims priority to Japanese Patent Application No. 2016-245801 and 2016-245803 filed Dec. 19, 2016, and Japanese Patent Application No. 2017-221342 filed Nov. 16, 2017, the disclosures of which are hereby incorporated by reference in their entirety.

TECHNICAL FIELD

The present invention relates to a work vehicle automatic traveling system for a plurality of work vehicles that carry out work travel cooperatively in a work site while exchanging data.

BACKGROUND ART

A field working machine disclosed in Patent Document 1 includes a route calculating part and a drive assist unit for working a field while traveling autonomously. The route calculating part finds the outer shape of the field from topographical data, and on the basis of the outer shape and the work width of the field working machine, calculates a travel route that starts from a travel start point to a travel end point that have been set. The drive assist unit compares a host vehicle position found on the basis of positioning data (latitude/longitude data) obtained from a GPS module with the travel route calculated by the route calculating part, and controls a steering mechanism so that the vehicle body travels along the travel route.

While Patent Document 1 discloses a system that controls the autonomous travel of a single work vehicle, Patent Document 2 discloses a system that causes two work vehicles to work while traveling in tandem. In this system, a positional relationship of a second work vehicle relative to a first work vehicle is set after a field has been specified, and travel routes for the first work vehicle and the second work vehicle to work are then determined. Once the travel routes are determined, the first work vehicle and the second work vehicle measure their own positions and work while traveling along the travel routes.

PRIOR ART DOCUMENTS

Patent Documents

Patent Document 1: JP 2015-112071A
Patent Document 2: JP 2016-093125A

DISCLOSURE OF THE INVENTION

Problems the Invention is to Solve

[1] One problem pertaining to the above-described background art is as follows.

If a plurality of work vehicles carry out work travel in a work site, the work time can be shortened. To realize this, an autonomous travel system such as that disclosed in Patent Document 2 sets a work deployment position of the second work vehicle with respect to the first work vehicle in advance, and in principle, the two work vehicles carry out work travel while maintaining the work deployment positions that have been set. However, this does not take into account a situation where one of the first work vehicle and the second work vehicle departs from the work travel for some reason. If only one of the first work vehicle and the second work vehicle has departed, either the remaining work vehicle will also depart from the work travel, or the remaining work vehicle will carry out work travel along its own travel route, which has been provided in advance. In actual work travel, mechanical factors such as refueling or unloading harvested crops, environmental factors such as weather changes or the state of the work site, and the like arise during work travel in a large field, and situations where a work vehicle departs from the pre-set work travel will eventually arise.

In light of such circumstances, what is needed is a work vehicle automatic traveling system capable of appropriately handling the departure of a work vehicle from work travel, when a plurality of work vehicles carry out cooperative work travel in a work site.

[2] Another problem pertaining to the above-described background art is as follows.

When only a single work vehicle carries out work travel in a work site, there is no danger of collisions with other work vehicles. Furthermore, even if a plurality of work vehicles carry out work travel in a work site, an autonomous travel system such as that disclosed in Patent Document 2 sets a work deployment position of the second work vehicle with respect to the first work vehicle in advance, and in principle, the two work vehicles carry out work travel while maintaining the work deployment positions that have been set. Thus as long as the first work vehicle and the second work vehicle do not depart from the set travel routes, there is little risk that the first work vehicle and the second work vehicle will become abnormally close to each other or collide with each other. However, maintaining work deployment positions that have been set in advance limits the freedom of the work travel by the plurality of work vehicles. This makes flexible work travel that responds to the work environment impossible. However, in actual work travel in a large field, it is often necessary to depart from the pre-set travel route, change the travel route partway through the work, and so on due to changes in the work environment of the work vehicle caused by mechanical factors such as refueling or unloading harvested crops, environmental factors such weather changes or work site conditions, and so on.

In light of such circumstances, what is needed is a work vehicle automatic traveling system capable of responding to changes in the work environment. When a plurality of work vehicles are introduced, it is important to prevent the work vehicles from becoming abnormally close to each other or coming into contact with each other, while at the same time increasing the freedom of the work travel by the work vehicles.

Means to Solve the Problems

[1] A solution corresponding to problem [1] is as follows.
A work vehicle automatic traveling system, which is for a plurality of work vehicles that carry out work travel cooperatively in a work site while exchanging data, includes: an area setting unit that sets the work site to an outer peripheral area, and an area to be worked on an inner side of the outer peripheral area; a host vehicle position calculating unit that calculates a host vehicle position; a route managing unit that manages a travel route element set and a circling route element set so as to be capable of readout, the travel route element set being an aggregate of multiple travel route elements constituting a travel route that covers the area to be worked, and the circling route element set being an aggregate of circling route elements constituting a circling route that goes around the outer peripheral area; a route element selecting unit that, on the basis of state information, sequentially selects a next travel route element, on which the work vehicle is to travel next, from the travel route element set, or a next circling route element, on which the work vehicle is to travel next, from the circling route element set; and an autonomous travel controlling unit that executes autonomous travel on the basis of the next travel route element and the host vehicle position. Furthermore, the route element selecting unit includes a cooperative route element selection rule employed when the plurality of work vehicles carry out work travel cooperatively in the area to be worked, and an independent route element selection rule employed when one of the work vehicles acts as an independent work vehicle and carries out independent work travel in the area to be worked. In this work vehicle automatic traveling system, when the independent work vehicle is carrying out independent work travel in the area to be worked, and a work vehicle aside from that vehicle is carrying out circling travel based on the circling route element or is stopped, the route element selecting unit of the independent work vehicle selects the next travel route element on the basis of the independent route element selection rule.

According to this configuration, first, multiple travel route elements that create a travel route covering the area to be worked, and circling route elements that create a circling route going around the outer peripheral area, are calculated. Under the cooperative route element selection rule, the travel route elements are selected so that the plurality of work vehicles carry out work travel cooperatively in the area to be worked. Under the independent route element selection rule, the travel route elements are selected so that the independent work vehicle carries out independent work travel in the area to be worked. Under the cooperative route element selection rule, if, for example, while two work vehicles are carrying out work travel, one of the work vehicles deviates from the work travel, the other work vehicle must carry out the work travel in the area to be worked independently. In this case, the rule is switched from the cooperative route element selection rule to the independent route element selection rule, and the independent route element selection rule is applied to the selection of the travel route elements of the work vehicle carrying out independent work travel. As a result, the work vehicle carrying out independent work travel carries out the work travel in the area to be worked so as to also include the work travel of the work vehicle that has deviated, and thus the work can be completed in the area to be worked without leaving unworked areas.

The travel route element sets that create travel routes covering the area to be worked include a mesh line set and a parallel line set. The mesh line set is an aggregate constituted by mesh lines that divide the area to be worked into a mesh, and a point of intersection between mesh lines is set as a route changeable point where the route of the work vehicle is permitted to be changed. The parallel line set is an aggregate constituted by parallel lines that are parallel to each other and divide the area to be worked into rectangular shapes, and movement from one end of one travel route element to one end of another travel route element is executed through U-turn travel in the outer peripheral area. The ways in which routes are selected under the cooperative route element selection rule and the cooperative route element selection rule differ for the mesh line set and the parallel line set. In the combination of the mesh line set and the cooperative route element selection rule, the next travel route element is selected so that a compound spiral-shaped travel trajectory created by a plurality of spiral-shaped travel trajectories by the work vehicles covers the area to be worked. In the combination of the mesh line set and the independent route element selection rule, the next travel route element is selected so that a spiral-shaped travel trajectory by the independent work vehicle covers the area to be worked. Accordingly, even if the work travel transitions from work travel by a plurality of work vehicles to work travel by a single work vehicle, the work in the area to be worked can be carried out smoothly, without leaving unworked areas.

In the combination of the parallel line set and the cooperative route element selection rule, if a given work vehicle has stopped in the outer peripheral area, that work vehicle may obstruct the U-turn travel of another work vehicle, depending on the position of the stopped work vehicle. In light of this, in the combination of the parallel line set and the cooperative route element selection rule, the travel route element where a work vehicle aside from the host vehicle is located, and a travel route element adjacent to the stated travel route element, are excluded from being selected as the next travel route element. Additionally, in the combination of the parallel line set and the independent route element selection rule, the travel route element moving toward the work vehicle aside from the host vehicle, located in the outer peripheral area, is excluded from being selected as the next travel route element. As a result, even if one of a plurality of work vehicles carrying out cooperative work travel has stopped at a location, in the outer peripheral area, that obstructs the U-turn travel of another work vehicle, the selection of the travel route elements is changed as an exceptional process, which realizes work travel having little downtime.

[2] A solution corresponding to problem [2] is as follows.

A work vehicle automatic traveling system, for a plurality of work vehicles that carry out work travel cooperatively in a work site while exchanging data, includes: a host vehicle position calculating unit that calculates a host vehicle position; a route managing unit that calculates a travel route element set, the travel route element set being an aggregate of multiple travel route elements constituting a travel route covering the area to be worked, and stores the travel route element set so as to be capable of readout; and a route element selecting unit that selects a next travel route element, which is to be traveled next, sequentially from the travel route element set, on the basis of the host vehicle position and a work travel state of another vehicle.

According to this configuration, the travel route element set, which is an aggregate of multiple travel route elements, is calculated before the work, as a travel route covering the area to be worked. Furthermore, because data can be exchanged among the work vehicles, the work travel state of another vehicle can be read out from data indicating the work travel states of the work vehicles, which is included in the exchange data. Each work vehicle executes work travel along the travel route elements selected sequentially from the travel route element set. At this time, each work vehicle selects the next travel route element to be traveled on while taking into account the position and the work travel state of the host vehicle. This makes it possible to carry out autonomous travel taking into account the behavior of other vehicles, even while executing work travel with a high degree of freedom.

According to one preferred embodiment of the present invention, an other vehicle positional relationship indicating a positional relationship between the host vehicle and another vehicle is included in the work travel state of the other vehicle, and the system further comprises an other vehicle positional relationship calculating unit that calculates the other vehicle positional relationship. According to this configuration, the work vehicle selects the next travel route element to be traveled on the basis of the other vehicle positional relationship, which indicates the positional relationship between the host vehicle and the other vehicle. Accordingly, the work vehicle can travel while keeping a distance from the other vehicle at a set range or more, travel while avoiding another vehicle that has temporarily stopped, and the like.

Furthermore, according to one preferred embodiment of the present invention, the other vehicle positional relationship calculating unit calculates an estimated contact position between the work vehicles on the basis of the other vehicle positional relationship, and when the estimated contact position has been calculated, the work vehicle that will pass the estimated contact position at a later time is temporarily stopped. According to the work vehicle automatic traveling system configured in this manner, one of the work vehicles can be temporarily stopped before reaching a position where the host vehicle and the other vehicle will come into contact. At that time, the work vehicle that passes the estimated contact position at a later time is stopped, and the work vehicle that passes the estimated contact position at an earlier time passes the estimated contact position first. This provides an advantage of reducing the amount of time for which the work vehicle is stopped. Furthermore, the work vehicle can cancel or prohibit the selection of a travel route element leading to the position where the host vehicle and the other vehicle will come into contact.

According to this work vehicle automatic traveling system, a work vehicle can not only obtain the position of the host vehicle and the position of the other vehicle from the other vehicle positional relationship, but can also obtain the travel route elements selected by that host vehicle and the travel route elements selected by the other vehicle through mutual data exchange. If the travel route elements selected by the host vehicle and the other vehicle include places that intersect or are near each other, those places can be extracted as candidates for estimated contact positions. Furthermore, the likelihood of contact between the host vehicle and the other vehicle can be estimated accurately from the current positions of the host vehicle and the other vehicle in the respective selected travel route elements. As such, according to one preferred embodiment of the present invention, the other vehicle positional relationship calculating unit calculates the estimated contact position on the basis of the other vehicle positional relationship, and the travel route elements where the plurality of work vehicles are traveling.

BRIEF DESCRIPTION OF THE DRAWINGS

FIG. 11 is a diagram illustrating a spiral travel pattern in a travel route element set calculated by a mesh route element calculating unit.

FIG. 12 is a diagram illustrating a linear back-and-forth travel pattern in a travel route element set calculated by the mesh route element calculating unit.

BEST MODE FOR CARRYING OUT THE INVENTION

Overview of Autonomous Travel

Figure 1:
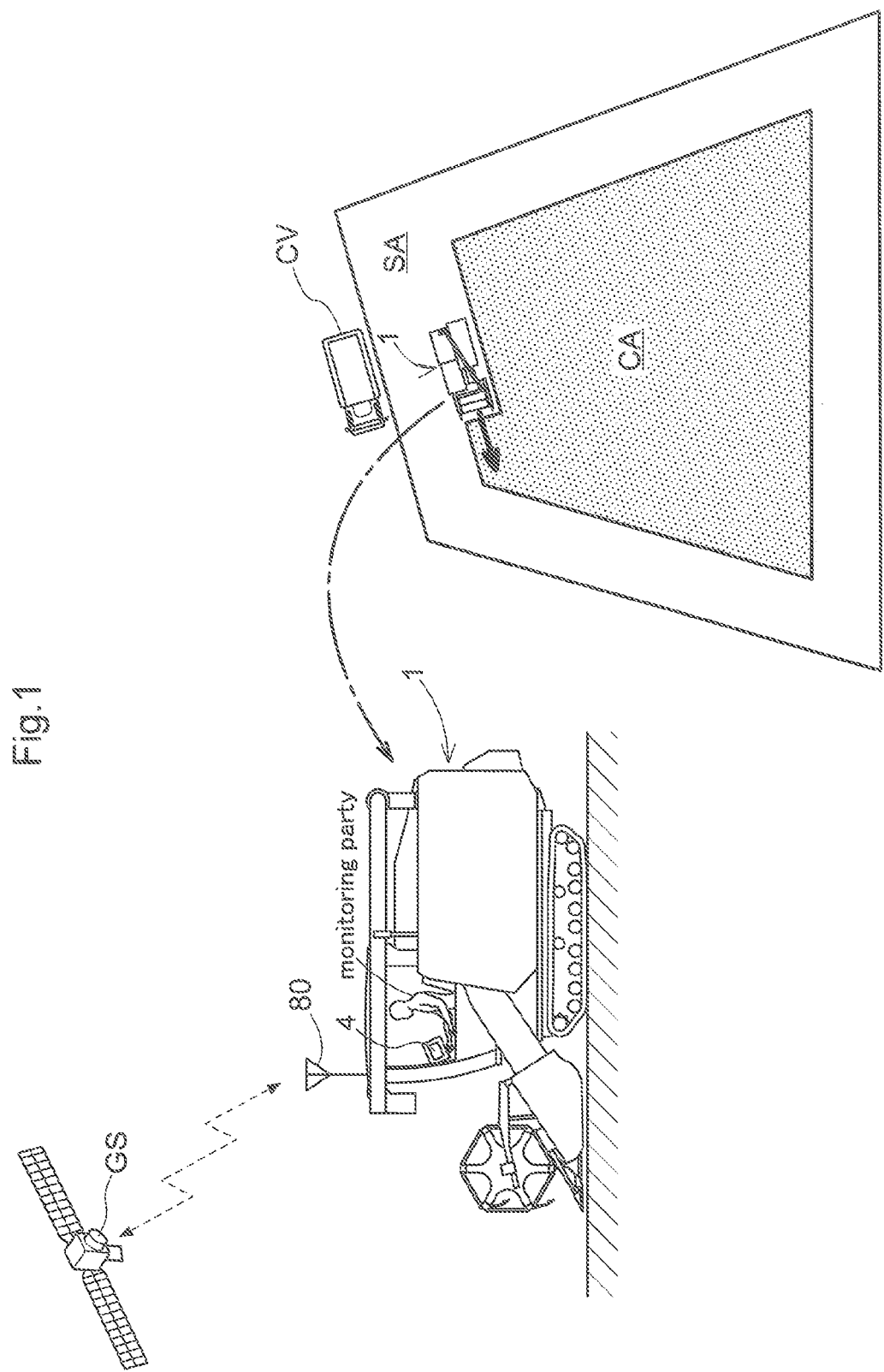
FIG. 1 is a diagram schematically illustrating work travel of a work vehicle in an area to be worked.

FIG. 1 schematically illustrates work travel of a work vehicle in a work vehicle automatic traveling system. In this embodiment, a work vehicle is a harvester 1 that, as work travel, carries out harvesting work (reaping work) for harvesting crops while traveling, and is a model typically called a normal-type combine. The work site where the harvester 1 travels for work is called a field. During harvesting work in the field, the area that the harvester 1 circles the border lines of the field, called a "ridge", is set as an outer peripheral area SA. The inner side of the outer peripheral area SA is set as an area CA to be worked. The outer peripheral area SA is used as a movement space for the harvester 1 to unload harvested crops, refuel, and the like, as a space for switching directions, and so on. To set the outer peripheral area SA, the harvester 1 circles the border line of the field three or four times as initial work travel. In the circling travel, the field is worked by an amount equivalent to the work width of the harvester 1 with each pass, and thus the outer peripheral area SA has a width approximately three to four times the work width of the harvester 1. Accordingly, unless specifically indicated otherwise, the outer peripheral area SA is treated as an already-harvested site (an already-worked site), whereas the area CA to be worked is treated as an unharvested area (an unworked site). Note that in this embodiment, the work width is handled as a value obtained by subtracting an overlap amount from a reaping width. However, the concept of the work width differs depending on the type of the work vehicle. The work width in the present invention is defined by the type of the work vehicle, the type of the work, and so on.

Note that the term "work travel" used in this application is used not only in reference to travel executed while actually carrying out work, but with a broader meaning encompassing travel carried out to change directions during the work, in a state where work is not being carried out.

Furthermore, in this specification, the term "work environment of the work vehicle" can include the state of the work vehicle, the state of the work site, commands from a person (a monitoring party, a driver, an administrator, or the like), and so on, and state information is found by evaluating the work environment. Mechanical factors such as refueling and unloading harvested crops, environmental factors such as changes in weather and the state of the work site, and furthermore, human requests such as unanticipated commands to suspend the work, are included in the state information. When a plurality of work vehicles carry out work travel cooperatively, state information of another vehicle is handled as a work travel state of the other vehicle, and an other vehicle positional relationship indicating a positional relationship between the host vehicle and the other vehicle is also included in the work travel state of the other vehicle. Note that the monitoring party, the administrator, or the like may be inside the work vehicle, near the work vehicle, or far from the work vehicle.

The harvester 1 includes a satellite positioning module 80 that outputs positioning data on the basis of a GPS signal from an artificial satellite GS used in GPS (global positioning systems). The harvester 1 has a function for calculating a host vehicle position, which is positional coordinates of a specific part of the harvester 1, from the positioning data. The harvester 1 has an autonomous travel function that automates the traveling harvest work by steering so as to follow a travel route which takes a calculated host vehicle position as an objective. When unloading harvested crops that have been harvested while traveling, it is necessary for the harvester 1 to approach the vicinity of a transport vehicle CV, which itself is parked near the ridge, and park. When the parking position of the transport vehicle CV is determined in advance, this kind of approaching travel, i.e., temporarily deviating from the work travel in the area CA to be worked and then returning to the work travel, can also be achieved through autonomous travel. Travel routes for departing the area CA to be worked and returning to the area CA to be worked are generated at the point in time when the outer peripheral area SA is set. Note that a refueling vehicle or another work support vehicle can be parked instead of the transport vehicle CV.

Basic Flow of Work Vehicle Automatic Traveling System

For the harvester 1 incorporated into the work vehicle automatic traveling system according to the present invention to carry out the harvesting work through autonomous travel, it is necessary to provide a travel route managing device that generates travel routes serving as objectives of the travel and manages those travel routes. The basic configuration of this travel route managing device, and a basic flow of autonomous travel control using the travel route managing device, will be described using FIG. 2.

Having arrived at the field, the harvester 1 harvests a crop while circling the inner sides of the border lines of the field. This work is called circular harvesting and is well-known as harvesting work. At this time, forward and reverse travel is repeated in corner areas to ensure that no unreaped grain remains. This embodiment assumes that at least the outermost pass is made manually so that nothing is left unreaped and the vehicle does not collide with the ridge. The remaining interior passes may be carried out through autonomous travel using an autonomous travel program specifically for circular harvesting, or the manual travel may be continued after the circular harvesting in the outermost pass. As the shape of the area CA to be worked that remains on the inner side of the trajectory of this circling travel, a polygon that is as simple as possible, and preferably a quadrangle, is employed to favorably accommodate the autonomous work travel. A circling route element for traveling around the outer peripheral area SA is created on the basis of travel trajectory position data obtained from the circular harvesting on the inner side.

Furthermore, the trajectory of this circling travel can be obtained on the basis of a host vehicle position calculated by a host vehicle position calculating unit 53 from the positioning data of the satellite positioning module 80. Furthermore, outer shape data of the field, and particularly outer shape data of the area CA to be worked, which is the unharvested area located on the inner side of the circling travel trajectory, is generated by an outer shape data generating unit 43 on the basis of the travel trajectory. The field is managed by an area setting unit 44, as the outer peripheral area SA and the area CA to be worked, separately.

The work travel in the area CA to be worked is carried out through autonomous travel. As such, a travel route element set, which is a travel route for travel covering the area CA to be worked (travel that completely covers the work width), is managed by a route managing unit 60. This travel route element set is an aggregate of many travel route elements. The route managing unit 60 calculates the travel route element set on the basis of the outer shape data of the area CA to be worked, and stores the set in memory in a readable format.

In this work vehicle automatic traveling system, an overall travel route is not determined in advance before the work travel in the area CA to be worked. Rather, the travel route can be changed midway through travel in accordance with circumstances such as the work environment of the work vehicle. To that end, a work state evaluating unit 55 that evaluates the state of the harvester 1, the state of the work site, commands from the monitoring party, and so on, and outputs state information, is provided. Note that the minimum unit (link) between a point (node) and a point (node) where the travel route can be changed is a travel route element. When the autonomous travel is started from a specified location, a next travel route element, which is to be traveled next, is selected in sequence from the travel route element set by a route element selecting unit 63. An autonomous travel controlling unit 511 generates autonomous travel data on the basis of the selected travel route element and the host vehicle position, so that the vehicle follows that travel route element, and executes the autonomous travel.

Figure 2:
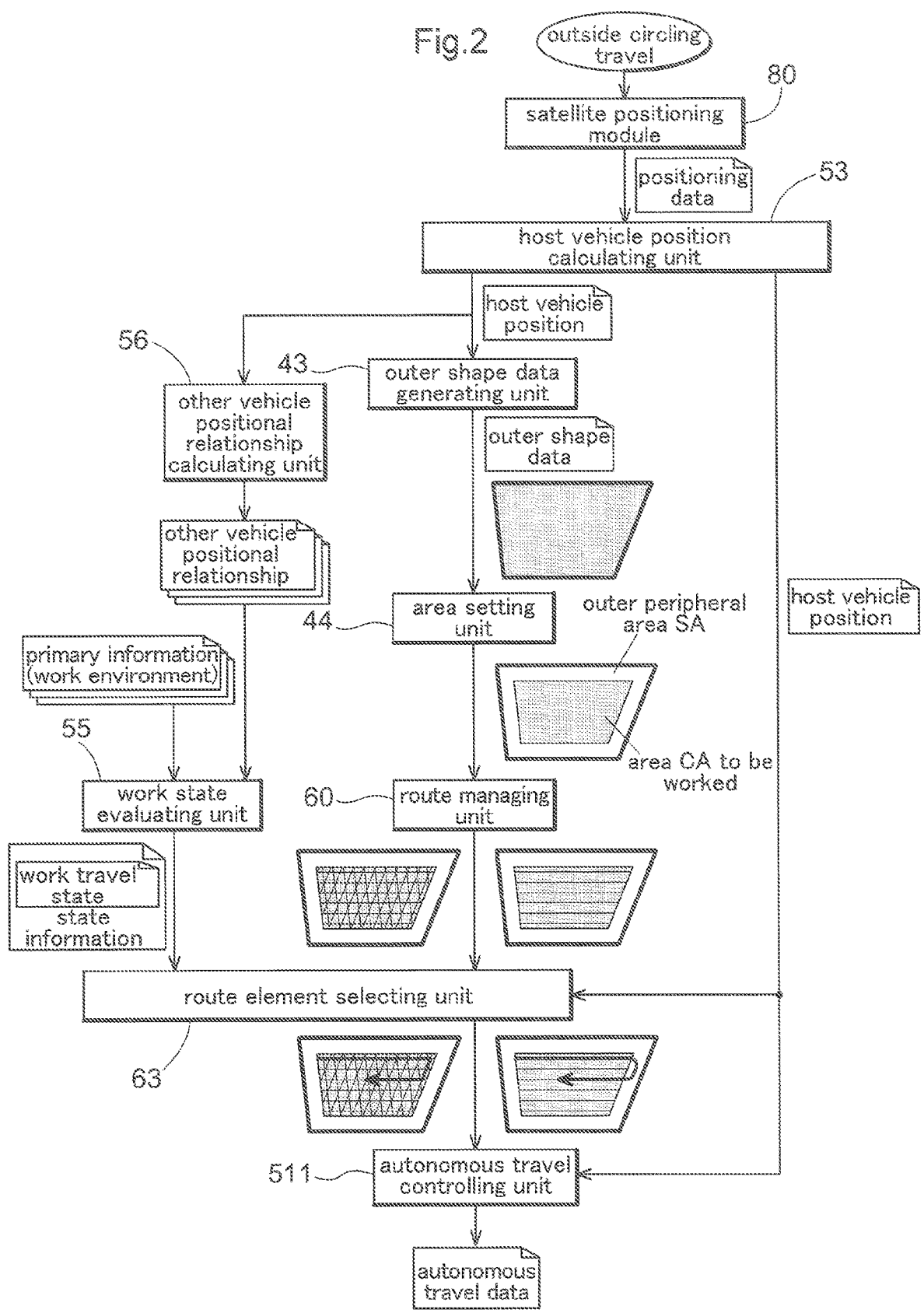
FIG. 2 is a diagram illustrating the basic flow of autonomous travel control using a travel route determination device.

In FIG. 2, a travel route generating device that generates the travel routes for the harvester 1 is constituted by the outer shape data generating unit 43, the area setting unit 44, and the route managing unit 60. The travel route determination device that determines the travel routes for the harvester 1 is constituted by the host vehicle position calculating unit 53, the area setting unit 44, the route managing unit 60, and the route element selecting unit 63. The travel route generating device, the travel route determination device, and the like can be incorporated into a control system of the harvester 1, which is capable of conventional autonomous travel. Alternatively, the travel route generating device, the travel route determination device, and so on can be configured in a computer terminal, and the autonomous travel can be realized by connecting that computer terminal to the control system of the harvester 1 so as to be capable of exchanging data.

When a plurality of the harvesters 1, which carry out work travel cooperatively, are incorporated into the work vehicle automatic traveling system, an other vehicle positional relationship calculating unit 56, which calculates the positional relationship between the harvesters 1, is included. The other vehicle positional relationship calculating unit 56 calculates the other vehicle positional relationship, which includes the position of the one harvester 1 (the host vehicle position), the position of the other harvester 1 (an other vehicle position), the travel direction of the one harvester 1, the travel direction of the other harvester 1, and the like. The other vehicle positional relationship is one piece of data expressing the work travel states of the harvesters 1. The work travel state is state information output from the work state evaluating unit 55 by evaluating the states of the harvesters 1, the state of the work site, commands from the monitoring party, and so on. As illustrated in FIG. 2, the other vehicle positional relationship calculated by the other vehicle positional relationship calculating unit 56 is sent to the work state evaluating unit 55. When a plurality of harvesters carry out work travel cooperatively, the work state evaluating unit 55 sends the work travel state of the other vehicle to the route element selecting unit 63.

Overview of Travel Route Element Set

Figure 3:
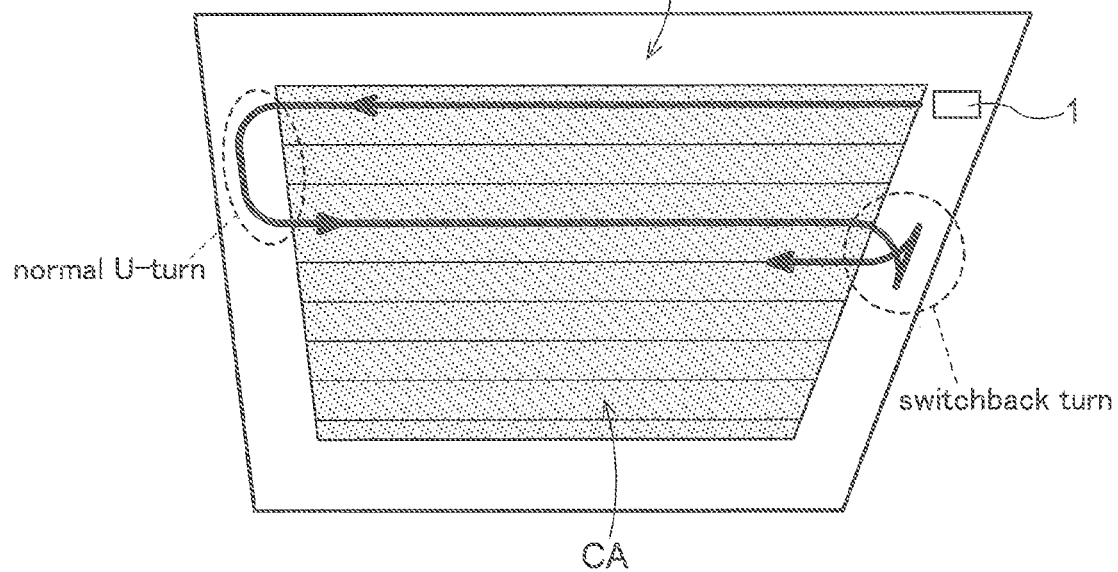
FIG. 3 is a diagram illustrating a travel pattern of repeating U-turns and straight travel.

As an example of the travel route element set, FIG. 3 illustrates a travel route element set in which multiple parallel dividing lines that divide the area CA to be worked into rectangular shapes serve as travel route elements. This travel route element set has straight line-shaped travel route elements, each element having two nodes (points on both ends; called "route changeable points", where the route can be changed, here) connected by a single link, with the elements being arranged in parallel. The travel route elements are set to be arranged at equal intervals by adjusting the overlap amount of work width. U-turn travel (e.g., travel that switches the direction by 180°) is carried out in order to move from an endpoint of a travel route element represented by one straight line to an endpoint of a travel route element represented by another straight line. Autonomous travel that connects such parallel travel route elements through U-turn travel will be called "linear back-and-forth travel" hereinafter. This U-turn travel includes normal U-turn travel and switchback turn travel. The normal U-turn travel is carried out only when the harvester 1 is moving forward, and the trajectory of that travel has a U shape. Switchback turn travel is carried out using both forward and reverse travel of the harvester 1, and although the trajectory of the travel is not a U shape, the harvester 1 ultimately switches the travel to the same direction as that achieved by the normal U-turn travel. The normal U-turn travel requires a distance that encloses two or more travel route elements between the route changeable point before switching the direction of travel and the route changeable point after switching the direction of travel. For shorter distances, switchback turn travel is used. In other words, unlike normal U-turn travel, switchback turn travel is carried out in reverse as well, which means that the turn radius of the harvester 1 has less of an effect, and there are more options for travel route elements to move to. However, because switchback turn travel involves switches in the forward and reverse directions, switchback turn travel generally takes more time than normal U-turn travel.

Figure 4:
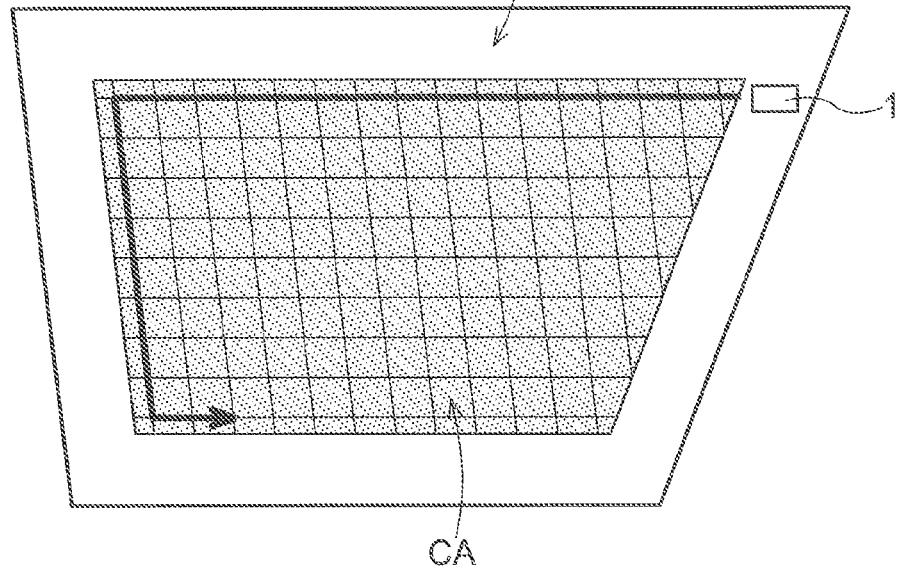
FIG. 4 is a diagram illustrating a travel pattern that follows a mesh-shaped route.

As another example of a travel route element set, FIG. 4 illustrates a travel route element set constituted by multiple mesh lines extending in the vertical and horizontal directions (corresponding to "mesh lines" according to the present invention) that divide the area CA to be worked into a mesh. Routes can be changed at points where mesh lines intersect (route changeable points) and both endpoints of the mesh lines (route changeable points). In other words, this travel route element set constructs a route network where the points of intersection and the end points of the mesh lines function as nodes and the sides of each mesh segmented by the mesh lines function as links, enabling travel having a high level of freedom. In addition to the above-described linear back-and-forth travel, "spiral travel" moving from the outside to the inside as indicated in FIG. 4, "zigzag travel", and so on, for example, are also possible. Furthermore, it is also possible to change from spiral travel to linear back-and-forth travel midway through work. Note that a circling route element set, which is an aggregate of circling route elements, create the travel route for traveling around the outer peripheral area SA.

Concepts When Selecting Travel Route Element

Selection rules used when the route element selecting unit 63 selects the next travel route element, which is the next travel route element to be traveled in sequence, can be divided into static rules, which are set in advance before work travel, and dynamic rules, which are used in real time during work travel. The static rules include rules for selecting travel route elements on the basis of a predetermined basic travel pattern, e.g., selecting travel route elements so as to achieve linear back-and-forth travel while carrying out U-turn travel as illustrated in FIG. 3, rules for selecting travel route elements so as to achieve counterclockwise spiral travel moving from the outside to the inside as illustrated in FIG. 4, and so on. In principle, dynamic rules are used preferentially over static rules. The dynamic rules include the content of the state information, such as the state of the harvester 1, the state of the work site, commands from a monitoring party (including a driver, an administrator, and so on), and the like, which change in real time. The work state evaluating unit 55 takes various types of primary information (the work environment), the states of the harvesters 1, the state of the work site, commands from the monitoring party, and the like as input parameters, and outputs the state information. This primary information includes not only signals from various sensors and switches provided in the harvester 1, but also weather information, time information, external facility information from drying facilities or the like, and so on. Furthermore, when a plurality of harvesters 1 work cooperatively, the state information output from the work state evaluating unit 55 also includes the other vehicle positional relationship calculated by the other vehicle positional relationship calculating unit 56. This state information is used as the work travel state of the other vehicle.

Furthermore, the route element selecting unit 63 includes a cooperative route element selection rule, which is employed when a plurality of harvesters 1 carry out work travel cooperatively in the area CA to be worked, and an independent route element selection rule, which is employed when a single harvester 1 carries out work travel independently in the area CA to be worked. When a single harvester 1 carries out work travel independently in the area CA to be worked, and a different harvester 1 is carrying out circling travel based on the circling route element or is stopped, the route element selecting unit 63 of the single harvester 1 selects the next travel route element on the basis of the independent route element selection rule.

Overview of Harvester

Figure 5:
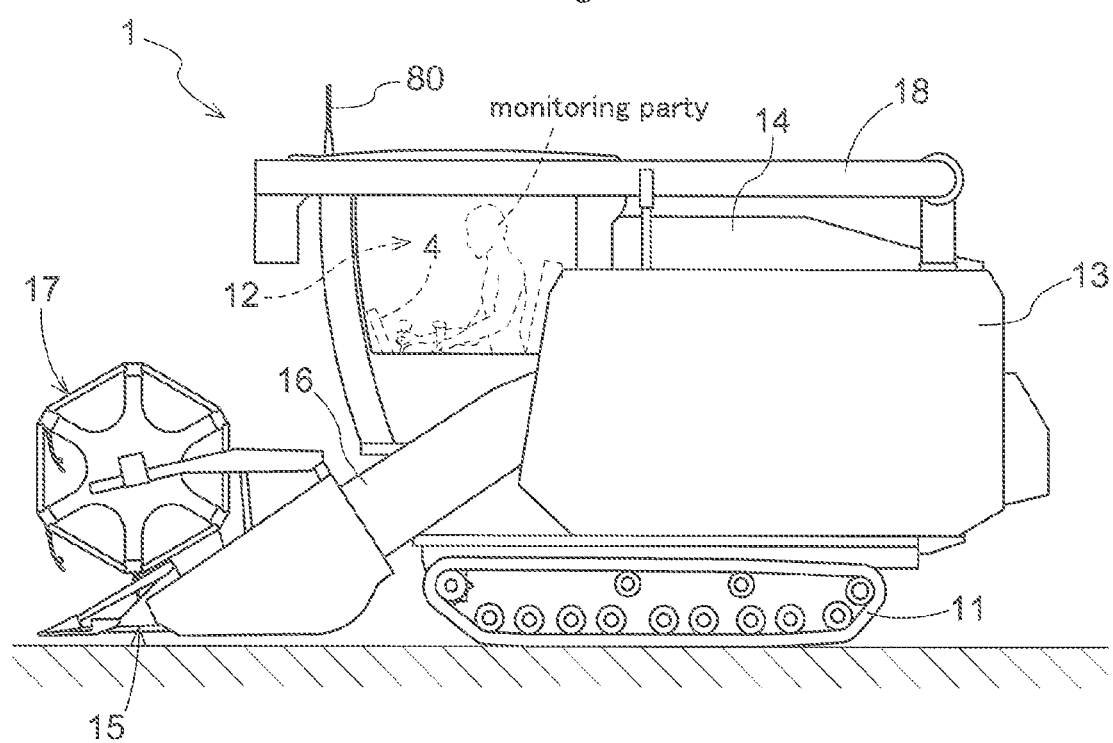
FIG. 5 is a side view of a harvester serving as one embodiment of a work vehicle.

FIG. 5 is a side view of the harvester 1 serving as the work vehicle employed in the descriptions of this embodiment. The harvester 1 includes a crawler-type vehicle body 11. A driving section 12 is provided on a front part of the vehicle body 11. A threshing device 13 and a harvested crop tank 14 that holds harvested crops are arranged in the left-right direction to the rear of the driving section 12. A harvesting section 15 is provided to the front of the vehicle body 11, with the height of the harvesting section 15 being adjustable. A reel 17 that raises grain is provided to the front of the harvesting section 15, with the height of the reel 17 being adjustable. A transport device 16 that transports the reaped grain is provided between the harvesting section 15 and the threshing device 13. A discharge device 18 that discharges the harvested crops from the harvested crop tank 14 is provided in an upper part of the harvester 1. A load sensor that detects the weight of the harvested crops (an accumulation state of the harvested crops) is installed in a low part of the harvested crop tank 14, and a yield meter, a taste analyzer, and so on are installed within and around the harvested crop tank 14. Measurement data including moisture values and protein values of the harvested crops are output from the taste analyzer as quality data. The harvester 1 is provided with the satellite positioning module 80, which is constituted by a GNSS module, a GPS module, or the like. A satellite antenna for receiving GPS signals, GNSS signals, and so on is attached to an upper part of the vehicle body 11 as a constituent element of the satellite positioning module 80. Note that the satellite positioning module 80 can include an inertial navigation module incorporating a gyro accelerometer, a magnetic direction sensor, and so on in order to complement the satellite navigation.

In FIG. 5, the monitoring party (including a driver, an administrator, and the like), which monitors the movement of the harvester 1, boards the harvester 1, and brings a communication terminal 4, which the monitoring party uses for operation, into the harvester 1. However, the communication terminal 4 may be attached to the harvester 1. Furthermore, the monitoring party and the communication terminal 4 may be located outside the harvester 1.

The harvester 1 is capable of autonomous travel through autonomous steering, and manual travel through manual steering. Conventional autonomous travel, in which the overall travel route is determined in advance, and autonomous travel in which the next travel route is determined in real time on the basis of state information, are possible as the autonomous travel. In the present application, the former travel, in which the overall travel route is determined in advance, will be called "traditional travel", and the latter travel, in which the next travel route is determined in real time, will be called "autonomous travel", so as to handle the two as distinct concepts. The configuration is such that the routes of the traditional travel are registered in advance according to several patterns, or can be set as desired by the monitoring party using the communication terminal 4 or the like, for example.

Function Control Blocks for Autonomous Travel

Figure 6:
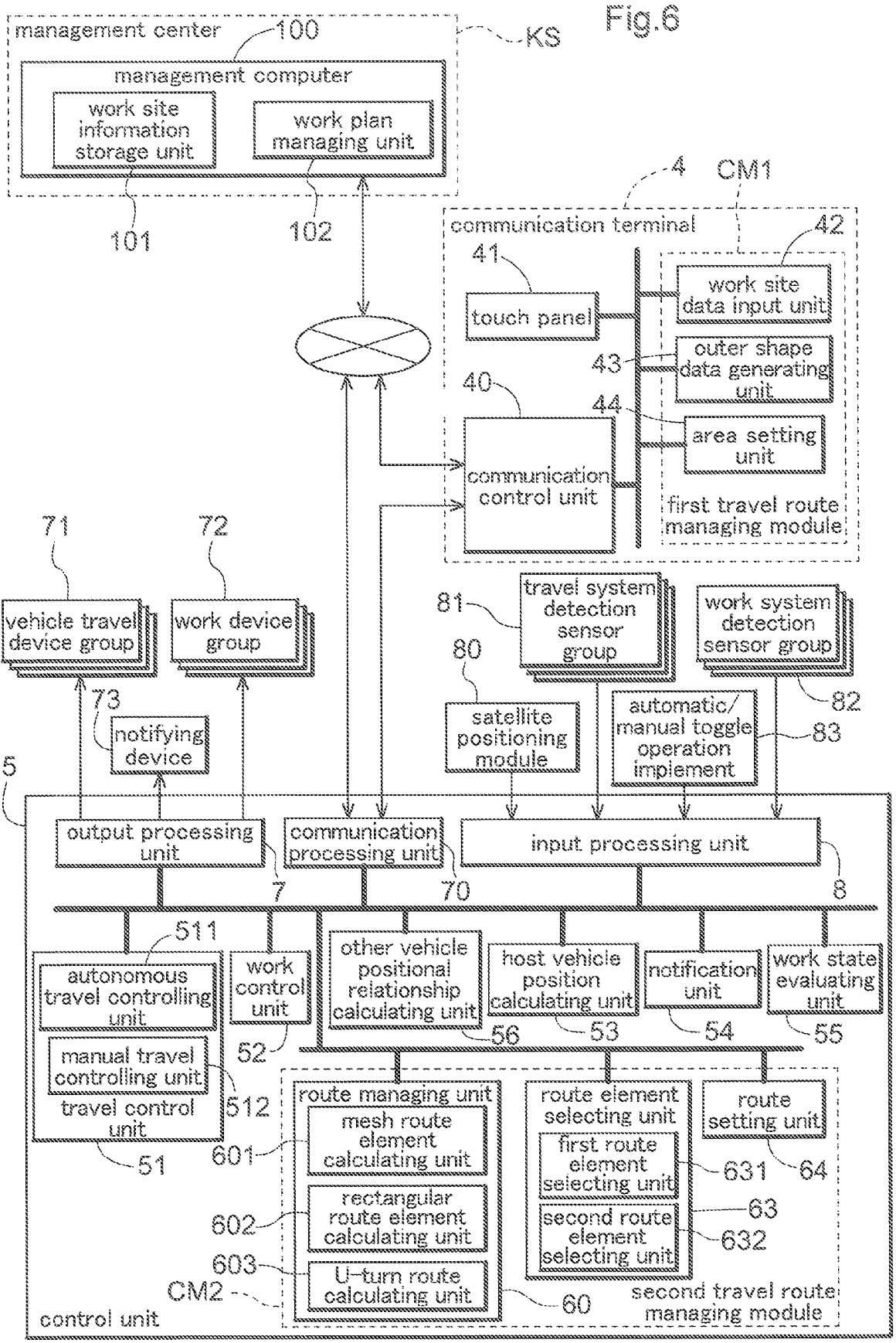
FIG. 6 is a control function block diagram for a work vehicle automatic traveling system.

FIG. 6 illustrates a control system constructed in the harvester 1, and a control system of the communication terminal 4. In this embodiment, the travel route managing device that manages travel routes for the harvester 1 is constituted by a first travel route managing module CM1 constructed in the communication terminal 4, and a second travel route managing module CM2 constructed in a control unit 5 of the harvester 1.

The communication terminal 4 includes a communication control unit 40, a touch panel 41, and so on, and functions as a computer system, a user interface function for inputting conditions required for autonomous travel realized by the control unit 5, and so on. By using the communication control unit 40, the communication terminal 4 can exchange data with a management computer 100 over a wireless connection or the Internet, and can also exchange data with the control unit 5 of the harvester 1 using a wireless LAN, a wired LAN, or another communication method. The management computer 100 is a computer system installed in a management center KS in a remote location, and functions as a cloud computer. The management computer 100 stores information sent from farmers, agricultural associations, agriculture industry groups, and so on, and can also send information in response to requests. FIG. 6 illustrates a work site information storage unit 101 and a work plan managing unit 102 as units that realize such server functions. The communication terminal 4 processes data on the basis of external data obtained from the management computer 100, the control unit 5 of the harvester 1, and so on through the communication control unit 40, and on the basis of input data such as user instructions (conditions necessary for autonomous travel) input through the touch panel 41. Results of this data processing are displayed in a display panel unit of the touch panel 41, and can also be sent from the communication terminal 4 to the management computer 100, the control unit 5 of the harvester 1, and so on through the communication control unit 40.

Field information including a topographical map of the vicinity of the field, attribute information of the field (exits and entries to the field, the direction of rows, and so on), and the like is stored in the work site information storage unit 101. The work plan managing unit 102 of the management computer 100 manages a work plan manual denoting the details of the work for a specified field. The field information and the work plan manual can be downloaded to the communication terminal 4, the control unit 5 of the harvester 1, and so on in response to an operation by the monitoring party or program executed automatically. The work plan manual includes various types of information (work conditions) pertaining to the work for the field designated to be worked. The following can be given as examples of this information (work conditions).

(a) travel patterns (linear back-and-forth travel, spiral travel, zigzag travel, and so on).
(b) the parking position of a support vehicle such as the transport vehicle CV, a parking position of the harvester 1 for unloading harvested crops or the like, and so on.
(c) the work format (work by a single harvester 1, or work by multiple harvesters 1).
(d) a so-called middle dividing line.
(e) values for the vehicle speed, the rotation speed of the threshing device 13, and so on based on the type of crop to be harvested (rice (Japonica rice, Indica rice), wheat, soybeans, rapeseed, buckwheat, and the like).
Settings for the travel device parameters, settings for the harvesting device parameters, and so on corresponding to the type of crop are sent automatically on the basis of the information (e) in particular, which avoids setting mistakes.

Note that the position where the harvester 1 parks in order to unload harvested crops into the transport vehicle CV is a harvested crop unloading parking position, and the position where the harvester 1 parks in order to be refueled by a refueling vehicle is a refueling parking position. In this embodiment, these are set to substantially the same position.

The above-described information (a) to (e) may be input by the monitoring party through the communication terminal 4 serving as a user interface. The communication terminal 4 is also provided with an input function for instructing autonomous travel to start and stop, an input function for indicating whether the work travel is autonomous travel or traditional travel as described above, an input function for making fine adjustments to the values of parameters pertaining to a vehicle travel device group 71 including a travel speed variation device, a work device group 72 including the harvesting section 15 (see FIG. 6), and so on. The height of the reel 17, the height of the harvesting section 15, and so on can be given as examples of the values of the parameters of the work device group 72 to which fine adjustments can be made.

The state of the communication terminal 4 can, through an artificial switching operation, be switched to an animated display state indicating autonomous travel routes or traditional travel routes, a state of displaying the above-described parameters/fine adjustments, and so on. This animated display animates the travel trajectory of the harvester 1 traveling along the autonomous travel routes or traditional travel routes, which are travel routes in the autonomous travel or traditional travel in which the overall travel route has been determined in advance, and displays the animation in a display panel unit of the touch panel 41. Using this animated display, the driver can intuitively confirm the travel routes to be traveled on before the travel starts.

A work site data input unit 42 inputs the field information downloaded from the management computer 100, information obtained from the work plan manual or the communication terminal 4, or the like. A schematic diagram of the field, the positions of exits from and entrances to the field, a parking position for receiving support from a work support vehicle, and so on included in the field information are displayed in the touch panel 41. This makes it possible to assist the circling travel for forming the outer peripheral area SA carried out by the driver. If data such as the exits from and entrances to the field, the parking position, and so on is not included in the field information, the user can input that information through the touch panel 41. The outer shape data generating unit 43 calculates an accurate outer shape and outer dimensions of the field, and an outer shape and outer dimensions of the area CA to be worked, from travel trajectory data obtained from the control unit 5 when the harvester 1 carries out the circling travel (that is, time series data of the host vehicle position). The area setting unit 44 sets the outer peripheral area SA and the area CA to be worked on the basis of the travel trajectory data from when the harvester 1 carries out the circling travel. Positional coordinates of the outer peripheral area SA and the area CA to be worked that have been set, i.e., the outer shape data of the outer peripheral area SA and the area CA to be worked, are used to generate the travel routes for autonomous travel. In this embodiment, the second travel route managing module CM2 constructed in the control unit 5 of the harvester 1 generates the travel routes, and thus the positional coordinates of the outer peripheral area SA and the area CA to be worked that have been set are sent to the second travel route managing module CM2.

If the field is large, work is carried out to create a middle-divided area, which divides the field into multiple segments using travel routes that intersect head-on. This work is called "middle dividing". The middle dividing position can also be specified through a touch operation made on a diagram of the outer shape of the work site displayed in the screen of the touch panel 41. Of course, the setting of the middle dividing position also affects the generation of the travel route element set for autonomous travel, and thus may be carried out automatically when generating the travel route element set. At that time, if the parking position of the harvester 1 for receiving support from a work support vehicle such as the transport vehicle CV is located on a line extending from the middle-divided area, the travel for unloading the harvested crops from all segments is carried out efficiently.

The second travel route managing module CM2 includes the route managing unit 60, the route element selecting unit 63, and a route setting unit 64. The route managing unit 60 calculates the travel route element set and the circling route element set and stores those sets so as to be capable of readout. The travel route element set is an aggregate of multiple travel route elements constituting a travel route covering the area CA to be worked. The circling route element set is an aggregate of circling route elements constituting a circling route for traveling around the outer peripheral area SA. The route managing unit 60 includes a mesh route element calculating unit 601, a rectangular route element calculating unit 602, and a U-turn route calculating unit 603 as function units for calculating the travel route element set. The route element selecting unit 63 selects the next travel route element, which is to be traveled next, sequentially from the travel route element set, on the basis of various selection rules which will be described in detail later. The route setting unit 64 sets the selected next travel route element as a target travel route for autonomous travel.

The mesh route element calculating unit 601 can calculate a travel route element set, which is a mesh line set (corresponding to a "mesh line set" according to the present invention) constituted by mesh lines that divide the area CA to be worked into a mesh, and can also calculate positional coordinates of points of intersection between and endpoints of the mesh lines. These travel route elements correspond to the target travel route when the harvester 1 travels autonomously, and thus the harvester 1 can change the route from one travel route element to another travel route element at the points of intersection between and the endpoints of the mesh lines. In other words, the points of intersection between and the endpoints of the mesh lines function as the route changeable points that permit the harvester 1 to change its route.

Figure 7:
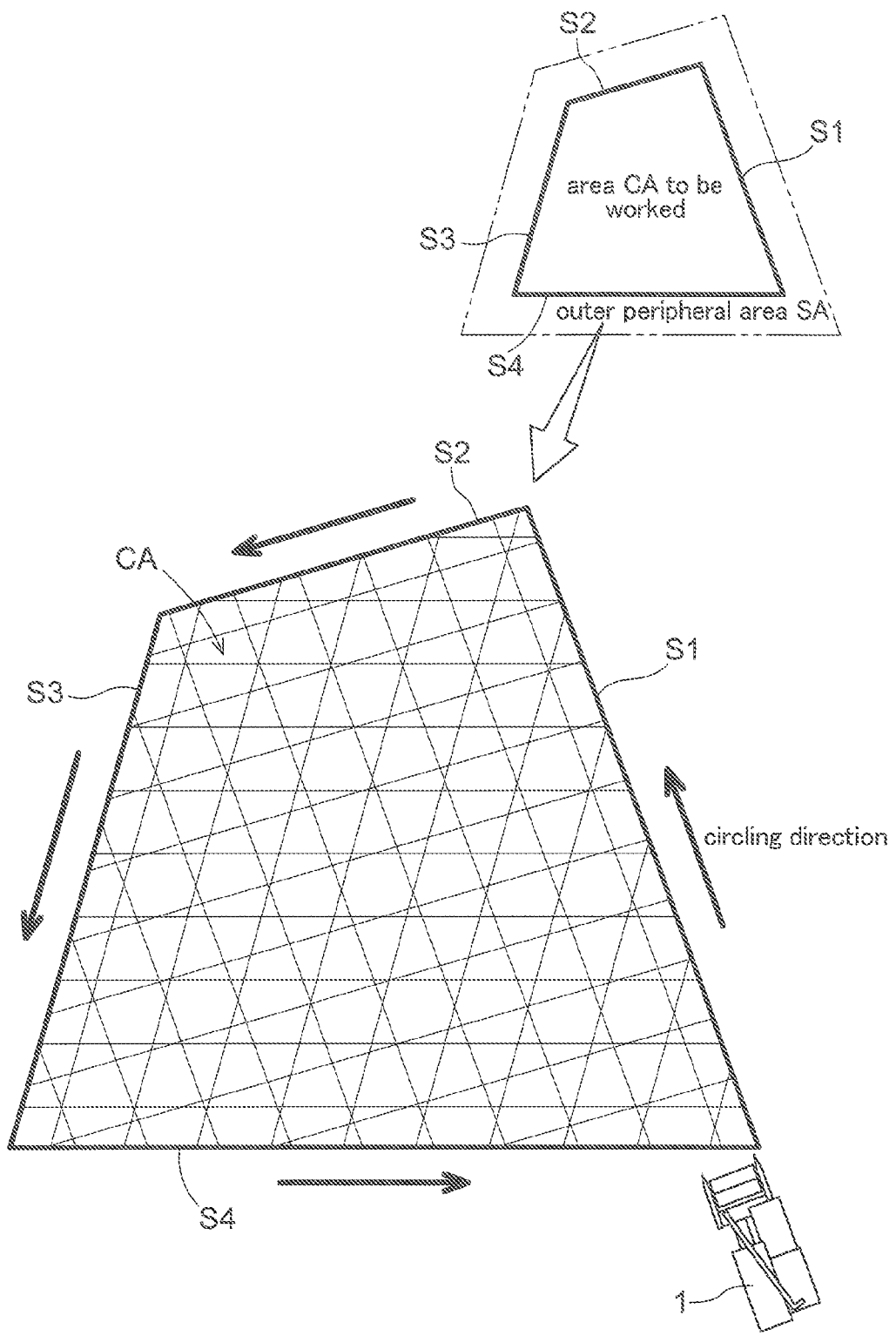
FIG. 7 is a diagram illustrating a method of calculating mesh lines, which are an example of a travel route element set.

FIG. 7 schematically illustrates the mapping of the mesh line set, which is an example of the travel route element set, onto the area CA to be worked. Using the work width of the harvester 1 as a mesh interval, the mesh route element calculating unit 601 calculates a travel route element set so as to completely cover the area CA to be worked with mesh lines. As described above, the area CA to be worked as an area on the inner side of the outer peripheral area SA, which is formed by making three to four circular passes, at the work width, from the border of the field toward the inside of the field. Accordingly, the area CA to be worked will basically have the same outer shape as the field. However, there are cases where the outer peripheral area SA is created so that the area CA to be worked is substantially polygonal, and preferably substantially quadrangular, to make it easier to calculate the mesh lines. In FIG. 7, the shape of the area CA to be worked is a deformed quadrangle constituted by a first side S1, a second side S2, a third side S3, and a fourth side S4.

As illustrated in FIG. 7, the mesh route element calculating unit 601 calculates a first straight line set, arranged on the area CA to be worked, from a position distanced from the first side S1 of the area CA to be worked by a distance equivalent to half the work width of the harvester 1, with the lines being parallel to the first side S1 and arranged at intervals equivalent to the work width of the harvester 1. Likewise, a second straight line set, arranged on the area CA to be worked, from a position distanced from the second side S2 by a distance equivalent to half the work width of the harvester 1, with the lines being parallel to the second side S2 and arranged at intervals equivalent to the work width of the harvester 1; a third straight line set, arranged on the area CA to be worked, from a position distanced from the third side S3 by a distance equivalent to half the work width of the harvester 1, with the lines being parallel to the third side S3 and arranged at intervals equivalent to the work width of the harvester 1; and a fourth straight line set, arranged on the area CA to be worked, from a position distanced from the fourth side S4 by a distance equivalent to half the work width of the harvester 1, with the lines being parallel to the fourth side S4 and arranged at intervals equivalent to the work width of the harvester 1, are calculated. In this manner, the first side S1 to the fourth side S4 serve as reference lines for generating the straight line sets serving as the travel route element set. If the positional coordinates of two points on a straight line are known, that straight line can be identified; thus each straight line serving as a travel route element is turned into data indicating a straight line defined by the positional coordinates of the two points on that straight line, and is stored in memory in a predetermined data format. This data format includes a route number serving as a route identifier for identifying that travel route element, as well as a route type, the side of the outer quadrangle serving as a reference, whether the element is untraveled/already traveled, and so on as attribute values of the travel route element.

Of course, the above-described calculation of the straight line groups can be applied to an area CA to be worked that is a polygon aside from a quadrangle. In other words, assuming the area CA to be worked is an N-cornered shape, where N is an integer of 3 or more, the travel route element set is constituted by N straight line sets, from a first straight line set to an Nth straight line set. Each straight line set includes straight lines arranged at predetermined intervals (the work width) parallel to one of the sides of the N-cornered shape.

Note that a travel route element set is set by the route managing unit 60 in the outer peripheral area SA as well. The travel route element set in the outer peripheral area SA is used when the harvester 1 travels in the outer peripheral area SA. The travel route element set in the outer peripheral area SA is given attribute values such as a departure route, a return route, an intermediate straight route for U-turn travel, and so on. "Departure route" refers to a travel route element set used for the harvester 1 to depart the area CA to be worked and enter the outer peripheral area SA. "Return route" refers to a travel route element set used for the harvester 1 to return from the outer peripheral area SA to the work travel in the area CA to be worked. The intermediate straight route for U-turn travel (referred to simply as an "intermediate straight route" hereinafter) is a straight line-shaped route constituting part of a U-turn travel route used during U-turn travel in the outer peripheral area SA. In other words, the intermediate straight route is a straight line-shaped travel route element set constituting a straight line part connecting a turning route at the start of U-turn travel with a turning route at the end of U-turn travel, and is a route provided parallel to each side of the area CA to be worked within the outer peripheral area SA. In work travel that begins as spiral travel and then switches to linear back-and-forth travel midway through, the unharvested area will become smaller than the area CA to be worked on all sides, depending on the spiral travel. Accordingly, executing U-turn travel within the area CA to be worked is better, in terms of making the work travel efficient, than expressly moving to the outer peripheral area SA. This eliminates wasteful travel and is efficient. Thus when executing U-turn travel in the area CA to be worked, the intermediate straight route is moved inward in a parallel manner, in accordance with the position of the outer peripheral line of the unharvested area.

In FIG. 7, the shape of the area CA to be worked is a deformed quadrangle. As such, there are four sides serving as references for generating the mesh route element set. Here, if the area CA to be worked is a rectangle or a square, there are two sides serving as references for generating the mesh route element set. In this case, the mesh route element set has a simpler structure.

In this embodiment, the route managing unit 60 is provided with the rectangular route element calculating unit 602 as an optional travel route element calculating unit. The travel route element set calculated by the rectangular route element calculating unit 602 is, as illustrated in FIG. 3, a parallel straight line set (corresponding to a "parallel line set" according to the present invention) which extends parallel to a reference side, e.g., the longest side, selected from the sides constituting the outer shape of the area CA to be worked, and which covers the area CA to be worked with the work width (completely covers with the work width). The travel route element set calculated by the rectangular route element calculating unit 602 divides the area CA to be worked into rectangular shapes. Furthermore, the travel route element set is an aggregate of parallel straight lines sequentially connected by U-turn travel routes over which the harvester 1 executes U-turn travel (corresponding to "parallel lines" according to the present invention). In other words, if the travel over one travel route element that is a parallel straight line ends, the U-turn route calculating unit 603 determines the U-turn travel route for moving to the next selected travel route element.

The U-turn route calculating unit 603 calculates the U-turn travel route for connecting two travel route elements, which have been selected from the travel route element set calculated by the rectangular route element calculating unit 602, using U-turn travel. Once the outer peripheral area SA and so on have been set, the U-turn route calculating unit 603 calculates a single intermediate straight route parallel to the outer peripheral side of the area CA to be worked, for each area of the outer peripheral area SA corresponding to outer peripheral sides (outer sides) of the area CA to be worked, on the basis of the outer shape and outer dimensions of the outer peripheral area SA, the outer shape and outer dimensions of the area CA to be worked, the turn radius of the harvester 1, and so on. Additionally, when normal U-turn travel and switchback turn travel are executed, the U-turn route calculating unit 603 calculates a start-side turning route connecting the travel route element currently traveled and the corresponding intermediate straight route, and an end-side turning route connecting the corresponding intermediate straight route and the destination travel route element. The principles of generating the U-turn travel route will be described later.

As illustrated in FIG. 6, the control unit 5 of the harvester 1, which constitutes the second travel route managing module CM2, is provided with various functions for executing work travel. The control unit 5 is configured as a computer system, and is provided with an output processing unit 7, an input processing unit 8, and a communication processing unit 70, as an input/output interface. The output processing unit 7 is connected to a vehicle travel device group 71, the work device group 72, a notifying device 73, and so on provided in the harvester 1. The vehicle travel device group 71 includes devices that are controlled so that the vehicle can travel, such as a steering device for adjusting the speed of left and right crawlers of the vehicle body 11 to execute steering, as well as a shifting mechanism, an engine unit, and so on (not shown). The work device group 72 includes devices constituting the harvesting section 15, the threshing device 13, the discharge device 18, and so on. The notifying device 73 includes a display, a lamp, a speaker, and the like.

The outer shape of the field, as well as various types of notification information such as already-traveled travel routes (travel trajectories) and travel routes to be traveled next, are displayed in the display in particular. The lamp and speaker are used to notify the occupant (driver or monitoring party) of caution information or warning information such as travel caution items, deviation from target travel routes during autonomously-steered travel, and so on.

The communication processing unit 70 has a function for receiving data processed by the communication terminal 4, as well as sending data processed by the control unit 5. Accordingly, the communication terminal 4 can function as a user interface of the control unit 5. The communication processing unit 70 is furthermore used for exchanging data with the management computer 100, and thus has a function for handling a variety of communication formats.

The input processing unit 8 is connected to the satellite positioning module 80, a travel system detection sensor group 81, a work system detection sensor group 82, an automatic/manual toggle operation implement 83, and so on. The travel system detection sensor group 81 includes sensors that detect travel states, such as engine RPM, a shift state, and so on. The work system detection sensor group 82 includes a sensor that detects a height position of the harvesting section 15, a sensor that detects an amount held in the harvested crop tank 14, and so on. The automatic/manual toggle operation implement 83 is a switch that selects either an autonomous travel mode, which travels with autonomous steering, or a manual travel mode, which travels with manual steering. Additionally, a switch for switching between autonomous travel and traditional travel is provided in the driving section 12, or configured in the communication terminal 4.

Furthermore, the control unit 5 is provided with a travel control unit 51, a work control unit 52, the host vehicle position calculating unit 53, a notification unit 54, the work state evaluating unit 55, and the other vehicle positional relationship calculating unit 56. The host vehicle position calculating unit 53 calculates the host vehicle position on the basis of positioning data output from the satellite positioning module 80. Because the harvester 1 is configured to be capable of traveling through both autonomous travel (autonomous steering) and manual travel (manual steering), the travel control unit 51 that controls the vehicle travel device group 71 includes the autonomous travel controlling unit 511 and a manual travel controlling unit 512. The manual travel controlling unit 512 controls the vehicle travel device group 71 on the basis of operations made by the driver. The autonomous travel controlling unit 511 calculates directional skew and positional skew between the travel route set by the route setting unit 64 and the host vehicle position, generates autonomous steering commands, and outputs the commands to the steering device via the output processing unit 7. The work control unit 52 supplies control signals to the work device group 72 in order to control the operations of operation devices provided in the harvesting section 15, the threshing device 13, the discharge device 18, and so on that constitute the harvester 1. The notification unit 54 generates notification signals (display data, audio data, and so on) for notifying the driver, the monitoring party, or the like of necessary information through the notifying device 73, which is a display or the like. The work state evaluating unit 55 outputs the state information, which includes the states of the harvesters 1, the state of the work site, and commands from people (the monitoring party, a driver, an administrator, and the like), from the detection results from various types of sensors, operation results from various types of operational implements, and so on. If a plurality of harvesters 1 are working cooperatively, the other vehicle positional relationship calculating unit 56 calculates the other vehicle positional relationship, indicating the position of the other vehicle and the positional relationship between the host vehicle and the other vehicle. The host vehicle position and travel route elements selected by the host vehicle, and the other vehicle position and travel route elements selected by the other vehicle, are used in the calculation of the other vehicle positional relationship. Furthermore, the other vehicle positional relationship calculating unit 56 has a function for calculating an estimated contact position between the work vehicles.

In addition to controlling the steering, the autonomous travel controlling unit 511 can also control the vehicle speed. As described above, the vehicle speed is set through the communication terminal 4 by an occupant, for example, before work is started. The vehicle speeds that can be set include a vehicle speed used during travel for harvesting, a vehicle speed used during turning when not harvesting (U-turn travel and the like), a vehicle speed used when departing the area CA to be worked and traveling the outer peripheral area SA when unloading harvested crops or refueling, and so on. The autonomous travel controlling unit 511 calculates an actual vehicle speed on the basis of the positioning data obtained by the satellite positioning module 80. The output processing unit 7 sends, to the vehicle travel device group 71, speed change operation commands or the like for the travel speed variation device so that the actual vehicle speed matches the set vehicle speed.

Autonomous Travel Routes

As examples of autonomous travel in the work vehicle automatic traveling system, an example of linear back-and-forth travel, and an example of spiral travel will be described separately.

Figure 8:
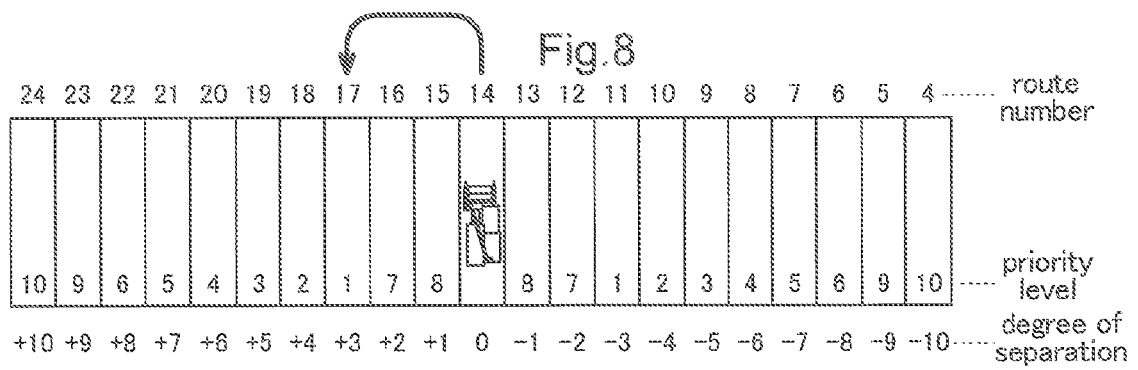
FIG. 8 is a diagram illustrating an example of a travel route element set calculated by a rectangular part element calculating unit.
Figure 9:
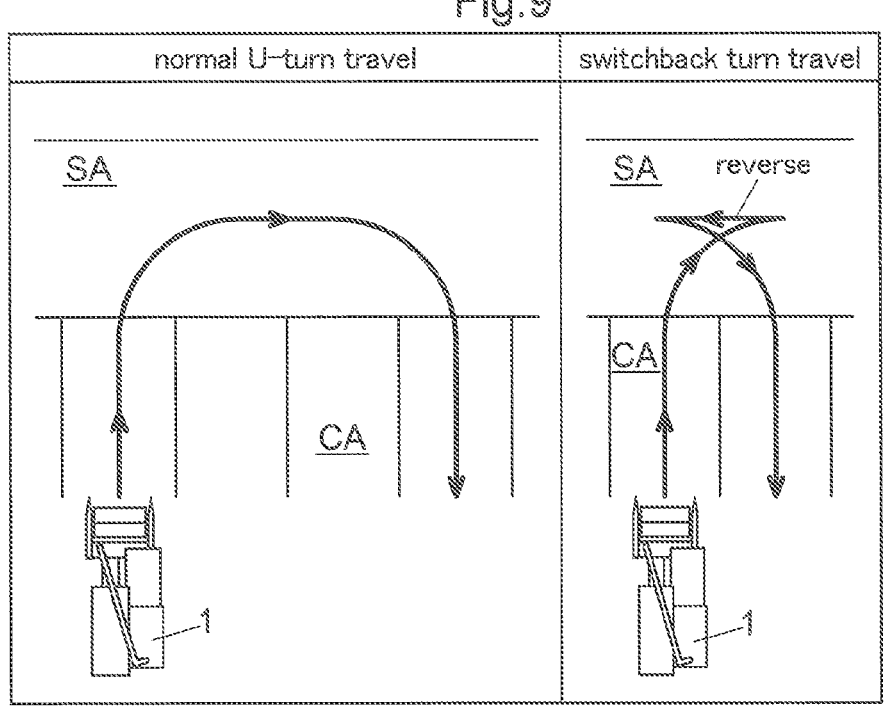
FIG. 9 is a diagram illustrating a normal U-turn and a switchback turn.

First, an example of linear back-and-forth travel using the travel route element set calculated by the rectangular route element calculating unit 602 will be described. FIG. 8 schematically illustrates a travel route element set constituted by 21 travel route elements expressed as rectangles with a shortened linear length, where route numbers are provided above each travel route element. The harvester 1 is positioned at the 14th travel route element when the work travel is started. The degrees of separation between the travel route element where the harvester 1 is positioned and the other travel route elements are indicated by the positive or negative integers provided below each of the routes. In FIG. 8, a priority level at which the harvester 1 positioned at the 14th travel route element is to move to the next travel route element is indicated by an integer value in the bottom part of each travel route element. A lower value indicates a higher priority level, and is selected preferentially. When moving from a travel route element for which travel has been completed to the next travel route element, the harvester 1 can execute normal U-turn travel, which is indicated in FIG. 9, or switchback turn travel. Here, normal U-turn travel is travel for moving to the next travel route element past at least two travel route elements. Switchback turn travel, on the other hand, is travel that enables movement passing less than two travel route elements, i.e., movement to an adjacent travel route element. In normal U-turn travel, the harvester 1 switches directions by approximately 180° upon entering the outer peripheral area SA from the endpoint of the travel route element being traveled, and enters an endpoint of the destination travel route element. If there is a large gap between the travel route element being traveled and the destination travel route element, the harvester 1 makes a turn of approximately 90°, continues straight for a corresponding distance, and then makes another approximately 90° turn. In other words, normal U-turn travel is executed using forward travel only. On the other hand, in switchback turn travel, when entering the outer peripheral area SA from an endpoint of the travel route element being traveled, the harvester 1 first turns approximately 90°, reverses to a position for entering into the destination travel route element smoothly using an approximately 90° turn, and then proceeds toward the endpoint of the destination travel route element. Although this does complicate the steering control, it also makes it possible to move to a travel route element only a short interval away.

The selection of the next travel route element to be traveled is made by the route element selecting unit 63. In this embodiment, basic priority levels for selecting the travel route element is set. In these basic priority levels, the priority level of a properly-distanced travel route element is set to be the highest. The "properly-distanced travel route element" is a travel route element separated by a predetermined distance from the previous travel route element in the order. The priority level is set to be lower for travel route elements further from the previous travel route element in the order than the properly-distanced travel route element. For example, when moving to the next travel route element, normal U-turn travel, which has a short travel distance, also has a short travel time and is therefore efficient. Accordingly, the priority level is set to the highest level (priority level=1) for the travel route elements that skip two spaces to the left and right. Travel route elements that from the perspective of the harvester 1 are located further than the stated travel route elements have longer normal U-turn travel times as the distance from the harvester 1 increases. Accordingly, the priority level is set to be lower (priority level=2, 3, . . . ) as the distance from the harvester 1 increases. In other words, the numerical value of the priority level indicates an order of priority. However, when moving to a travel route element that skips eight spaces, normal U-turn travel has a longer travel time and is less efficient than switchback turn travel. Accordingly, the priority level for movement to a travel route element that skips eight spaces is lower than that for switchback turn travel. In switchback turn travel, the priority level for moving to a travel route element that skips one space is higher than the priority level for moving to the adjacent travel route element. This is because switchback turn travel to an adjacent travel route element requires sharp steering, which is likely to damage the field. Although the movement to the next travel route element can be made in either the left or right direction, a rule that prioritizes movement to a travel route element to the left or movement to a travel route element to the right is employed in accordance with conventional work customs. Thus in the example illustrated in FIG. 8, the harvester 1 located at route number 14 selects the travel route element having a route number of 17 as the travel route element to be traveled to next. The priority level setting is carried out when the harvester 1 enters a new travel route element.

Figure 10:
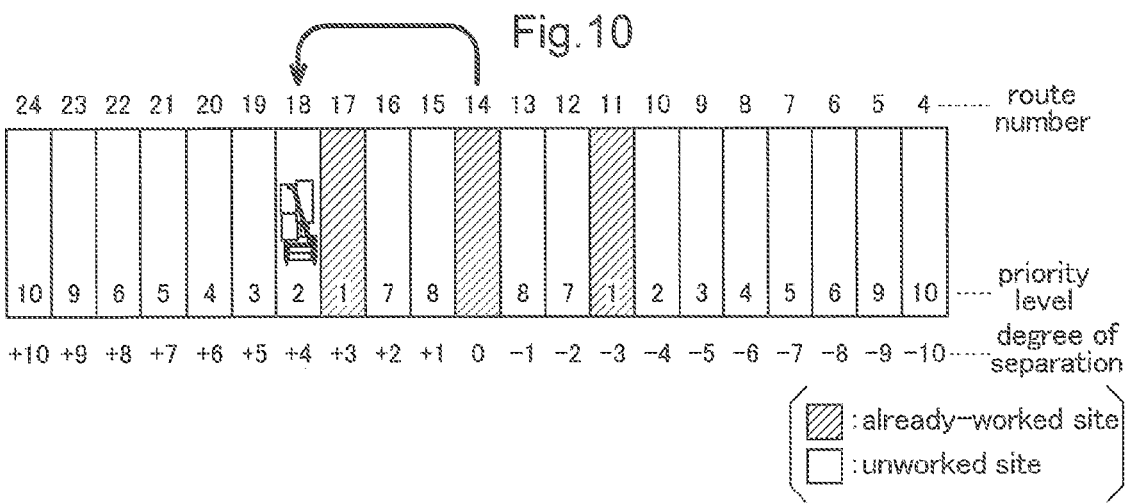
FIG. 10 is a diagram illustrating an example of the selection of a travel route element in the travel route element set illustrated in FIG. 8.

A travel route element that has already been selected, i.e., a travel route element for which work has been completed is, as a rule, prohibited from being selected. Thus as illustrated in FIG. 10, if, for example, route number 11 or route number 17, which have priority levels of 1, are already-worked sites (already-harvested sites), the harvester 1 located at route number 14 selects the travel route element having a route number of 18, which has a priority level of 2, as the travel route element to be traveled next.

FIG. 11 illustrates an example of spiral travel using travel route elements calculated by the mesh route element calculating unit 601. The outer peripheral area SA and the area CA to be worked in the field illustrated in FIG. 11 are the same as those illustrated in FIG. 7, as is the travel route element set that has been set for the area CA to be worked. Here, for descriptive purposes, travel route elements taking the first side S1 as a reference line are indicated by L11, L12, and so on, travel route elements taking the second side S2 as a reference line are indicated by L21, L22, and so on, travel route elements taking the third side S3 as a reference line are indicated by L31, L32, and so on, and travel route elements taking the fourth side S4 as a reference line are indicated by L41, L42, and so on.

The bold lines in FIG. 11 represent a spiral-shaped travel route traveled by the harvester 1 from the outside toward the inside. The travel route element L11, which is located in the outermost pass of the area CA to be worked, is selected as the first travel route. A route change of substantially 90° is made at the point of intersection between the travel route element L11 and the travel route element L21, after which the harvester 1 travels on the travel route element L21. Furthermore, a route change of substantially 70° is made at the point of intersection between the travel route element L21 and the travel route element L31, after which the harvester 1 travels on the travel route element L31. A route change of substantially 110° is made at the point of intersection between the travel route element L31 and the travel route element L41, after which the harvester 1 travels on the travel route element L41. Next, the harvester 1 moves to the travel route element L12 on the inside of the travel route element L11 at the point of intersection between the travel route element L12 and the travel route element L41. By repeating such travel route element selection, the harvester 1 executes work travel in a spiral shape, moving from the outside to the inside of the area CA to be worked in the field. Thus when a spiral travel pattern is set, the harvester 1 switches directions by making route changes at the points of intersection between travel route elements that both have an untraveled attribute and are located in the outermost pass of the area CA to be worked.

FIG. 12 illustrates an example of U-turn travel using the same travel route element set as that illustrated in FIG. 11. First, the travel route element L11, which is located in the outer pass of the area CA to be worked, is selected as the first travel route. The harvester 1 passes a following end (endpoint) of the travel route element L11, enters the outer peripheral area SA, makes a 90° turn so as to follow the second side S2, and furthermore makes another 90° turn so as to enter a leading end (endpoint) of the travel route element L14 extending parallel to the travel route element L11. As a result, the harvester 1 moves from the travel route element L11 to the travel route element L14 having skipped two travel route elements, through normal U-turn travel of 180°. Furthermore, after traveling the travel route element L14 and entering the outer peripheral area SA, the harvester 1 executes normal U-turn travel of 180°, and then moves to the travel route element L17 extending parallel to the travel route element L14. In this matter, the harvester 1 moves from the travel route element L17 to a travel route element L110, and furthermore from the travel route element L110 to the travel route element L16, ultimately completing the work travel for the entire area CA to be worked in the field. As is clear from the foregoing descriptions, the example of linear back-and-forth travel using the travel route element set from the rectangular route element calculating unit 602, which has been described using FIGS. 8, 9, and 10, can also be applied to the linear back-and-forth travel using the travel route elements calculated by the mesh route element calculating unit 601.

Accordingly, linear back-and-forth travel can be achieved using a travel route element set that divides the area CA to be worked into rectangular shapes, as well as using a travel route element set that divides the area CA to be worked into a mesh shape. To rephrase, a travel route element set that divides the area CA to be worked into a mesh shape can be used in linear back-and-forth travel, spiral travel, and zigzag travel, and furthermore, the travel pattern can be changed from spiral travel to linear back-and-forth travel midway through the work.

Principle of Generating U-Turn Travel Route

Figure 13:
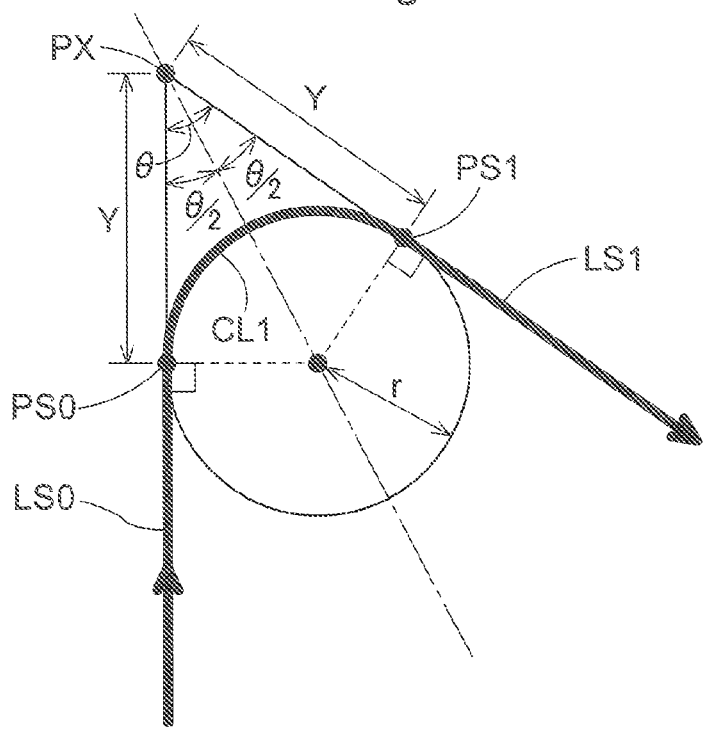
FIG. 13 is a diagram illustrating the basic principle of generating a U-turn travel route.

A basic principle by which the U-turn route calculating unit 603 generates a U-turn travel route will be described using FIG. 13. FIG. 13 illustrates a U-turn travel route in which the harvester 1 moves from a travel route element corresponding to the start of the turn, indicated by LS0, to a travel route element indicating the destination of the turn, indicated by LS1. In normal travel, if LS0 is a travel route element in the area CA to be worked, LS1 is typically a travel route element in the outer peripheral area SA (an intermediate straight route), whereas if LS1 is a travel route element in the area CA to be worked, LS0 is typically a travel route element in the outer peripheral area SA (an intermediate straight route). A linear equation (or two points on the straight lines) for the travel route elements LS0 and LS1 are recorded in memory, and the point of intersection between the two (indicated by PX in FIG. 13) and an angle of intersection (indicated by 0 in FIG. 13) are calculated from that linear equation. Next, an inscribed circle contacting both the travel route element LS0 and the travel route element LS1, and having a radius equivalent to the minimum turn radius of the harvester 1 (indicated by r in FIG. 13), is calculated. An arc (part of the inscribed circle) connecting the points of contact between the travel route elements LS0 and LS1 with the inscribed circle (indicated by PS0 and PS1 in FIG. 13) corresponds to the turning route. Accordingly, a distance Y to a point of contact between the intersection point PX of the travel route elements LS0 and LS1, and the points of contact, is given by:

$$Y=r/(\tan(\theta/2))$$

Because the minimum turn radius is substantially set by the specifications of the harvester 1, r is a control value. Note that r need not be the same value as the minimum turn radius. A less extreme turn radius may be set in advance by the communication terminal 4 or the like, and the turn operation may be programmed so as to follow that turn radius. In terms of travel control, the harvester 1 starts the turning travel when the positional coordinates (PS0) where the distance to the point of intersection is Y are reached while traveling the travel route element LS0 where the turn starts; next, the turning travel ends when a difference between the direction of the harvester 1 during turning travel and the direction of the travel route element LS1 serving as the turn destination falls within a permissible value. At this time, the turn radius of the harvester 1 need not perfectly match the radius r. Controlling the steering on the basis of the distance and directional difference from the travel route element LS1 serving as the turn destination makes it possible for the harvester 1 to move to the travel route element LS1 serving as the turn destination.

Figure 14:
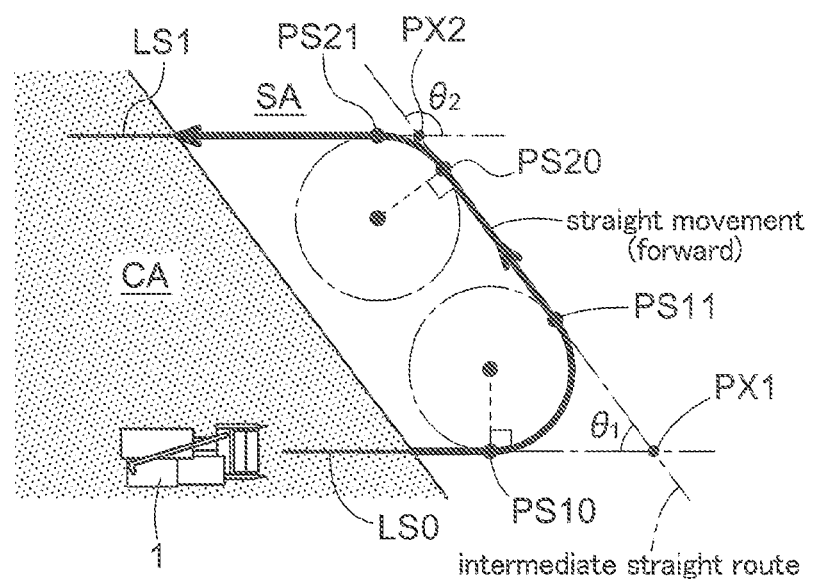
FIG. 14 is a diagram illustrating an example of a U-turn travel route generated on the basis of the generation principle illustrated in FIG. 13.
Figure 15:
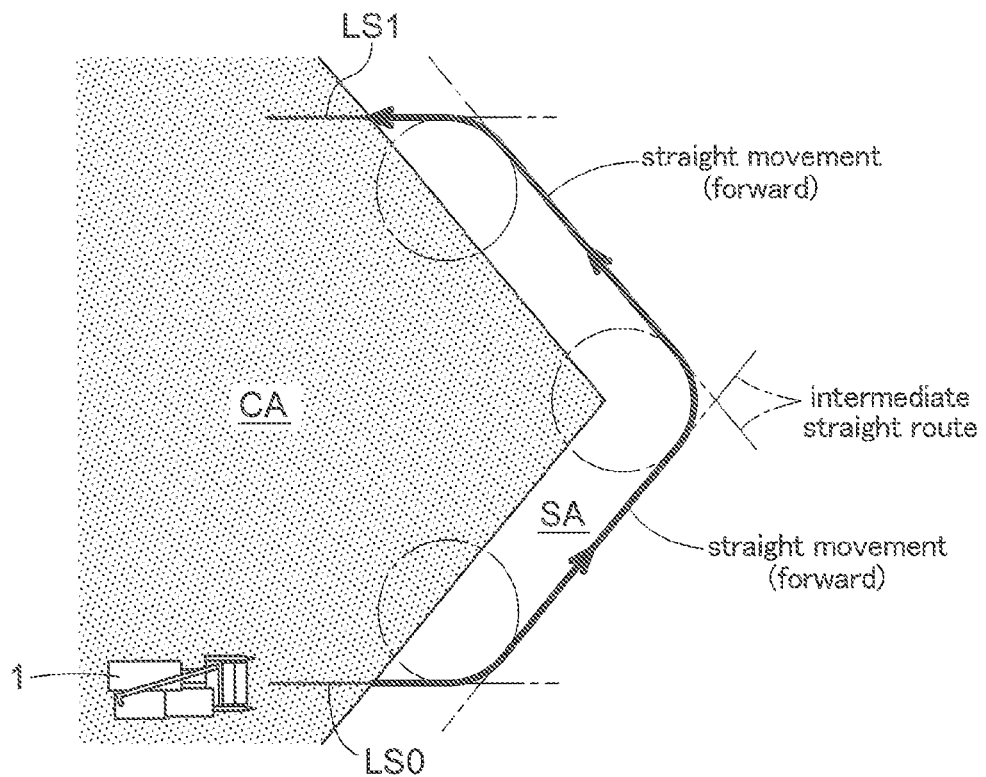
FIG. 15 is a diagram illustrating an example of a U-turn travel route generated on the basis of the generation principle illustrated in FIG. 13.
Figure 16:
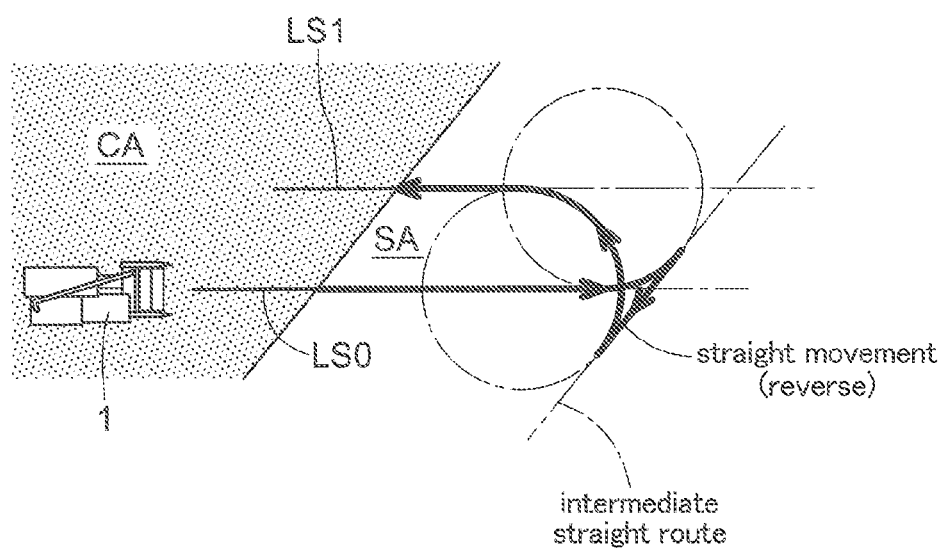
FIG. 16 is a diagram illustrating an example of a U-turn travel route generated on the basis of the generation principle illustrated in FIG. 13.

FIGS. 14, 15, and 16 illustrate three specific examples of U-turn travel. In FIG. 14, the travel route element LS0 where the turn is started and the travel route element LS1 serving as the turn destination extend at an angle from an outer side of the area CA to be worked, but may extend perpendicular as well. Here, the U-turn travel route in the outer peripheral area SA is constituted by lines extending from the travel route element LS0 and the travel route element LS1 into the outer peripheral area SA, an intermediate straight route corresponding to part (a line segment) of the travel route element in the outer peripheral area SA, and two arc-shaped turning routes. This U-turn travel route can also be generated according to the basic principle described using FIG. 13. An angle of intersection θ1 and a point of intersection PX1 between the intermediate straight route and the travel route element LS0 where the turn is started, and an angle of intersection θ2 and a point of intersection PX2 between the intermediate straight route and the travel route element LS1 serving as the destination of the turn, are calculated. Furthermore, the positional coordinates of contact points PS10 and PS11 where the inscribed circle having the radius r (=the turn radius of the harvester 1) makes contact with the travel route element LS0 where the turn is started and the intermediate straight route, and the positional coordinates of contact points PS20 and PS21 where the inscribed circle having the radius r makes contact with the intermediate straight route and the travel route element LS1 serving as the destination of the turn, are calculated as well. The harvester 1 begins the turns at the contact points PS10 and PS20. Likewise, a U-turn travel route for an area CA to be worked, which has been formed protruding in a triangular shape as indicated in FIG. 15, that skirts around that protruding triangular shape, can be generated in the same manner. The points of intersection between the travel route elements LS0 and LS1 and two intermediate straight routes corresponding to parts (line segments) of the travel route element in the outer peripheral area SA are found. The basic principle described using FIG. 13 is applied in the calculation of those points of intersection.

FIG. 16 illustrates turning travel achieved through switchback turn travel, where the harvester 1 moves from the travel route element LS0 where the turn is started to the travel route element LS1 serving as the destination of the turn. In this switchback turn travel, an inscribed circle having the radius r, which makes contact with an intermediate straight route that is a part (a line segment) of the travel route element in the outer peripheral area SA and that is parallel to an outer side of the area CA to be worked, and also makes contact with the travel route element LS0, is calculated. Additionally, an inscribed circle having the radius r, which makes contact with the stated intermediate straight route and the travel route element LS1, is also calculated. In accordance with the basic principle described using FIG. 13, the positional coordinates of the points of contact between the two inscribed circles and the intermediate straight route, the positional coordinates of the points of contact between the travel route element LS0 where the turn is started and the inscribed circle, and the positional coordinates of the point of contact between the travel route element LS1 serving as the destination of the turn and the inscribed circle are calculated. The U-turn travel route for switchback turn travel is generated as a result. Note that the harvester 1 travels in reverse in the intermediate straight route in this switchback turn travel.

Travel for Switching Directions in Spiral Travel

Figure 17:
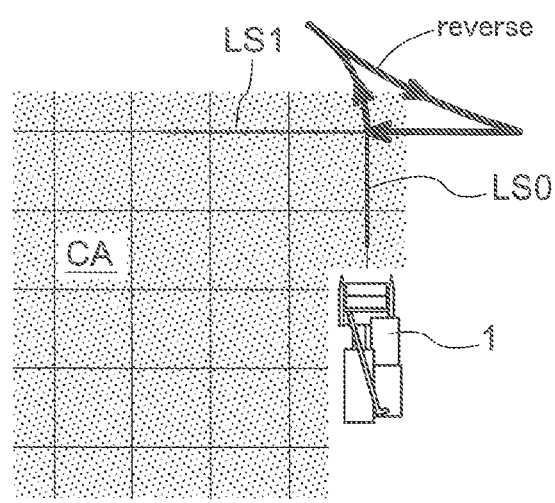
FIG. 17 is a diagram illustrating an α-turn travel route in a mesh-shaped travel route element set.

FIG. 17 illustrates an example of travel for switching directions, used for changing the route at a point of intersection corresponding to the route changeable point of the travel route element, in the above-described spiral travel. This travel for switching directions will be referred to as α-turn travel hereinafter. The travel route (α-turn travel route) in this α-turn travel is one kind of a so-called counter travel route, and is a route extending from the point of intersection between the travel route element where the travel starts (indicated by LS0 in FIG. 17) and the travel route element serving as the destination of the turn (indicated by LS1 in FIG. 17), passing forward through a turning route, and making contact with a travel route element serving as the destination of the turn through a turning route in reverse. The α-turn travel route is standardized, and thus the α-turn travel route generated in accordance with the angle of intersection between the travel route element where the travel starts and the travel route element serving as the destination of the turn is registered in advance. Accordingly, the route managing unit 60 reads out the proper α-turn travel route on the basis of the calculated angle of intersection, and provides the route setting unit 64 with the α-turn travel route. However, a configuration in which an automatic control program is registered in the autonomous travel controlling unit 511 for each angle of intersection, and the autonomous travel controlling unit 511 reads out the proper automatic control program on the basis of the angle of intersection calculated by the route managing unit 60, may be employed instead of this configuration.

Route Selection Rules

The route element selecting unit 63 sequentially selects the travel route elements on the basis of travel patterns input manually from a work plan manual received from the management center KS or from the communication terminal 4 (e.g., a linear back-and-forth travel pattern or a spiral travel pattern), the host vehicle position, and the state information output from the work state evaluating unit 55. In other words, unlike a case where the overall travel route is formed in advance on the basis of a set travel pattern alone, a more appropriate travel route is formed, which handles circumstances that cannot be predicted before the work. In addition to the above-described basic rules, the route element selecting unit 63 has route selection rules A1 to A12, such as those described below, registered in advance, and the appropriate route selection rule is applied in accordance with the travel pattern and the state information.

(A1) When the monitoring party (occupant) has made an operation requesting a switch from autonomous travel to manual travel, the selection of travel route elements by the route element selecting unit 63 is stopped after preparations for manual travel are complete. Such operations include operating the automatic/manual toggle operation implement 83, operating a braking implement (and making a sudden stop in particular), steering by greater than or equal to a predetermined steering angle using a steering implement (a steering lever or the like), and so on. Furthermore, if the travel system detection sensor group 81 includes a sensor that detects the absence of the monitoring party required to be present during autonomous travel, e.g., a weight detection sensor provided in a seat or a seatbelt fastening detection sensor, the autonomous travel control can be stopped on the basis of a signal from that sensor. In other words, when it is detected that the monitoring party is absent, the start of the autonomous travel control, or the travel of the harvester 1 itself, is stopped. Additionally, a configuration may be employed in which a fine adjustment is made to the travel direction rather than stopping the autonomous travel control when the steering implement is operated at a steering angle that is extremely small and is smaller than the predetermined steering angle.

(A2) The autonomous travel controlling unit 511 monitors a relationship (distance) between an outer line position of the field and the host vehicle position based on the positioning data. Then, the autonomous travel controlling unit 511 controls the autonomous travel so as to avoid contact between the ridge and the vehicle when turning in the outer peripheral area SA. Specifically, the autonomous travel is stopped and the harvester 1 is stopped, the type of turning travel is changed (changed from normal U-turn travel to switchback turn travel or α-turn travel), a travel route that does not pass through that area is set, or the like. A configuration in which a warning such as "caution, narrow turning area" is provided may also be employed.

(A3) When the harvested crop tank 14 is full or almost full of harvested crops, and it is necessary to unload the harvested crops, an unload request (a type of request for deviating from the work travel in the area CA to be worked), which is one type of state information, is issued from the work state evaluating unit 55 to the route element selecting unit 63. In this case, appropriate travel route elements (e.g., travel route elements providing the shortest possible route) for deviating from the work travel in the area CA to be worked and traveling toward the parking position through the outer peripheral area SA are selected from elements in the travel route element set for the outer peripheral area SA that have a departure route attribute value, and elements in the travel route element set for the area CA to be worked, on the basis of the parking position for unloading to the transport vehicle CV at the ridge and the host vehicle position.

(A4) If the remaining fuel in the fuel tank is determined to be low on the basis of a remaining fuel value calculated from a signal from a remaining fuel sensor and the like, a refueling request (a type of departure request) is made. As with (A3), appropriate travel route elements leading to a refueling position (e.g., travel route elements providing the shortest possible route) are selected on the basis of a parking position corresponding to a pre-set refueling position and the host vehicle position.

(A5) When deviating from work travel in the area CA to be worked and entering the outer peripheral area SA, it is necessary to once again return to the area CA to be worked. As a travel route element serving as a starting point for returning to the area CA to be worked, the travel route element closest to the point of departure, or the travel route element closest to the current position in the outer peripheral area SA, is selected from elements in the travel route element set for the outer peripheral area SA that have a return route attribute value, and elements in the travel route element set for the area CA to be worked.

(A6) When deviating from work travel in the area CA to be worked in order to unload harvested crops or refuel, and then determining a travel route for returning to the area CA to be worked, a travel route element in the area CA to be worked that has already been worked (already traveled) and has thus been given a "travel prohibited" attribute is restored as a travel route element that can be traveled. When selecting an already-worked travel route element makes it possible to save a predetermined amount of time or more, that travel route element is selected. Furthermore, reverse travel can be used for the travel in the area CA to be worked when departing from the area CA to be worked.

(A7) The timing for deviating from work travel in the area CA to be worked in order to unload harvested crops or refuel is determined on the basis of the margin thereof, and the travel time or travel distance to the parking position. In terms of unloading harvested crops, the margin is the predicted travel time or travel distance until the harvested crop tank 14 becomes full from the current amount being held. In terms of refueling, the margin is the predicted travel time or travel distance until the fuel in the fuel tank is completely exhausted from the current remaining amount. For example, when passing close to a parking position for unloading during autonomous travel, whether having the harvester 1 pass the parking position and then deviate after becoming full and return to the parking position or having the harvester 1 unload while passing nearby the parking position will ultimately be more efficient travel (whether the total work time is shorter, the total travel distance is shorter, and so on) is determined on the basis of the margin, the time required for the unloading work, and the like. Carrying out the unloading work when there is a very small amount of harvested crops increases the overall number of instances of unloading, and is thus inefficient, whereas if the tank is almost full, it is more efficient to unload at that time.

Figure 18:
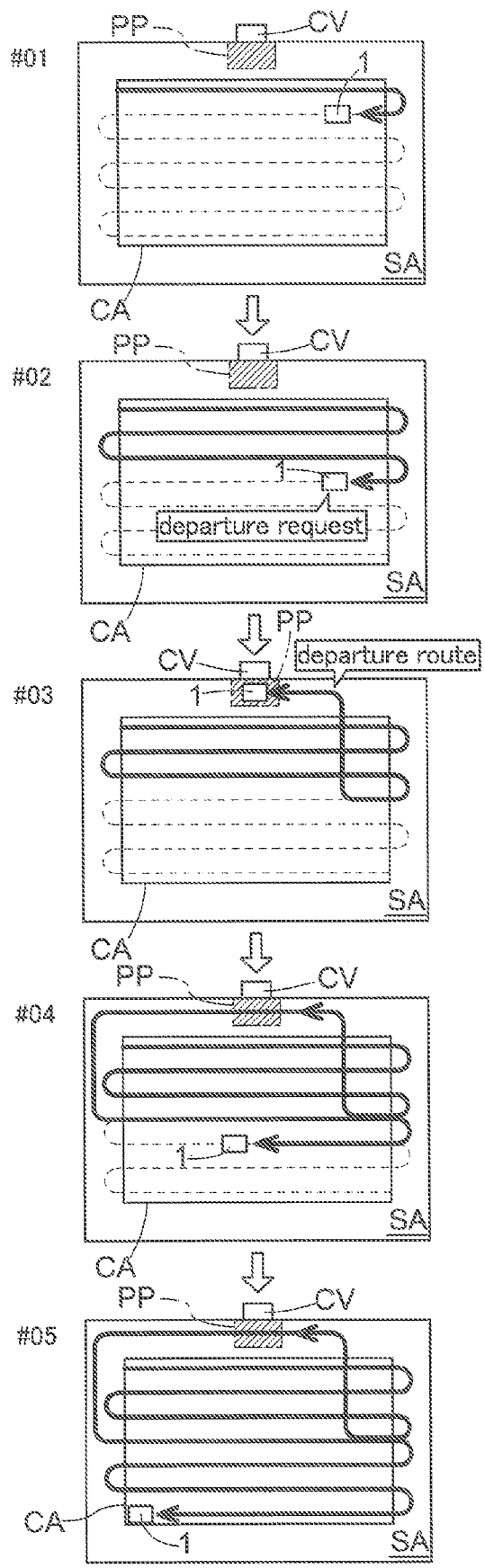
FIG. 18 is a diagram illustrating a case where, after departing an area to be worked, the work travel does not resume from the work travel that had been carried out before departing from the work travel.

(A8) FIG. 18 illustrates a case where the travel route element selected in work travel resumed after departing the area CA to be worked is not a continuation of the pre-departure work travel. In this case, a linear back-and-forth travel pattern such as that illustrated in FIGS. 3 and 12 is set in advance. In FIG. 18, the parking position is indicated by the sign PP, and a travel route in a case where work travel was successfully completed for the area CA to be worked through linear back-and-forth travel involving 180° U-turn travel is indicated by a dotted line as a comparative example. The actual travel trajectory is indicated by a bold solid line. As the work travel progresses, the straight line-shaped travel route elements and the U-turn travel route are selected in sequence (step #01).

When a departure request is issued midway through the work travel (step #02), a travel route progressing from the area CA to be worked to the outer peripheral area SA is calculated. At this point, two routes are conceivable: a route in which the harvester 1 continues to progress along the travel route element currently being traveled and exits to the outer peripheral area SA; and a route in which the harvester 1 turns 90° from the travel route element currently being traveled, passes through an already-harvested site (=an aggregate of travel route elements having "already traveled" attributes), and exits to the outer peripheral area SA where the parking position is located. Here, the latter route, which has a shorter travel distance, is selected (step #03). In this latter instance of departure travel, an element obtained by moving a travel route element set in the outer peripheral area SA parallel as far as the departure point is used as a departure travel route element in the area CA to be worked after the 90° turn. However, if the departure request is made with leeway in terms of time, the former route is selected. In the former instance of departure travel, the harvesting work is continued during the departure travel in the area CA to be worked, which is beneficial in terms of the work efficiency.

Upon deviating from the work travel in the area CA to be worked, executing departure travel through the area CA to be worked and the outer peripheral area SA, and reaching the parking position, the harvester 1 receives support from the work support vehicle. In this example, the harvested crops held in the harvested crop tank 14 are unloaded to the transport vehicle CV.

Once the harvested crops have been completely unloaded, it is necessary to return to the point where the departure request was issued, in order to return to the work travel. In the example of FIG. 18, an unworked part remains in the travel route element that was being traveled when the departure request was issued, and thus the harvester 1 returns to that travel route element. Accordingly, the harvester 1 selects a travel route element in the outer peripheral area SA from the parking position, travels counterclockwise, and upon reaching the endpoint of the target travel route element, turns by 90° at that point, enters the travel route element, and executes the work travel. If the point where the departure request was made has been passed, the harvester 1 travels without working, passes through a U-turn travel route, and then executes work travel for the next travel route element (step #04). The harvester 1 then continues with linear back-and-forth travel, and completes the work travel in the area CA to be worked (step #05).

(A9) If the position of a travel obstacle within the field is included in the inputted work site data, or if the harvester 1 includes an obstacle position detection device, a travel route element for obstacle avoidance travel is selected on the basis of the position of the obstacle and the host vehicle position. The selection rules for avoiding an obstacle include a rule that selects travel route elements providing a circumventing route that comes as close as possible to the obstacle, a rule that selects travel route elements so that the harvester 1 first exits to the outer peripheral area SA and then follows a linear route where no obstacle is present when entering the area CA to be worked, and so on.

(A10) If, when a spiral travel pattern such as that illustrated in FIGS. 4 and 11 is set, the travel route element to be selected is short, the spiral travel pattern is automatically changed to the linear back-and-forth travel pattern. This is because when the surface area is limited, spiral travel including α-turn travel carried out forward and in reverse tends to be inefficient.

(A11) If, when traveling through traditional travel, the number of unworked sites, i.e., the number of unworked (untraveled) travel route elements in the travel route element set of the area CA to be worked, has become less than or equal to a predetermined number, the traditional travel is automatically switched to autonomous travel. Additionally, if the harvester 1 is working through spiral travel from the outside toward the inside of an area CA to be worked that is covered by a mesh line set, the travel pattern is automatically switched from a spiral travel pattern to a linear back-and-forth travel pattern when the surface area of the remaining unworked site has become small and the number of unworked travel route elements has become less than or equal to a predetermined value. In this case, as described above, a travel route element having the "intermediate straight route" attribute is moved parallel from the outer peripheral area SA to the vicinity of the unworked site in the area CA to be worked, in order to avoid wasteful travel.

(A12) In fields of rice, wheat, or the like, causing the harvester 1 to travel parallel to the rows (furrows) where seedlings are planted can improve the efficiency of the harvesting work. Thus in the selection of travel route elements by the route element selecting unit 63, a travel route element that is closer to being parallel to the rows is made more likely to be selected. However, if, when starting the work travel, the machine is not in an attitude or position parallel to the road direction, the configuration is such that travel for bringing the machine to an attitude parallel to the rows is executed while working even if that travel follows the direction intersecting with the road direction. This makes it possible to reduce wasteful travel (non-work travel) and end the work quickly.

Cooperative Travel Control

Figure 19:
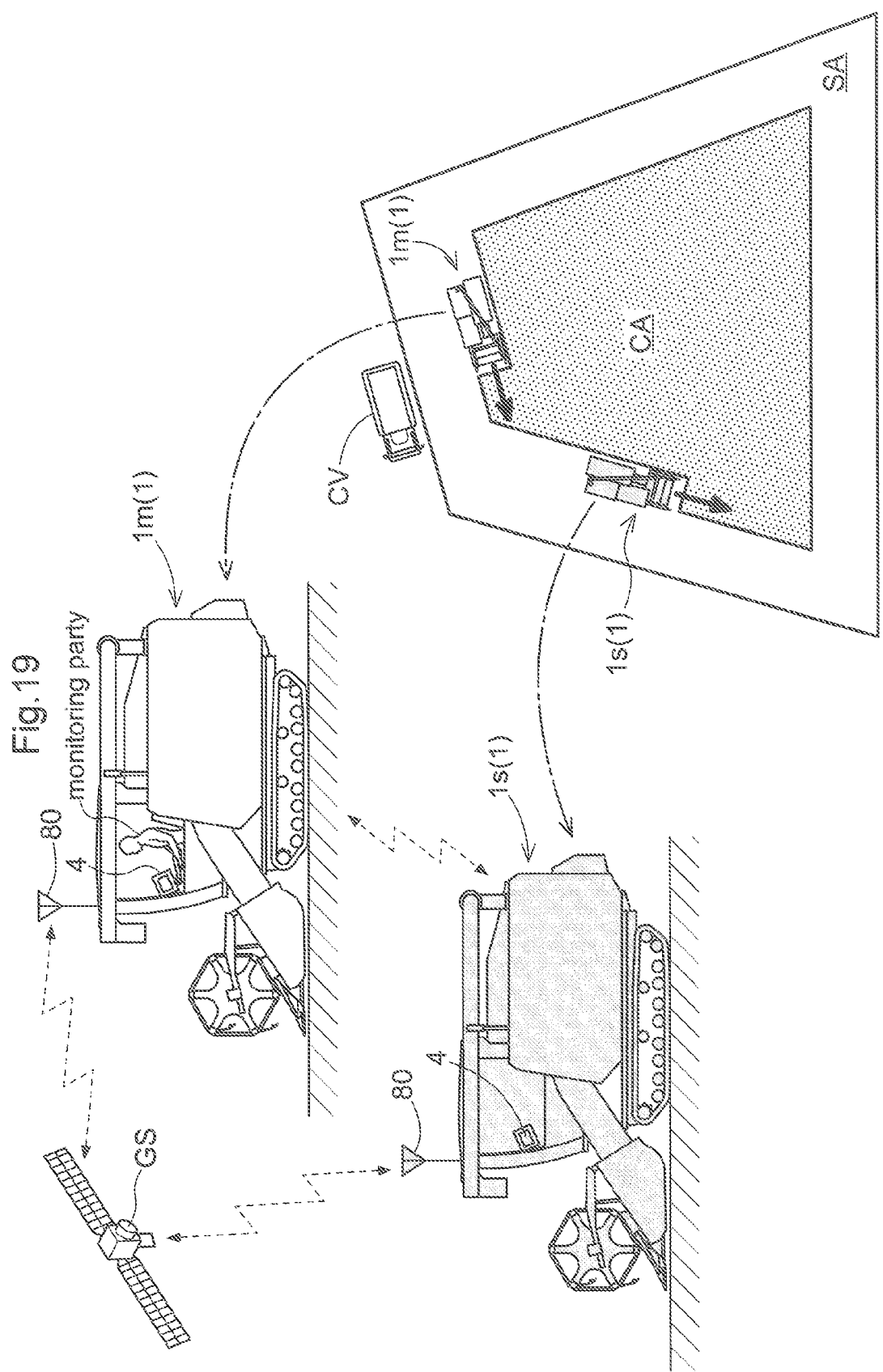
FIG. 19 is a diagram illustrating work travel by multiple harvesters subjected to cooperative control.

Work travel in the work vehicle automatic traveling system when a plurality of work vehicles are introduced will be described next. For the sake of simplicity, a case where two harvesters 1 execute work travel (autonomous travel) will be described here. FIG. 19 illustrates a first work vehicle functioning as a master harvester 1m, and a second work vehicle functioning as a slave harvester 1s, executing work travel in a single field in cooperation with each other. Although the two harvesters 1 are given the names "master harvester 1m" and "slave harvester 1s" to distinguish between the two, these may simply be referred to as "harvesters 1" when it is not necessary to distinguish between the two. A monitoring party occupies the master harvester 1m, and the monitoring party operates the communication terminal 4 which s/he has brought into the master harvester 1m. The terms "master" and "slave" are used here for the sake of simplicity, but these do not indicate a master/slave relationship; rather, the master harvester 1m and the slave harvester 1s execute autonomous travel with independent routes set on the basis of the above-described travel route setting routines (the travel route element selection rules). However, data communication can be carried out between the master harvester 1m and the slave harvester 1s through the respective communication processing units 70, and state information, corresponding to the work travel states, can be exchanged. The communication terminal 4 can not only supply commands from the monitoring party and data pertaining to the travel route to the master harvester 1m, but can also supply commands from the monitoring party and data pertaining to the travel route to the slave harvester 1s via the communication terminal 4 and the master harvester 1m. For example, the state information output from the work state evaluating unit 55 of the slave harvester 1s is also transferred to the master harvester 1m, and the state information output from the work state evaluating unit 55 of the master harvester 1m is also transferred to the slave harvester 1s. Accordingly, both route element selecting units 63 have functions for selecting the next travel route elements in consideration of both instances of state information and both host vehicle positions. When the route managing unit 60 and the route element selecting unit 63 are provided in the communication terminal 4, both harvesters 1 supply the state information to the communication terminal 4 and receive the next travel route element selected there.

Figure 20:
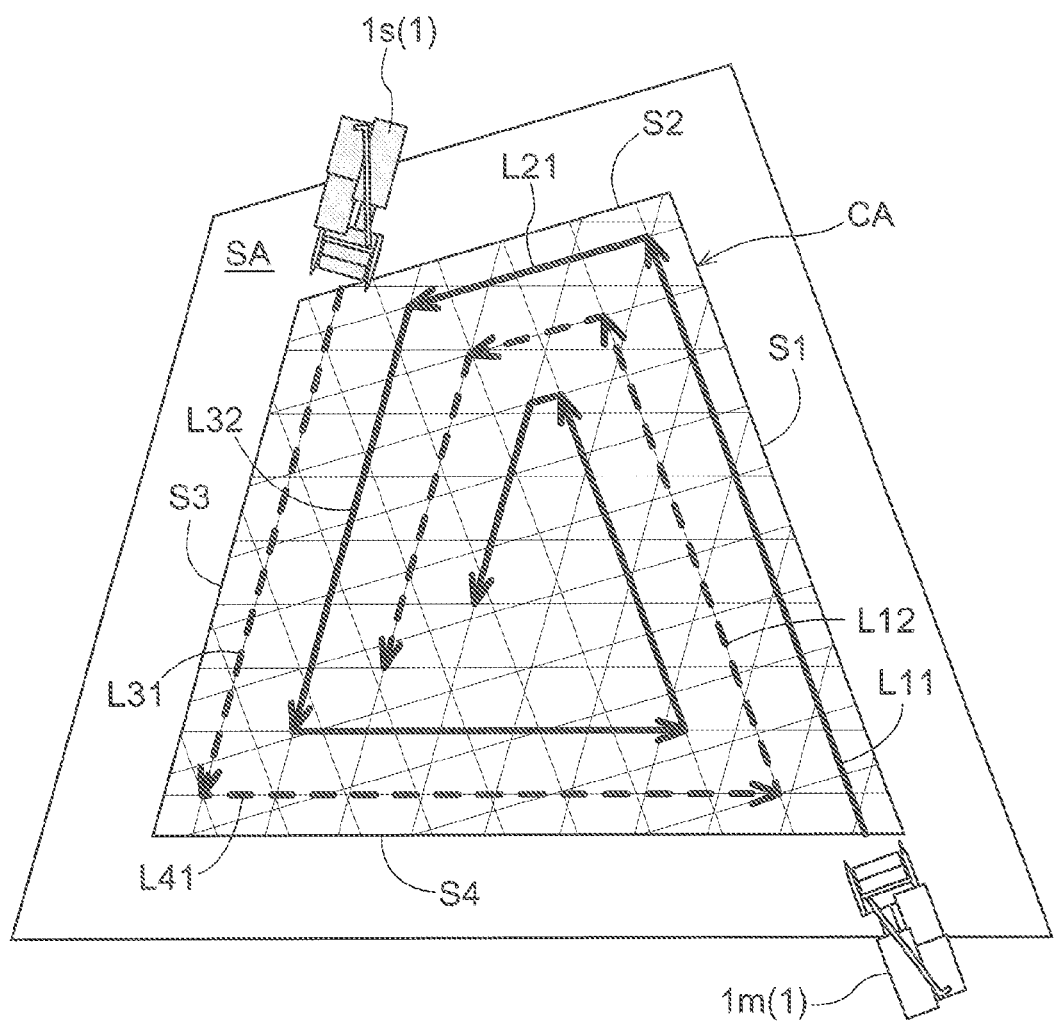
FIG. 20 is a diagram illustrating a basic travel pattern in cooperatively-controlled travel using a travel route element set calculated by the mesh route element calculating unit.

Like FIG. 7, FIG. 20 illustrates an area CA to be worked, which is covered by a mesh line set constituted by mesh lines dividing the area into a mesh by the work width, being worked by two harvesters 1, i.e., by the master harvester 1m and the slave harvester 1s. Here, the master harvester 1m enters the travel route element L11 from the vicinity of a lower-right corner of the deformed quadrangle representing the area CA to be worked, turns left at the point of intersection between the travel route element L11 and the travel route element L21, and enters the travel route element L21. Furthermore, the master harvester 1m turns left at the point of intersection between the travel route element L21 and the travel route element L32, and then enters the travel route element L32. In this manner, the master harvester 1m executes spiral travel using left turns. On the other hand, the slave harvester 1s enters the travel route element L31 from the vicinity of an upper-left corner of the area CA to be worked, turns left at the point of intersection between the travel route element L31 and the travel route element L41, and enters the travel route element L41. Furthermore, the slave harvester 1s turns left at the point of intersection between the travel route element L41 and the travel route element L12, and then enters the travel route element L12. In this manner, the slave harvester 1s executes spiral travel using left turns. As is clear from FIG. 20, cooperative control is carried out so that the travel trajectories of the slave harvester 1s enter between the travel trajectories of the master harvester 1m. Accordingly, the travel of the master harvester 1m is spiral travel that leaves an interval equivalent to the combined width of its own work width and the work width of the slave harvester 1s. Likewise, the travel of the slave harvester 1s is spiral travel that leaves an interval equivalent to the combined width of its own work width and the work width of the master harvester 1m. The travel trajectories of the master harvester 1m and the travel trajectories of the slave harvester 1s form a double spiral.

Because the area CA to be worked is defined by the outer peripheral area SA formed by circling travel on the outside, it is necessary for the first circling travel for forming the outer peripheral area SA to be carried out by either the master harvester 1m or the slave harvester 1s. This circling travel can also be executed through cooperative control of the master harvester 1m and the slave harvester 1s.

In this manner, when the route element selecting unit 63 employs the cooperative route element selection rule, the travel route elements are selected so that the plurality of harvesters 1 carry out work travel cooperatively in the area CA to be worked, as illustrated in FIG. 20, for example. As a result, in the example of FIG. 20, the two travel trajectories of the two harvesters 1 are spiral travel patterns that cover the area CA to be worked while tracing a double spiral line. When the route element selecting unit 63 employs the independent route element selection rule, the travel route elements are selected so that a single harvester 1 carries out work travel in the area CA to be worked, as illustrated in FIG. 11, for example. As a result, in the example of FIG. 11, the one travel trajectory of the one harvester 1 is a spiral travel pattern that covers the area CA to be worked while tracing a spiral line.

Figure 21:
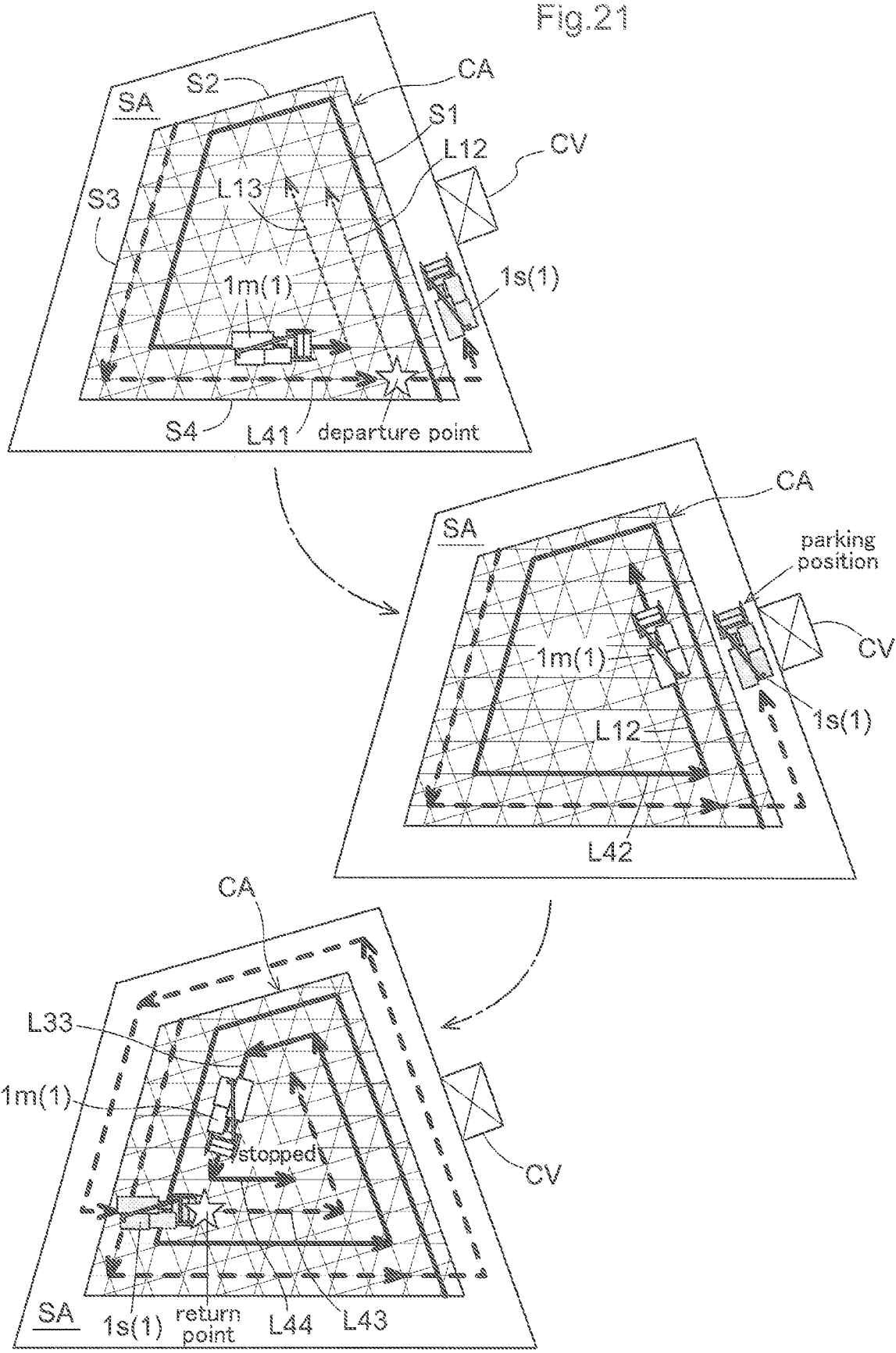
FIG. 21 is a diagram illustrating departure travel and return travel in cooperatively-controlled travel.

Next, switching from cooperative work travel for two harvesters 1 using the cooperative route element selection rule, to independent work travel for a single harvester 1 using the independent route element selection rule, will be described using FIG. 21. The switch from cooperative work travel to independent work travel occurs when one of the harvesters 1 stops or departs the area CA to be worked.

Note that the travel trajectories illustrated in FIG. 20 are theoretical trajectories. In reality, the travel trajectory of the master harvester 1m and the travel route of the slave harvester 1s are corrected in accordance with the state information output from the work state evaluating units 55 (including the other vehicle positional relationship and the estimated contact position), and those travel trajectories do not constitute a perfect double spiral. One example of such corrected travel will be described next using FIG. 21.

The switch from cooperative work travel to independent work travel is executed upon it being confirmed that one of the harvesters 1 has stopped or departed the area CA to be worked, on the basis of the state information output from the work state evaluating units 55 (including the other vehicle positional relationship and the estimated contact position). In FIG. 21, the transport vehicle CV, which transports harvested crops harvested by the harvesters 1, is parked at a position corresponding to the outside center of the first side S1, on the outside (the ridge) of the field. A parking position where the harvesters 1 are to park to unload the harvested crops to the transport vehicle CV is set to a position in the outer peripheral area SA that is adjacent to the transport vehicle CV. FIG. 21 illustrates a state where the slave harvester 1s departs from the travel route element in the area CA to be worked midway through the work travel, executes circling travel around the outer peripheral area SA, unloads the harvested crops into the transport vehicle CV, once again executes circling travel around the outer peripheral area SA, and returns to the travel route element in the area CA to be worked.

First, once a departure request (for unloading harvested crops) has been issued, the route element selecting unit 63 of the slave harvester 1s selects a travel route element having a "departure route" attribute value in the outer peripheral area SA and a travel route element for departing to the travel route element having the "departure route" attribute, on the basis of the margin for the held amount of crops, the travel distance to the parking position, and so on. In this embodiment, a travel route element set in the area of the outer peripheral area SA where the parking position is set, and the travel route element L41 currently being traveled, are selected, and the point of intersection between the travel route element L41 and the travel route element L12 serve as the departure point. Having progressed to the outer peripheral area SA, the slave harvester 1s travels along the travel route element in the outer peripheral area SA (the departure route) to the parking position, and unloads the harvested crops to the transport vehicle CV at the parking position. Such data indicating that the slave harvester is has departed the area CA to be worked is determined from the current position of the slave harvester 1s and the travel route element currently selected by the slave harvester 1s, and the current position of the master harvester 1m and the travel route element currently selected by the master harvester 1m, which are included in the state information output from the work state evaluating units 55.

The master harvester 1m continues work travel in the area CA to be worked even while the slave harvester 1s is unloading the harvested crops after deviating from the work travel in the area CA to be worked. However, it was originally assumed that the master harvester 1m would select the travel route element L13 at the point of intersection between the travel route element L42 and the travel route element L13 while traveling along the travel route element L42. However, the travel of the slave harvester 1s along the travel route element L12 has been canceled due to the departure of the slave harvester 1s, and thus the travel route element L12 is an unharvested area (untraveled). Accordingly, the route element selecting unit 63 of the master harvester 1m cancels the cooperative route element selection rule and instead employs the independent route element selection rule. As a result, the route element selecting unit 63 of the master harvester 1m selects the travel route element L12 instead of the travel route element L13. In other words, the master harvester 1m travels to the point of intersection between the travel route element L42 and the travel route element L12, turns left, and travels along the travel route element L12.

When the slave harvester 1s finishes unloading the harvested crops, the route element selecting unit 63 of the slave harvester 1s selects the travel route elements to return along, on the basis of the current position and autonomous travel speed of the slave harvester 1s, the attributes of the travel route element in the area CA to be worked (untraveled/already traveled), the current position and autonomous travel speed of the master harvester 1*m*, and so on. In this embodiment, the travel route element L43, which is the unworked travel route element located furthest on the outside, is selected. The slave harvester 1*s* travels through the outer peripheral area SA from the parking position, in the counterclockwise direction, along the travel route element having a "return route" attribute, and enters the travel route element L43 from the left end of the travel route element L43. Once the route element selecting unit 63 of the slave harvester 1*s* selects the travel route element L43, that information is sent to the master harvester 1*m* as state information. Accordingly, the route element selecting unit 63 of the master harvester 1*m* cancels the independent route element selection rule and instead employs the cooperative route element selection rule. As a result, assuming a travel route up to the travel route element L33 had been selected, the route element selecting unit 63 of the master harvester 1*m* selects the travel route element L44 adjacent to the travel route element L43 on the inner side as the next travel route element. As this time, the other vehicle positional relationship calculating unit 56 estimates that the master harvester 1*m* and the slave harvester 1*s* will make contact near the point of intersection between the travel route element L33 and the travel route element L44 currently being traveled (selected) by the master harvester 1*m* and the slave harvester 1*s*. As a result, the other vehicle positional relationship calculating unit 56 calculates the vicinity of that point of intersection as the estimated contact position. Accordingly, the other vehicle positional relationship calculating unit 56 calculates a difference in the time when the master harvester 1*m* and the slave harvester 1*s* will pass near that point of intersection, and if the time difference is less than or equal to a predetermined value (if it is estimated that the master harvester 1*m* and the slave harvester 1*s* will come into contact), sends a command to the autonomous travel controlling unit 511 so that the harvester 1 which passes later (the master harvester 1*m*, here) stops temporarily to avoid a collision. After the slave harvester 1*s* has passed that point of intersection, the master harvester 1*m* once again starts the autonomous travel. In this manner, the master harvester 1*m* and the slave harvester 1*s* exchange information such as the host vehicle positions, the selected travel route elements, and so on, and thus collision avoidance behavior, delay avoidance behavior, and so on can be executed.

Figure 22:
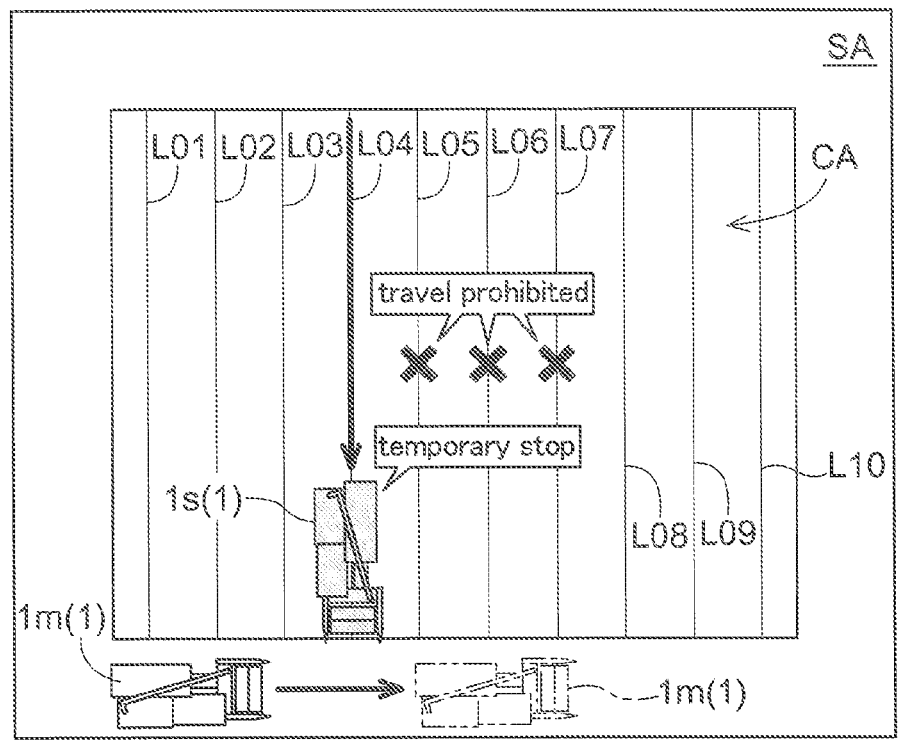
FIG. 22 is a diagram illustrating an example of cooperatively-controlled travel using a travel route element set calculated by the rectangular part element calculating unit.
Figure 23:
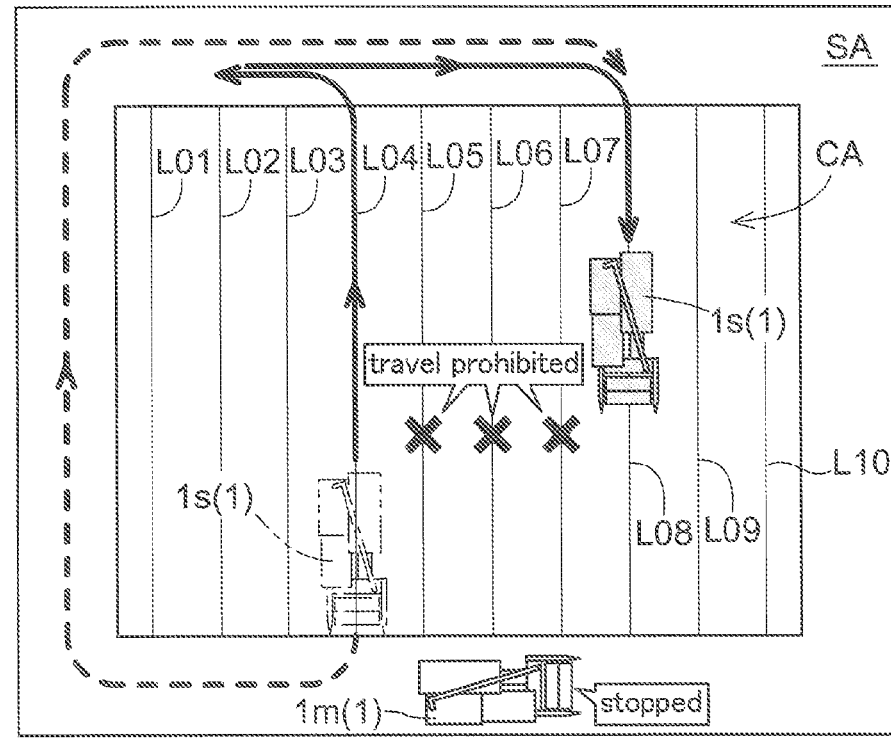
FIG. 23 is a diagram illustrating an example of cooperatively-controlled travel using a travel route element set calculated by the rectangular part element calculating unit.

Such collision avoidance travel, delay avoidance travel, and so on are also executed during linear back-and-forth travel, as indicated in FIGS. 22 and 23. At this time, a switch from the cooperative route element selection rule to the independent route element selection rule and vice versa are also executed. In FIGS. 22 and 23, a parallel straight line set constituted by mutually-parallel straight lines is indicated by L01, L02, ..., L10, where L01 to L04 are already-worked travel route elements, and L05 to L10 are unworked travel route elements. In FIG. 22, the master harvester 1*m* travels along the outer peripheral area SA in order to approach the parking position indicated by the double-dot-dash line. To avoid contact with the master harvester 1*m*, the slave harvester 1*s* stops temporarily at a lower end of the area CA to be worked, specifically, a lower end of the travel route element L04, as collision avoidance behavior. In FIG. 23, the master harvester 1*m* that has passed in front of the slave harvester 1*s* is stopped at the parking position. Additionally, in the work travel state illustrated in FIGS. 22 and 23, the route element selecting unit 63 of the slave harvester 1*s* employs the independent route element selection rule. The route element selecting unit 63 of the master harvester 1*m* employs a departure route element selection rule for selecting a circling route element. In FIG. 23, if the slave harvester 1*s* enters the outer peripheral area SA from the travel route element L04 through U-turn travel in order to move to the travel route element L07, the slave harvester 1*s* will collide with the master harvester 1*m*. If the master harvester 1*m* is parked at the parking position, it is not possible to enter the area CA to be worked or depart from the area CA to be worked using the travel route elements L05, L06, and L07, and thus the travel route elements L05, L06, and L07 are temporarily set to "travel prohibited" (prohibited from selection). Once the master harvester 1*m* finishes unloading and moves from the parking position, the route element selecting unit 63 of the slave harvester 1*s* selects the travel route element to be moved to next from among the travel route elements L05 to L10, in light of the travel route of the master harvester 1*m*, after which the slave harvester 1*s* resumes autonomous travel.

It is also possible for the slave harvester 1*s* to continue working while the master harvester 1*m* is unloading or the like at the parking position. FIG. 23 illustrates an example thereof. In this case, the route element selecting unit 63 of the slave harvester 1*s* would normally select the travel route element L07, which is three lanes ahead and has a travel route element priority level of 1, as the travel route element to be moved to. However, the travel route element L07 is set to "travel prohibited", in the same manner as the example illustrated in FIG. 22. Accordingly, the travel route element L08, which has the next-highest priority level, is selected. Multiple routes are calculated as routes for moving from the travel route element L04 to the travel route element L08, such as a route that reverses along the current travel route element L04 that is now already traveled (indicated by a solid line in FIG. 23), a route that travels clockwise from the lower end of the travel route element L04 and advances into the outer peripheral area SA (indicated by a dotted line in FIG. 23), and so on, and the most efficient route, e.g., the shortest route (the route indicated by the solid line, in this embodiment), is selected.

The following can be understood from the form of the work travel illustrated in FIGS. 22 and 23. That is, under the cooperative route element selection rule, a travel route element where a harvester 1 aside from the host vehicle is located, and a travel route element adjacent to that travel route element, are excluded from the next travel route element to be selected. Under the independent route element selection rule, the travel route element for moving toward a harvester 1 aside from the host vehicle, located in the outer peripheral area, is excluded from the next travel route element to be selected.

As described above, even when multiple harvesters 1 cooperate for work travel in a single field, the respective route element selecting units 63 select the travel route elements in sequence on the basis of travel patterns manually input from a work plan manual received from the management center KS or received from the communication terminal 4 (e.g., a linear back-and-forth travel pattern or a spiral travel pattern), the host vehicle positions, state information output from the respective work state evaluating units 55, and pre-registered selection rules. Selection rules (B1) to (B11), which are different from the above-described rules (A1) to (A12) and that apply specifically when multiple harvesters 1 execute work travel in cooperation with each other, will be described below.

(B1) The multiple harvesters 1 executing work travel in cooperation with each other travel autonomously along the same travel pattern. For example, if a linear back-and-forth travel pattern is set for one of the harvesters 1, a linear back-and-forth travel pattern is also set for the other harvester 1.

(B2) If, when a spiral travel pattern is set, one of the harvesters 1 deviates from the work travel in the area CA to be worked and enters the outer peripheral area SA, the other harvester 1 selects a travel route element further on the outside. As a result, instead of allowing the route that the departed harvester 1 had planned to travel to remain, the departed harvester 1 enters the planned travel route element first.

(B3) If a spiral travel pattern is set, when a harvester 1 that has departed once again returns to the work travel in the area CA to be worked, a travel route element that is far from the harvester 1 engaged in the work travel and that has an "unworked" attribute is selected.

(B4) If, when a spiral travel pattern is set, the travel route element to be selected become shorter, the work travel is executed by only one of the harvesters 1, and the remaining harvester 1 deviates from the work travel.

(B5) When a spiral travel pattern is set, the multiple harvesters 1 are prohibited from simultaneously selecting a travel route element from a travel route element set parallel to a side of the polygon expressing the outer shape of the area CA to be worked, in order to avoid the risk of the collision.

(B6) When a linear back-and-forth travel pattern is set, and one of the harvesters 1 is engaged in U-turn travel, the autonomous travel is controlled so that the other harvester 1 does not enter into the area of the outer peripheral area SA where the U-turn travel is being executed.

(B7) When a linear back-and-forth travel pattern is set, a travel route element located at least two spaces from the travel route element that the other harvester 1 plans to travel next, or the travel route element that the other harvester 1 is currently traveling, is selected as the next travel route element.

(B8) The determination of the timing at which to deviate from the work travel in the area CA to be worked, and the selection of the travel route elements, for the purpose of unloading harvested crops or refueling, is carried out based not only on the margin and the travel time to the parking position, but also under the condition that multiple harvesters 1 do not depart at the same time.

(B9) If the master harvester 1m is set to traditional travel, the slave harvester 1s executes autonomous travel so as to follow the master harvester 1m.

(B10) If the capacity of the harvested crop tank 14 in the master harvester 1m is different from the capacity of the harvested crop tank 14 in the slave harvester 1s, and the harvesters 1 make unload requests at the same time or almost the same time, the harvester 1 having the lower capacity unloads first. This shortens the unload standby time (downtime) of the harvester 1 that cannot unload, and makes it possible to finish the harvesting work in the field even slightly more quickly.

Figure 24:
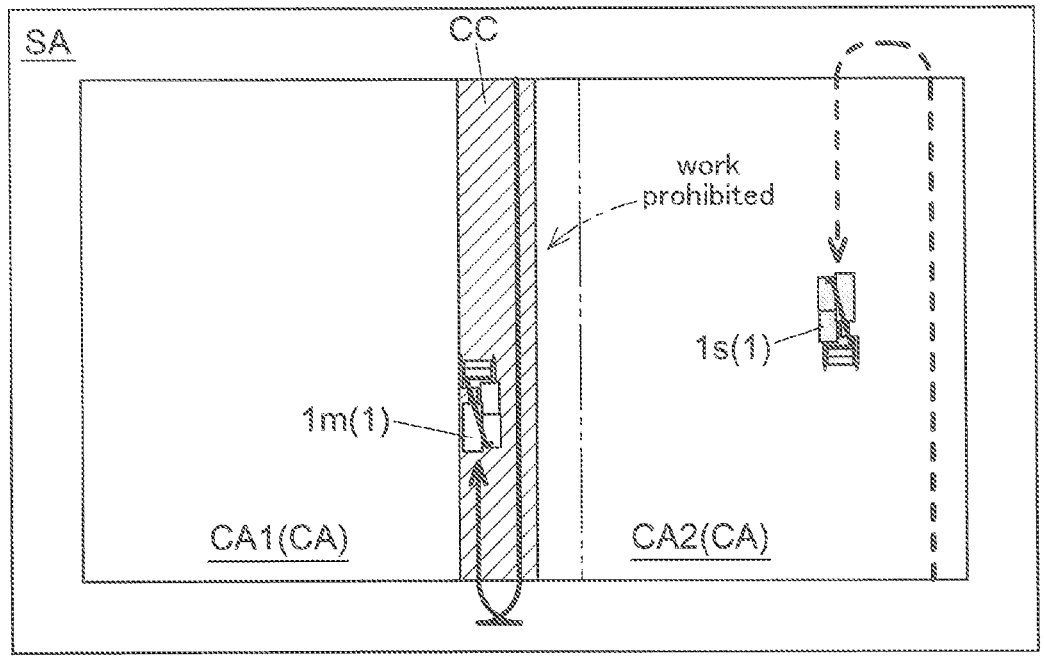
FIG. 24 is a diagram illustrating a middle dividing process.
Figure 25:
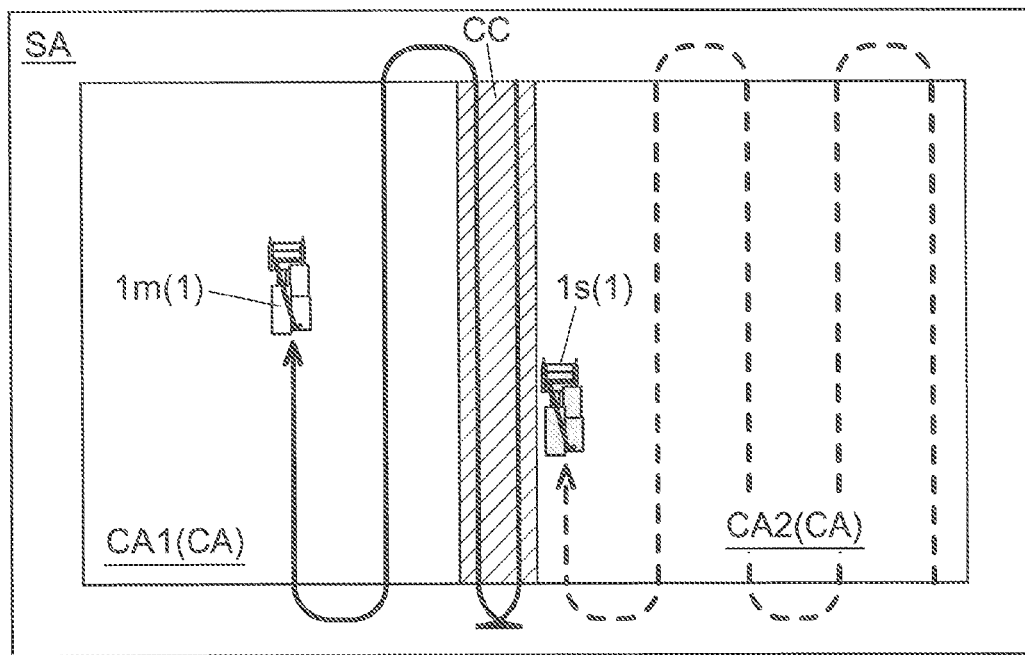
FIG. 25 is a diagram illustrating an example of cooperatively-controlled travel in a field that has been divided in the middle.

(B11) When a single field is very large, that field is segmented into multiple segments through a middle dividing process, and a harvester 1 is deployed in each of the segments. FIG. 24 is a diagram illustrating a state midway through a middle dividing process, in which a band-shaped middle-divided area CC is formed in the center of the area CA to be worked and the area CA to be worked is segmented into two segments CA1 and CA2. FIG. 25 is a diagram illustrating a state after the middle dividing process has ended. In this embodiment, the master harvester 1m forms the middle-divided area CC. While the master harvester 1m is executing the middle dividing, the slave harvester 1s executes work travel in segment CA2 according to a linear back-and-forth travel pattern, for example. Before this work travel is executed, a travel route element set is generated for the segment CA2. At this time, selecting the travel route element corresponding to one work width located closest to the middle-divided area CC in the segment CA2 is prohibited until the middle dividing process ends. This makes it possible to ensure that the master harvester 1m and the slave harvester 1s do not make contact.

Once the middle dividing process ends, the travel of the master harvester 1m is controlled so as to execute independent work travel using a travel route element set calculated for the segment CA1, whereas the travel of the slave harvester 1s is controlled so as to execute independent work travel using a travel route element set calculated for the segment CA2. If one of the harvesters 1 has completed the work first, that harvester 1 enters the segment in which work remains, and cooperative control with the other harvester 1 is started. The harvester 1 that has completed the work in the segment it handles travels autonomously to the segment handled by the other harvester 1 in order to assist in the other harvester 1 in its work.

Figure 26:
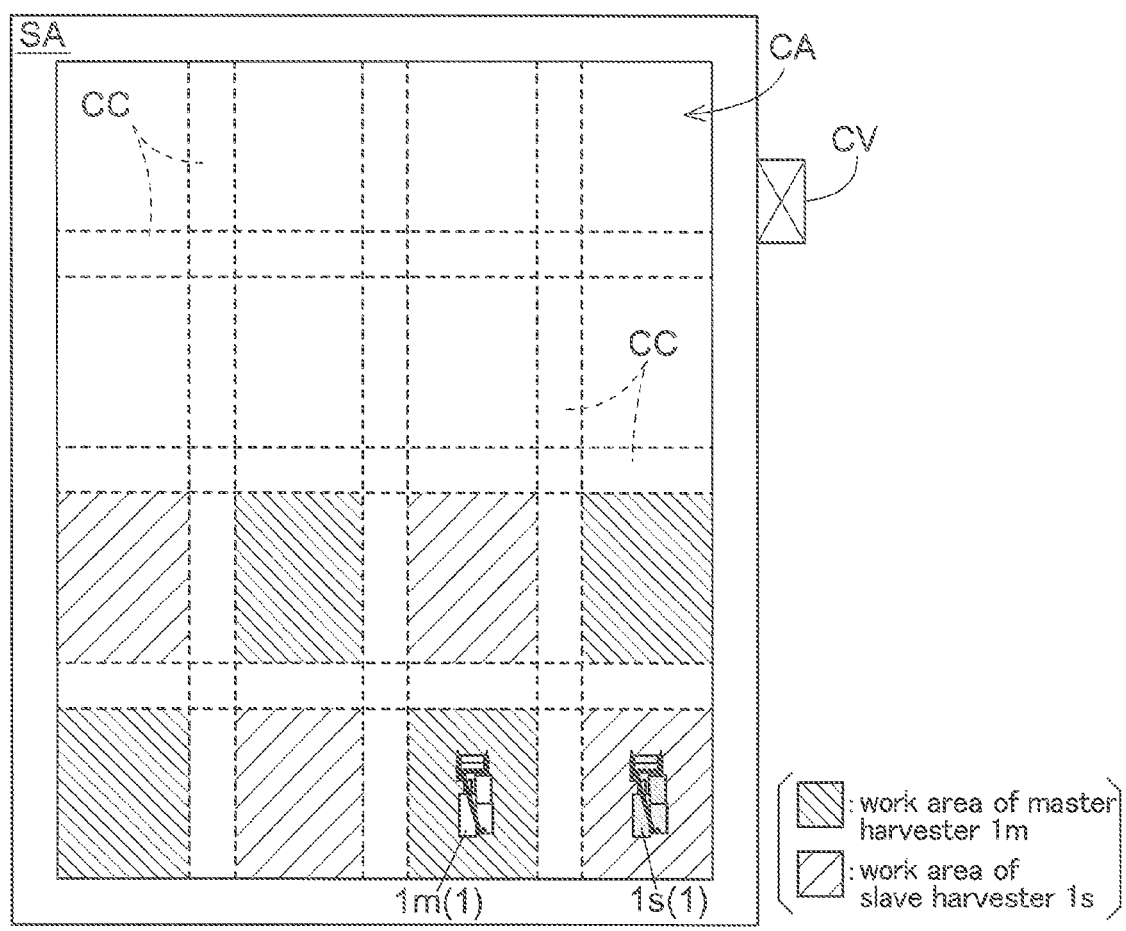
FIG. 26 is a diagram illustrating an example of cooperatively-controlled travel in a field that has been segmented into a grid shape.

If the field has an even larger scale, the field is middle-divided into a grid shape, as illustrated in FIG. 26. This middle dividing can be carried out by the master harvester 1m and the slave harvester 1s. The segments formed by middle-dividing the field into a grid shape are assigned to be worked by the master harvester 1m or the slave harvester 1s, and the work travel is executed by a single harvester 1 in each of those segments. However, the travel route elements are selected under the condition that the master harvester 1m and the slave harvester is are not distanced from each other by greater than or equal to a predetermined value. This is because it is difficult for the monitoring party occupying the master harvester 1m to monitor the work travel of the slave harvester 1s, for the state information to be exchanged between the machines, and so on if the slave harvester 1s and the master harvester 1m are too far apart. With a situation such as that illustrated in FIG. 26, the harvester 1 that has finished work in the segment it handles may autonomously travel to the segment handled by the other harvester 1 to assist the other harvester 1 in its work, or may autonomously travel to the next segment it handles itself.

The parking position of the transport vehicle CV, the parking position of the refueling vehicle, and so on are outside the outer peripheral area SA, and thus depending on the segment in which work travel is underway, the travel route for unloading harvested crops or refueling may become longer and result in wasteful travel time. Thus when traveling to the parking position and returning from the parking position, travel route elements for segments in which work travel is to be executed while passing through, and circling route elements, are selected.

Figure 27:
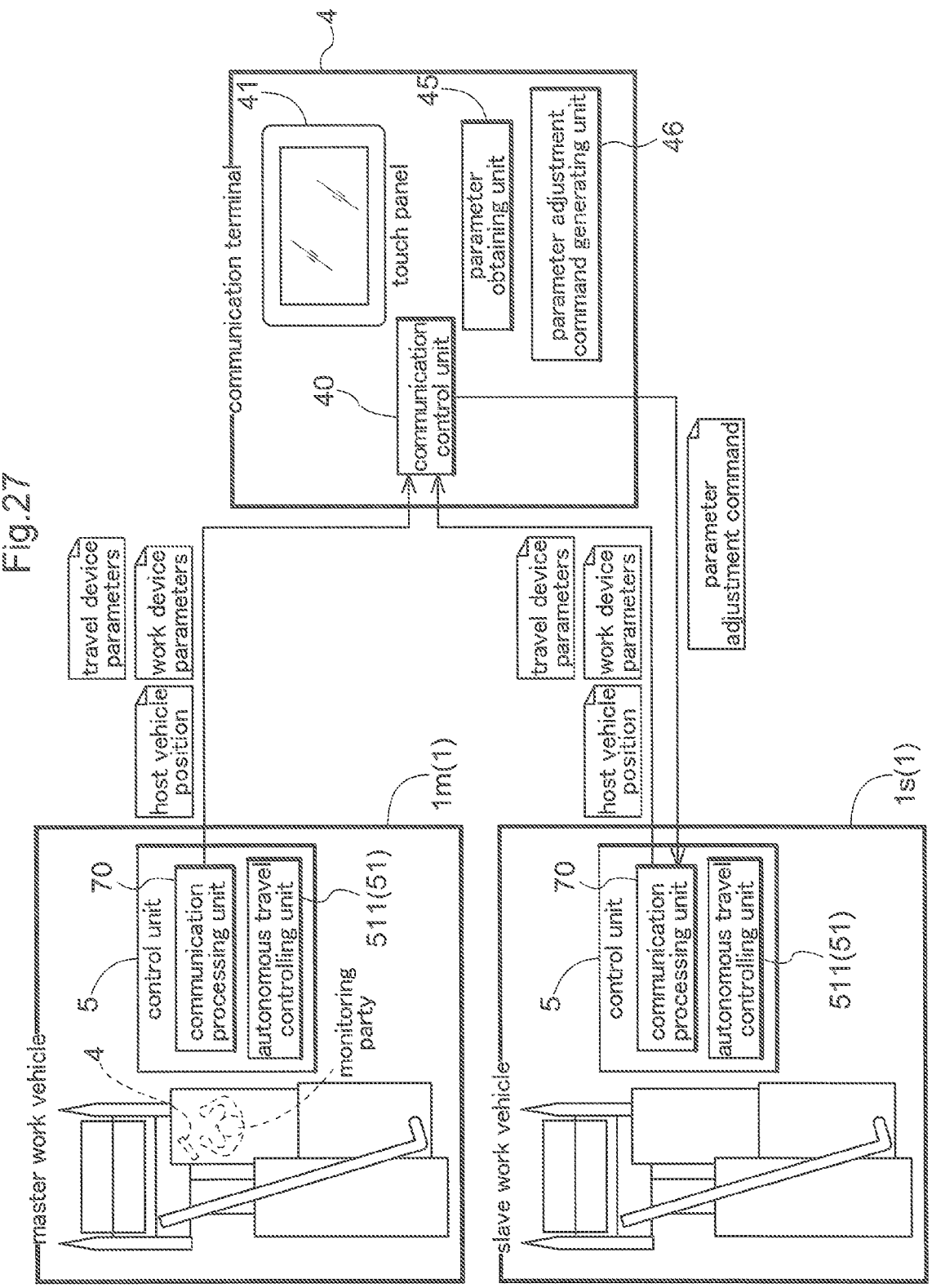
FIG. 27 is a diagram illustrating a configuration in which slave harvester parameters can be adjusted from a master harvester.

Fine Adjustments to Parameters of Work Machine Device Groups, etc. during Cooperative Autonomous Travel When the master harvester 1m and the slave harvester 1s execute work travel cooperatively, the monitoring party normally occupies the master harvester 1m. As such, for the master harvester 1m, the monitoring party can make fine adjustments to the values of autonomous travel control parameters for the vehicle travel device group 71, the work device group 72, and so on as necessary by using the communication terminal 4. The values of the parameters for the vehicle travel device group 71, the work device group 72, and so on of the master harvester 1m can also be applied in the slave harvester 1s, and thus a configuration in which the parameters of the slave harvester 1s can be adjusted from the master harvester 1m can be employed, as illustrated in FIG. 27. However, there is no problem if the slave harvester 1s includes a communication terminal 4 as well. This is because the slave harvester 1s may also execute autonomous travel independently, and may be used as the master harvester 1m as well.

The communication terminal 4 illustrated in FIG. 27 is provided with a parameter obtaining unit 45 and a parameter adjustment command generating unit 46. The parameter obtaining unit 45 obtains device parameters set by the master harvester 1m and the slave harvester 1s. As a result, the values set for the device parameters of the master harvester 1m and the slave harvester 1s can be displayed in the display panel unit of the touch panel 41 in the communication terminal 4. The monitoring party occupying the master harvester 1m inputs a device parameter adjustment amount for adjusting the device parameters of the master harvester 1m and the slave harvester 1s through the touch panel 41. On the basis of the input device parameter adjustment amount, the parameter adjustment command generating unit 46 generates a parameter adjustment command for adjusting the corresponding device parameters, and sends that command to the master harvester 1m and the slave harvester 1s. As a communication interface for such communication, the control units 5 of the master harvester 1m and the slave harvester 1s include the communication processing unit 70, and the communication terminal 4 includes the communication control unit 40. To adjust the device parameters of the master harvester 1m, the monitoring party may use various types of operation implements provided in the master harvester 1m to make the adjustments directly. The device parameters are divided into travel device parameters and work device parameters. The travel device parameters include the vehicle speed and the engine RPM. The work device parameters include the height of the harvesting section 15, the height of the reel 17, and so on.

As described above, the other vehicle positional relationship calculating unit 56 has a function for calculating the current position and actual vehicle speed of the harvester 1 on the basis of the positioning data obtained by the satellite positioning module 80. During cooperative autonomous travel, this function is used to compare the actual vehicle speed based on the positioning data of the harvester 1 that is leading in one direction with the actual vehicle speed based on the positioning data of the harvester 1 that is following, and if there is a difference in vehicle speeds, the vehicle speeds are adjusted so that the vehicle speed of the following harvester 1 matches the vehicle speed of the leading harvester 1. This prevents abnormal proximities, contact, and so on caused by differences in the vehicle speeds of the leading harvester 1 and the following harvester 1.

As described above, even if one harvester 1 has departed while the two harvesters 1 are midway through cooperative work travel, switching from the cooperative route element selection rule to the independent route element selection rule makes it possible for the other harvester 1 to carry out the work travel of the one work vehicle 1. Likewise, even if at least one harvester 1 has departed while three or more harvesters 1 are midway through cooperative work travel, switching to a cooperative route element selection rule with a lower number of harvesters 1 or to the independent route element selection rule makes it possible for the remaining harvesters 1 to carry out the work travel of the departed work vehicle 1.

The communication processing unit 70 of the harvester 1, the communication control unit 40 of the communication terminal 4, and so on can be provided with data and voice communication functions for making calls, sending emails, and so on to registered mobile communication terminals such as mobile phones. When such a data and voice communication function is provided, if the held amount of harvested crops exceeds a predetermined amount, a call (artificial voice) or an email indicating that the harvested crops are to be unloaded is sent to the driver of the transport vehicle CV where the harvested crops are to be unloaded. Likewise, if the remaining fuel has dropped below a predetermined amount, a call (artificial voice) or an email indicating a request to refuel is sent to the driver of the refueling vehicle.

Figure 28:
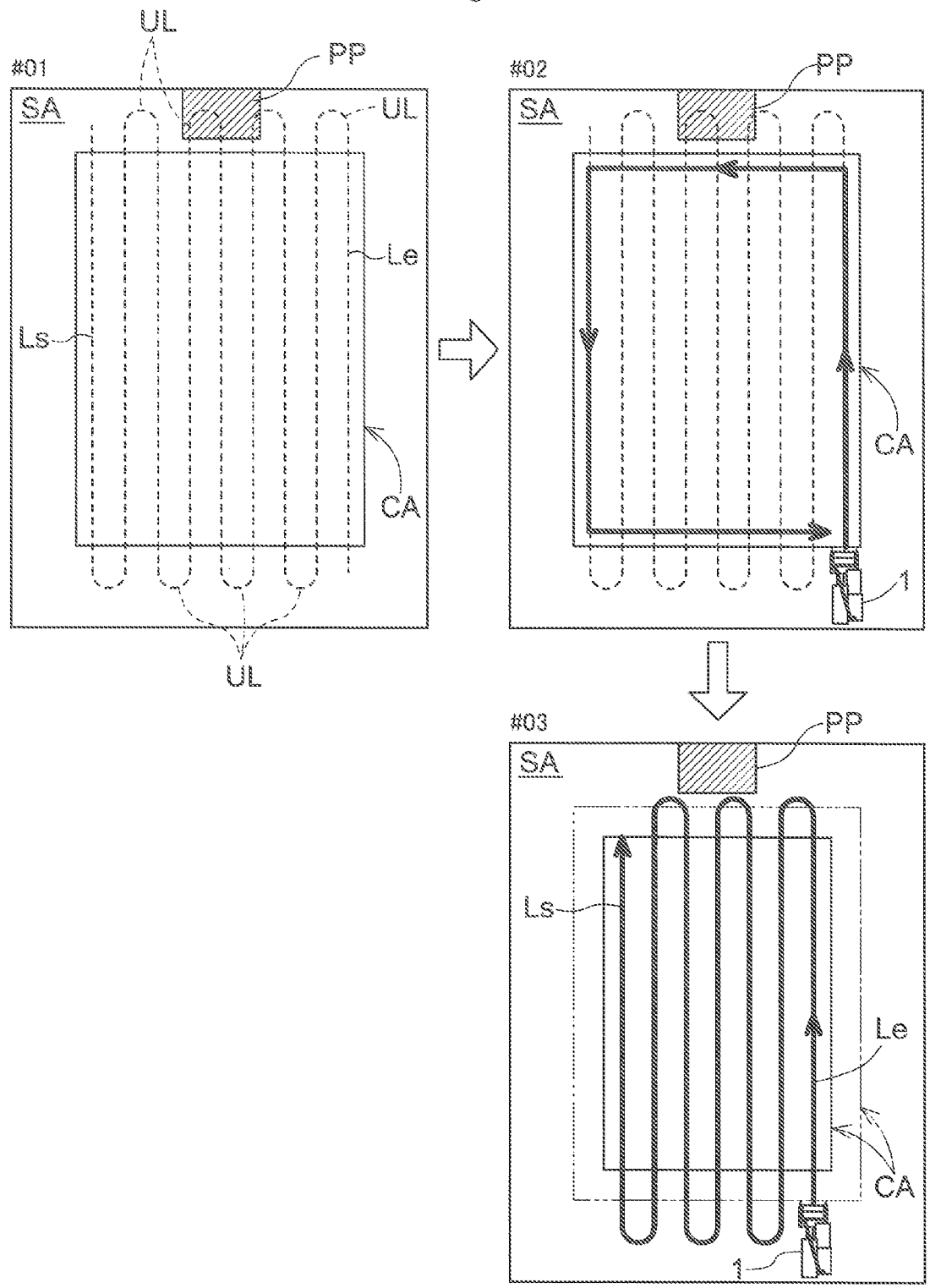
FIG. 28 is a diagram illustrating autonomous travel for creating a U-turn travel space near a parking position.

Other Embodiments (1) The foregoing embodiments describe autonomous travel assuming that a sufficiently broad space for U-turn travel during linear back-and-forth travel and α-turn travel during spiral travel has been secured through the peripheral travel executed in advance. However, U-turn travel typically requires more space than α-turn travel. Accordingly, it may be the case that the space formed through the circling travel executed in advance is insufficient for U-turn travel. For example, when a single harvester 1 is working, there is a risk that a divider or the like will make contact with a ridge and damage the ridge during U-turn travel, as indicated in FIG. 28. Accordingly, to avoid such a situation where the ridge is damaged when a linear back-and-forth travel pattern is set as the travel pattern, when the work travel is started, the outer peripheral area SA is first expanded inward by automatically making at least one pass of work travel in the outermost peripheral part of the area CA to be worked. Even if the width of the outer peripheral area SA formed through the circling travel executed in advance is insufficient for U-turn travel, expanding the outer peripheral area SA inward in this manner makes it possible to execute U-turn travel with no problems. Additionally, when stopping the harvester 1 at a specified parking position to unload harvested crops to a work support vehicle stopped in the periphery of the field or the like, it is necessary, to ensure the efficiency of the work, to stop the harvester 1 at the parking position with a certain degree of accuracy and in an attitude (orientation) suited to the support work. This is true for both autonomous travel and manual travel. Of the outer peripheral lines of the area CA to be worked, the outer peripheral line on the side where the U-turn travel is executed does not vary depending on the linear back-and-forth travel. Thus if the outer peripheral area SA is narrow, there is a chance that the harvester 1 will collide with the area CA to be worked, which is an unworked site, and damage the crops, make contact with the ridge and damage the ridge, and so on. Accordingly, before starting the work travel of the area CA to be worked through linear back-and-forth travel, it is preferable to execute an additional instance of circling travel (additional circling travel). This additional circling travel may be carried out in response to an instruction from the monitoring party, or may be carried out automatically. Note that as described above, the circling travel executed in advance to create the outer peripheral area SA is normally carried out through multiple passes in a spiral shape. The outermost circling travel route has a complex travel route and differs from field to field, and thus manual steering is employed. The subsequent circling travel is carried out through autonomous steering or manual steering. Additionally, if the parking position PP and a U-turn route set UL overlap, a situation is conceivable where a harvester 1 obstructs the U-turn travel of another harvester 1 while the first harvester 1 is parked at the parking position PP, as illustrated in FIG. 28. Accordingly, if the parking position PP and the U-turn route set UL overlap at the point in time when the advance circling travel is complete, it is desirable that the above-described additional circling travel be executed.

The travel route for the additional circling travel can be calculated on the basis of the travel trajectory of the harvester 1 in the advance circling travel, the outer shape data of the area CA to be worked, and so on. As such, the additional circling travel can be carried out through autonomous steering. An example of the flow of additional peripheral travel executed through autonomous travel will be described below using FIG. 28.

Step #01

The field is segmented into the outer peripheral area SA, where the harvesting work is complete, and the area CA to be worked, where the harvesting work is to be carried out next, through the advance circling travel. After the advance peripheral travel, the parking position PP and the U-turn route set UL overlap in the outer peripheral area SA, as indicated by step #01 in FIG. 28. The width of the part of the outer peripheral area SA where the U-turn route set UL is set will not be expanded by linear back-and-forth travel alone. As such, the additional peripheral travel indicated by step #02 in FIG. 28 is executed automatically or in response to an instruction from the monitoring party so as to expand the width of that part.

Step #02

In this additional peripheral travel, multiple peripheral travel route elements (indicated by bold lines in FIG. 28), constituting a rectangular peripheral travel route, are calculated. These circling travel route elements include a left-end travel route element Ls and a right-end travel route element Le of the travel route elements calculated for the linear back-and-forth travel. Note that the travel route element Ls and the travel route element Le are both straight lines. Additionally, in the rectangular circling travel route, the travel route element Ls and the travel route element Le are opposite sides. Here, the circling travel route elements are the travel route element Ls, the travel route element Le, a travel route element connecting the upper ends of the travel route element Ls and the travel route element Le, and a travel route element connecting the lower ends of the travel route element Ls and the travel route element Le. Once the autonomous travel is started, the circling travel route elements conforming to this additional circling travel route are selected by the route element selecting unit 63, and the autonomous travel (work travel executed during the circling travel) is executed.

Step #03

As indicated by step #03 in FIG. 28, the outer peripheral area SA is expanded as a result of this additional peripheral travel. Accordingly, a space having a width corresponding to at least the work width of the harvester 1 is newly formed between the parking position PP and the unworked site.

Next, as a result of the area CA to be worked being reduced by an amount equivalent to the same number of work widths as there were instances of the additional circling travel, the left-end travel route element Ls and the right-end travel route element Le move inward by an amount equivalent to the reduction in the area CA to be worked. A work travel route according to a linear back-and-forth travel pattern is then determined for the new area CA to be worked, which is a rectangle taking the moved travel route element Ls and travel route element Le as opposite sides, and the autonomous work travel is started in the new area CA to be worked.

Note that in step #01 of FIG. 28, there are cases where the parking position PP does not overlap with the U-turn route set UL, and the parking position PP does not face the U-turn route set UL. For example, there are cases where the parking position PP is in a position facing the left-end travel route element Ls. In this case, the area in the periphery of the parking position is expanded by executing the linear back-and-forth travel in which the travel route element Ls is first selected, and thus the above-described additional circling travel is no longer executed. Alternatively, only approximately one pass of the additional circling travel may be executed.

The configuration may also be such that the above-described additional circling travel is carried out automatically even when multiple harvesters 1 execute work travel cooperatively. In cooperative work, when a linear back-and-forth travel pattern is set as the travel pattern and the parking position PP is set to a position facing the U-turn route set UL, multiple passes (approximately three to four passes) of the additional circling travel are executed automatically, immediately after the work travel is started. As a result, the area CA to be worked is reduced, and a broad space is secured on the inner side of the parking position PP. Thus even if one harvester 1 is stopped in the parking position PP, another harvester 1 can make a U-turn on the inner circumferential side of the parking position PP, can pass on the inner circumferential side of the parking position PP, and so on with leeway.

(2) In the above-described embodiment, the configuration is such that if, when a linear back-and-forth travel pattern is set, the parking position PP for work involving a support vehicle such as the transport vehicle CV is set in an area of the outer peripheral area SA where U-turn travel is executed, a harvester 1, which is different from the harvester 1 stopped for unloading work or the like, stops until the end of the unloading work or the like and stands by, selects a travel route element that circumvents the parking position PP, or the like. However, the configuration may be such that in this case, if the autonomous travel (work travel) is started in order to secure a sufficient space for executing U-turn travel further inward from the parking position PP, one or more of the harvesters 1 automatically make several passes of the circling travel in an outer peripheral part of the area CA to be worked.

(3) The foregoing embodiment describes setting and selecting travel route elements while treating the work widths of the master harvester 1m, which is the first work vehicle, and the slave harvester 1s, which is the second work vehicle, as being the same. Two examples of methods for setting and selecting the travel route elements when the work width of the master harvester 1m is different from the work width of the slave harvester 1s will be described here. The work width of the master harvester 1m will be described as a first work width, and the work width of the slave harvester 1s will be described as a second work width. For the sake of simplicity, the first work width will specifically be referred to as "6", and the second work width as "4".

Figure 29:
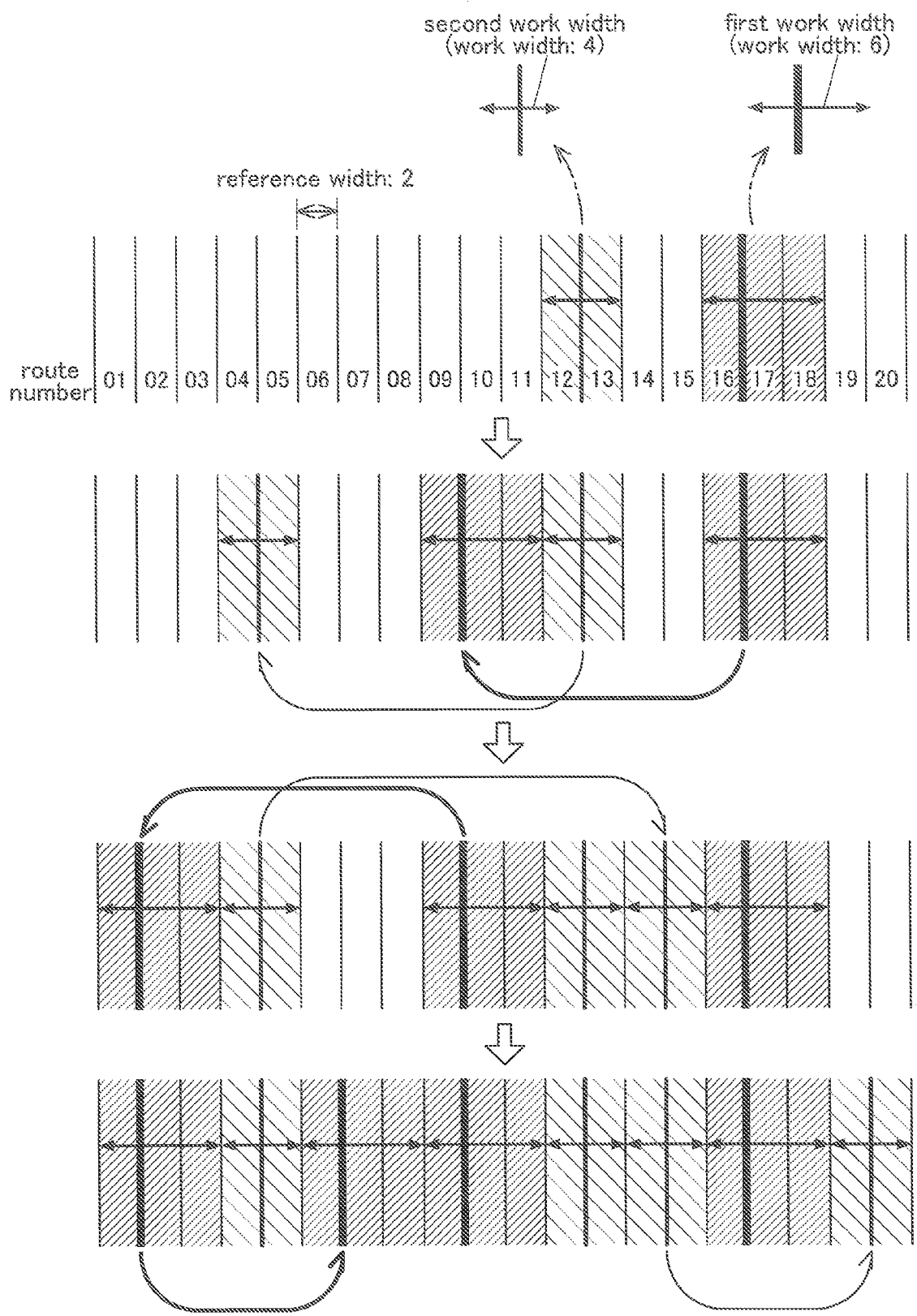
FIG. 29 is a diagram illustrating a specific example of route selection by two harvesters having different work widths.

(3-1) FIG. 29 illustrates an example of a case where a linear back-and-forth travel pattern is set. In this case, the route managing unit 60 calculates the travel route element set, which is an aggregate of multiple travel route elements covering the area CA to be worked, at a reference width, which is the greatest common divisor or an approximate greatest common divisor of the first work width and the second work width. Because the first work width is "6" and the second work width is "4", the reference width is "2". In FIG. 29, numbers from 01 to 20 are added to the travel route elements as route numbers in order to identify the travel route elements.

Assume that the master harvester 1m departs from the travel route element having a route number of 17, and the slave harvester 1s departs from the travel route element having a route number of 12. As illustrated in FIG. 6, the route element selecting unit 63 is divided into a first route element selecting unit 631, which has a function for selecting the travel route elements for the master harvester 1m, and a second route element selecting unit 632, which has a function for selecting the travel route elements for the slave harvester 1s. If the route element selecting unit 63 is provided in the control unit 5 of the master harvester 1m, the next travel route element selected by the second route element selecting unit 632 is supplied to the route setting unit 64 of the slave harvester 1s via the communication processing unit 70 of the master harvester 1m and the communication processing unit 70 of the slave harvester 1s. Note that it is not absolutely necessary for the center of the work width or the center of the harvester 1 to match the travel route element, and if there is deviation, the autonomous travel is controlled in accordance with that deviation.

As illustrated in FIG. 29, the first route element selecting unit 631 selects the next travel route element from an untraveled travel route element set so as to leave an area equivalent to an integral multiple of the first work width or the second work width (this may be untraveled or already traveled) or an area equivalent to the total of an integral multiple of the first work width and an integral multiple of the second work width (this may be untraveled or already traveled). The selected next travel route element is supplied to the route setting unit 64 of the master harvester 1m. Likewise, the second route element selecting unit 632 selects the next travel route element from an untraveled travel route element set so as to leave an area equivalent to an integral multiple of the first work width or the second work width (this may be untraveled or already traveled) or an area equivalent to the total of an integral multiple of the first work width and an integral multiple of the second work width (this may be untraveled or already traveled).

In other words, an untraveled area having a width that is an integral multiple of the first work width or the second work width remains in the area CA to be worked after the master harvester 1m or the slave harvester 1s has executed autonomous travel along the next travel route element supplied by the first route element selecting unit 631 or the second route element selecting unit 632. Although it is possible that an unworked area having a width narrower than the second work width will ultimately remain, the unworked area that ultimately remains is subjected to work travel by the master harvester 1m or the slave harvester 1s.

Figure 30:
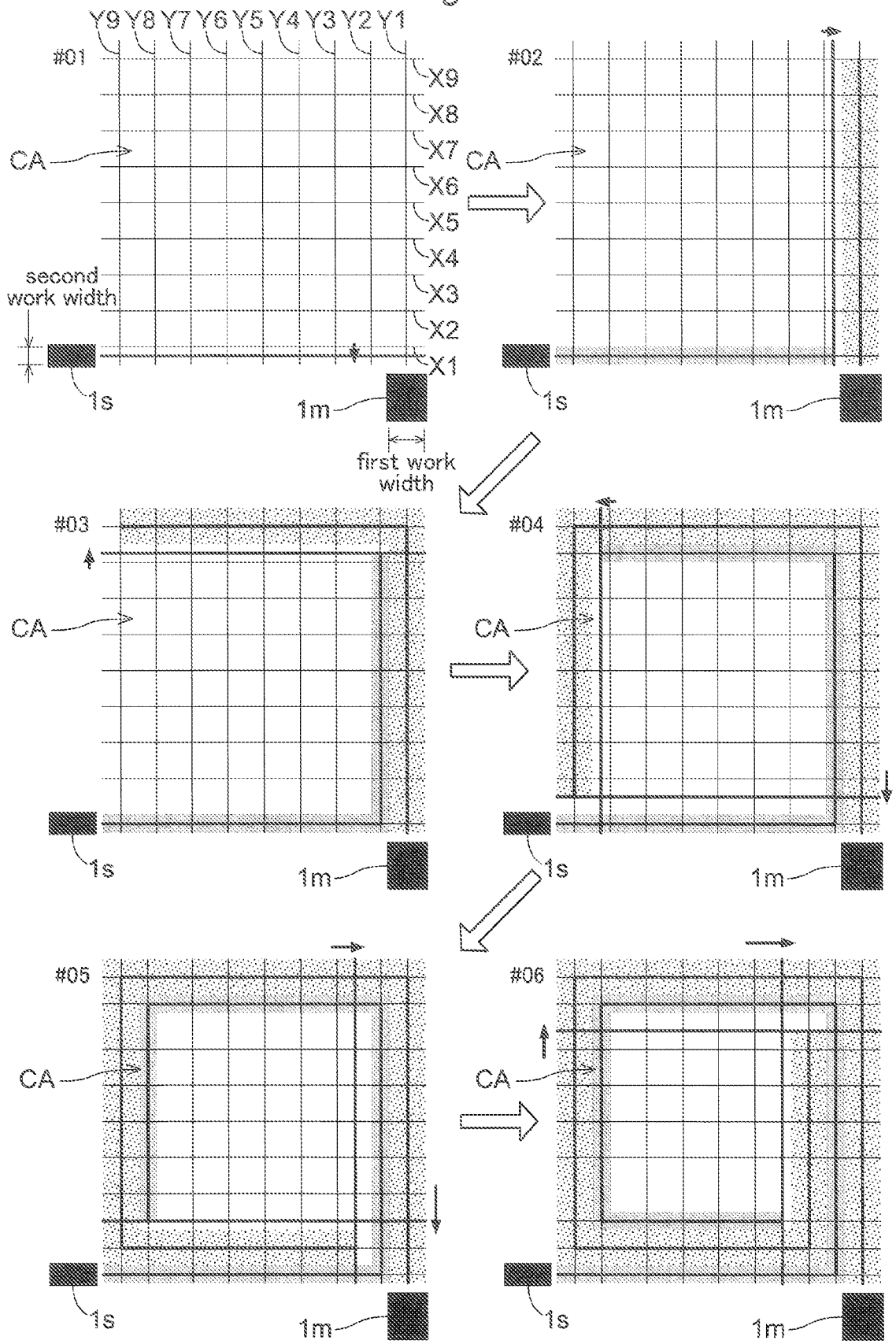
FIG. 30 is a diagram illustrating a specific example of route selection by two harvesters having different work widths.

(3-2) FIG. 30 illustrates an example of a case where a spiral travel pattern is set. In this case, a travel route element set is set using a vertical straight line set and a horizontal straight line set, in which the vertical and horizontal intervals are equivalent to the first work width, for the area CA to be worked. Signs X1 to X9 are assigned as route numbers to the travel route elements belonging to the horizontal straight line set, and signs Y1 to Y9 are assigned as route numbers to the travel route elements belonging to the vertical straight line set.

In FIG. 30, a spiral travel pattern is set so that the master harvester 1m and the slave harvester 1s trace a double spiral line in the counterclockwise direction, from the outside toward the inside. Assume that the master harvester 1m departs from the travel route element having a route number of Y1, and the slave harvester 1s departs from the travel route element having a route number of X1. In this case too, the route element selecting unit 63 is divided into the first route element selecting unit 631 and the second route element selecting unit 632.

As illustrated in FIG. 30, the master harvester 1m first travels along the travel route element having the route number Y1, which is selected first by the first route element selecting unit 631. However, the travel route element set illustrated in FIG. 30 is originally calculated using the first work width as an interval. Accordingly, the travel route element having the route number X1, which is selected first by the second route element selecting unit 632 for the slave harvester 1s having the second work width that is narrower than the first work width, has its positional coordinates corrected to compensate for the difference between the first work width and the second work width. In other words, the travel route element having a route number of X1 is corrected toward the outside by an amount equivalent to 0.5 times the difference between the first work width and the second work width (this difference will be called a "width difference" hereinafter) (FIG. 30, #01). The route numbers Y2, X8, and Y8, which correspond to the next travel route element selected in accordance with the travel of the slave harvester 1s, are corrected in the same manner (FIG. 30, #02, #03, and #04). Although the master harvester 1m travels the travel route elements from route number Y1 to route numbers X9 and Y9 as per the original settings (FIG. 30, #03 and #04), the slave harvester 1s is traveling on the outside of the travel route element having the route number X2, which is selected next, and thus the position of that travel route element is corrected by an amount equivalent to the width difference (FIG. 30, #04). When selecting the travel route element having the route number X3 for the slave harvester 1s, the slave harvester 1s is already traveling on the travel route element having the route number X1, which is located on the outside of the route number X3, and thus the position is corrected by an amount equivalent to 1.5 times the width difference (FIG. 30, #05). In this manner, the positions of the selected travel route elements are sequentially corrected so as to cancel out the difference between the first work width and the second work width in accordance with the number of travel route elements traveled by the slave harvester 1s that are present on the outside of the selected travel route element (FIG. 30, #06). Although the route managing unit 60 corrects the positions of the travel route elements here, the correction may be carried out by the first route element selecting unit 631 and the second route element selecting unit 632.

The examples of travel indicated in FIGS. 29 and 30 assume that the first route element selecting unit 631 and the second route element selecting unit 632 are provided in the control unit 5 of the master harvester 1m. However, the second route element selecting unit 632 may be provided in the slave harvester 1s. In this case, it is preferable that the slave harvester 1s receive data indicating the travel route element set, and that the first route element selecting unit 631 and the second route element selecting unit 632 select their own next travel route elements and make the necessary corrections to the positional coordinates while exchanging their respective selected next travel route elements. A configuration is also possible in which the route managing unit 60, the first route element selecting unit 631, and the second route element selecting unit 632 are all provided in the communication terminal 4, and the selected travel route elements are sent from the communication terminal 4 to the route setting unit 64.

(4) The control function blocks described in the foregoing embodiment on the basis of FIG. 6 are merely examples, and the function units can be divided further, or multiple function units can be combined, as well. Additionally, although the function units are allocated among the control unit 5, the communication terminal 4, and the management computer 100, which serve as higher-order control devices, this allocation of the function units is also merely an example, and the function units can be allocated among the higher order control devices as desired. The function units can also be allocated to other higher-order control devices as long as the higher-order control devices can exchange data with each other. For example, all of the functions of the communication terminal 4 can be provided in the master harvester 1m. Additionally, although the other vehicle positional relationship calculating unit 56 is provided in the control unit of the harvester 1 in the control function block diagram in FIG. 6, the other vehicle positional relationship calculating unit 56 may be provided in the communication terminal 4. In this case, information such as the current position of the harvester 1, the travel route element currently being traveled on (selected), and the like is sent to the communication terminal 4 from each harvester 1. Conversely, the other vehicle positional relationship calculated by the other vehicle positional relationship calculating unit 56 is sent to the work state evaluating unit 55 of each work vehicle 1. Furthermore, in the control function block diagram illustrated in FIG. 6, the work site data input unit 42, the outer shape data generating unit 43, and the area setting unit 44 are provided in the communication terminal 4 as the first travel route managing module CM1. Furthermore, the route managing unit 60, the route element selecting unit 63, and the route setting unit 64 are provided in the control unit 5 of the harvester 1 as the second travel route managing module CM2. However, the route managing unit 60 may instead be included in the first travel route managing module CM1. Likewise, the outer shape data generating unit 43, the area setting unit 44, and so on may be included in the second travel route managing module CM2. The entirety of the first travel route managing module CM1 may be provided in the control unit 5, and the entirety of the second travel route managing module CM2 may be provided in the communication terminal 4. Providing the greatest possible number of control function units pertaining to travel route management in the portable communication terminal 4 increases the freedom of maintenance and the like, which is convenient. This allocation of function units is limited by the data processing capabilities of the communication terminal 4 and the control unit 5, the speed of communication between the communication terminal 4 and the control unit 5, and so on.

(5) Although the travel routes calculated and set according to the present invention are used as target travel routes for autonomous travel, the travel routes can also be used as target travel routes for manual travel. In other words, the present invention can be applied to both autonomous travel and manual travel, and can of course also be applied in a situation where autonomous travel and manual travel are mixed.

(6) The foregoing embodiment describes an example in which the field information sent from the management center KS includes a topographical map of the periphery of the field from the outset, and the accuracy of the outer shape and outer dimensions of the field is improved through circling travel executed along the borders of the field. However, the configuration may be such that the field information does not include a topographical map of the periphery of the field, or at least does not include a topographical map of the field, and the outer shape and outer dimensions of the field are calculated for the first time through the circling travel. Additionally, the content of the field information, work plan manual, and so on sent from the management center KS, the items input through the communication terminal 4, and so on are not limited to those described above, and can be changed within a scope that does not depart from the essential spirit of the present invention.

(7) The foregoing embodiment describes an example in which, as illustrated in FIG. 6, the rectangular route element calculating unit 602 is provided in addition to the mesh route element calculating unit 601, and the travel route element set, which is a parallel straight line set covering the area CA to be worked, is calculated by the rectangular route element calculating unit 602. However, the rectangular route element calculating unit 602 may be omitted, and linear back-and-forth travel may be realized using the travel route elements corresponding to a mesh-shaped straight line set calculated by the mesh route element calculating unit 601.

(8) The foregoing embodiment describes an example in which, when executing cooperative travel control, the parameters of the vehicle travel device group 71, the work device group 72, and so on of the slave harvester 1s are changed on the basis of a result of the monitoring carried out by the monitoring party. However, the configuration may be such that an image (a moving image, still images captured at set intervals, or the like) captured by a camera installed in the master harvester 1m or the slave harvester 1s is displayed in a monitor or the like installed in the master harvester 1m, with the monitoring party viewing the image, determining the work conditions of the slave harvester 1s, and changing the parameters of the vehicle travel device group 71, the work device group 72, and so on. Alternatively, the configuration may be such that when the parameters of the master harvester 1m are changed, the parameters of the slave harvester 1s are changed in accordance therewith.

(9) Although the foregoing embodiment describes an example in which multiple harvesters 1 that execute work travel in cooperation with each other travel autonomously according to the same travel pattern, the configuration can also be such that the autonomous travel is executed according to different travel patterns.

(10) Although the foregoing embodiment describes an example in which two harvesters 1 execute cooperative autonomous travel, cooperative autonomous travel by three or more harvesters 1 can also be realized by the same work vehicle automatic traveling system and travel route managing device.

(11) As an example of the travel route element set, FIG. 3 illustrates a travel route element set in which multiple parallel dividing lines that divide the area CA to be worked into rectangular shapes serve as travel route elements. However, the present invention is not limited thereto. For example, the travel route element set illustrated in FIG. 31 takes curved parallel lines as the travel route elements. In this manner, the "parallel lines" according to the present invention may be curved. Additionally, the "parallel line set" according to the present invention may include curved parallel lines.

(12) As an example of the travel route element set, FIG. 4 illustrates a travel route element set constituted by multiple mesh lines extending in the vertical and horizontal directions that divide the area CA to be worked into a mesh. However, the present invention is not limited thereto. In other words, the "mesh lines" according to the present invention need not be straight lines. For example, in the travel route element set illustrated in FIG. 32, the mesh lines in the horizontal direction with respect to the diagram are straight lines, whereas the mesh lines in the vertical direction with respect to the diagram are curved. Additionally, in the travel route element set illustrated in FIG. 33, the mesh lines in the horizontal direction and the mesh lines in the vertical direction with respect to the diagram are both curved. In this manner, the mesh lines may be curved. Additionally, the mesh line set may include curved mesh lines.

Figure 31:
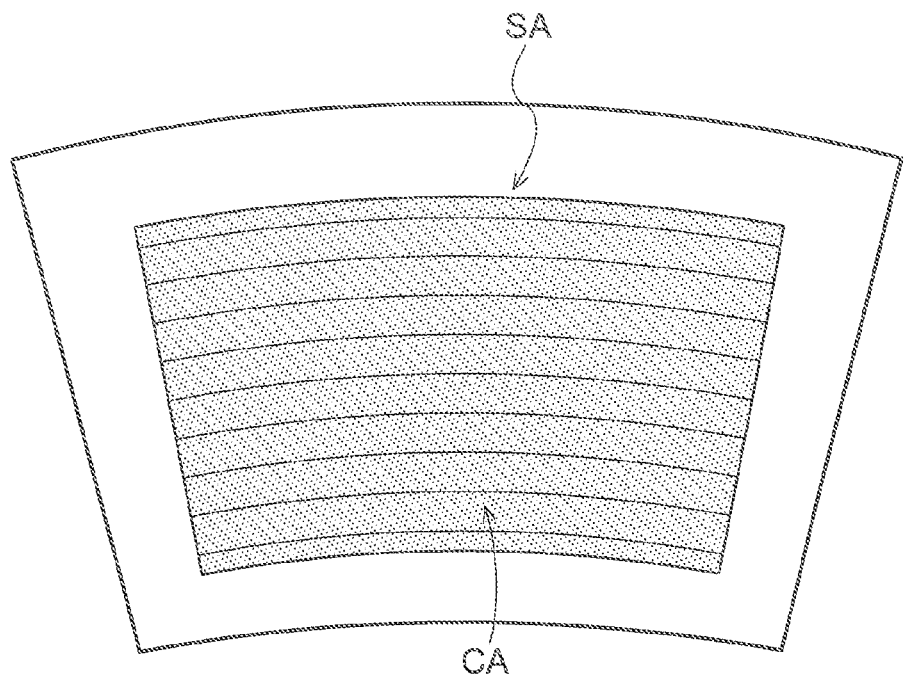
FIG. 31 is a diagram illustrating an example of a travel route element set constituted by curved parallel lines.
Figure 32:
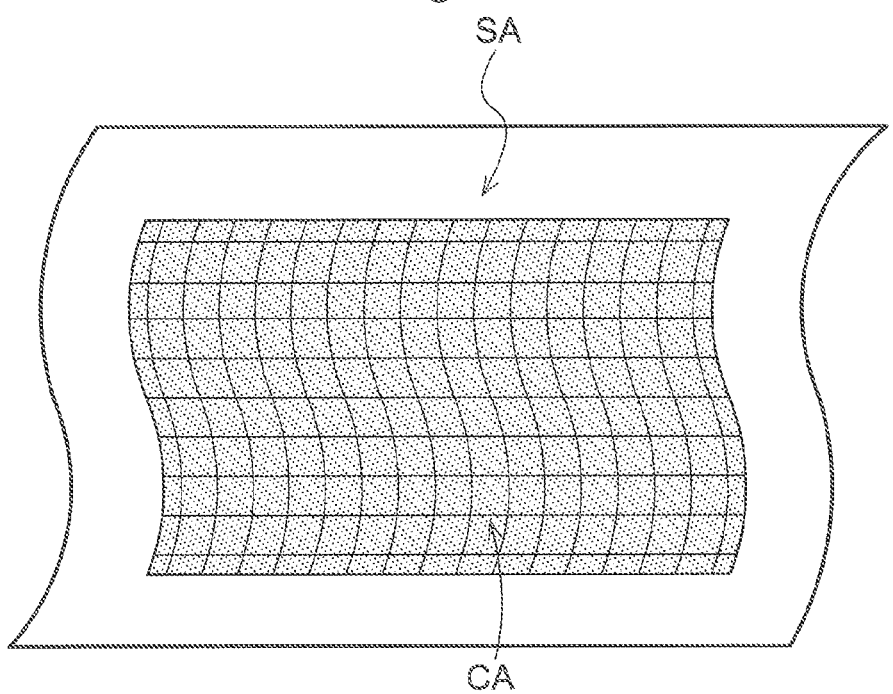
FIG. 32 is a diagram illustrating an example of a travel route element set including curved mesh lines.
Figure 33:
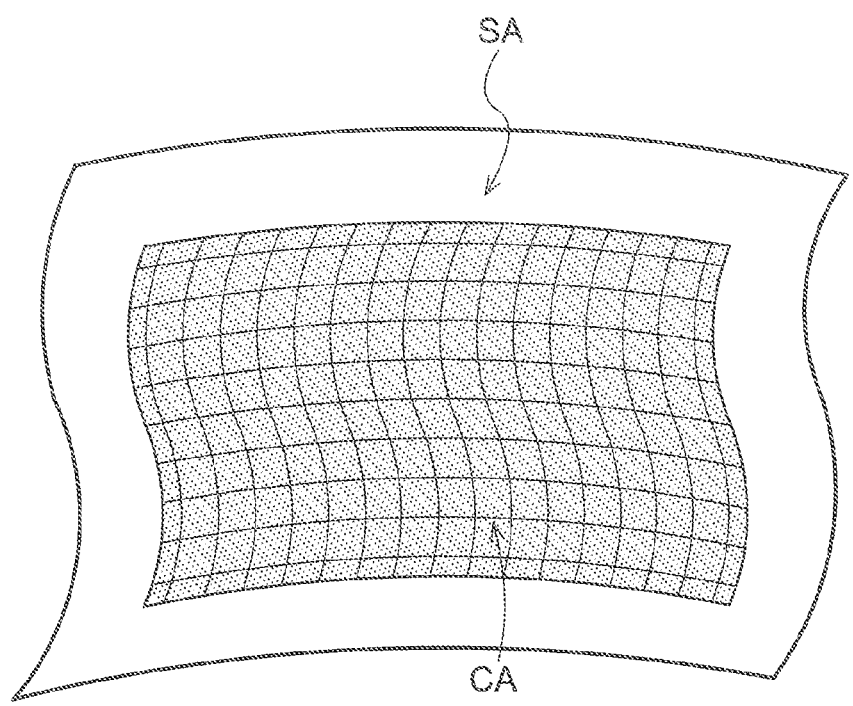
FIG. 33 is a diagram illustrating an example of a travel route element set constituted by curved mesh lines.

(13) In the foregoing embodiment, linear back-and-forth travel is carried out by repeating travel along straight line-shaped travel route elements and U-turn travel. However, the present invention is not limited thereto, and the configuration may be such that back-and-forth travel is carried out by repeating travel along curved travel route elements, as indicated in FIGS. 31 to 33, and U-turn travel.

(14) In the foregoing embodiment, the harvester 1 executes circular harvesting first when executing harvesting work in the field. Note that "circular harvesting" refers to work for harvesting while traveling around the inner side of the border line of the field. After the circular harvesting, the area setting unit 44 sets the area on the outside of the field traveled around by the harvester 1 as the outer peripheral area SA, and sets the area CA to be worked on the inside of the outer peripheral area SA. However, the present invention is not limited thereto. In other words, the circular harvesting by the harvester 1 is not work that is necessary for the present invention. Additionally, the area setting unit 44 may be configured to set the area CA to be worked without setting the outer peripheral area SA. For example, the area setting unit 44 may be configured to set the area CA to be worked in accordance with an input operation made by the monitoring party through the communication terminal 4.

INDUSTRIAL APPLICABILITY

The work vehicle automatic traveling system according to the present invention can be applied not only in the harvester 1, which is a normal-type combine serving as a work vehicle, but also in any work vehicle capable of automatically traveling while working in a work site. This includes other types of harvesters 1 such as autodetachable-type combines and corn harvesters, tractors fitted with work devices such as tilling devices, paddy work machines, and so on.

DESCRIPTION OF REFERENCE SIGNS

1: harvester (work vehicle)
1m: master harvester
1s: slave harvester
4: communication terminal
5: control unit
41: touch panel
42: work site data input unit
43: outer shape data generating unit
44: area setting unit
50: communication processing unit
51: travel control unit
511: autonomous travel controlling unit
512: manual travel controlling unit
52: work control unit
53: host vehicle position calculating unit
55: work state evaluating unit
56: other vehicle positional relationship calculating unit
60: route managing unit
63: route element selecting unit
64: route setting unit
70: communication processing unit
80: satellite positioning module
SA: outer peripheral area
CA: area to be worked

The invention claimed is:
1. A work vehicle automatic traveling system for a plurality of work vehicles that carry out work travel cooperatively in a work site while exchanging data, the system comprising:
an area setting unit that sets the work site to an outer peripheral area, and an area to be worked on an inner side of the outer peripheral area;
a host vehicle position calculating unit that calculates a host vehicle position;
a route managing unit that manages a travel route element set and a circling route element set so as to be capable of readout, the travel route element set being an aggregate of multiple travel route elements constituting a travel route that covers the area to be worked, and the circling route element set being an aggregate of circling route elements constituting a circling route that goes around the outer peripheral area;
a route element selecting unit that, based on state information, sequentially selects a next travel route element, on which the work vehicle is to travel next, from the travel route element set, or a next circling route element, on which the work vehicle is to travel next, from the circling route element set; and
an autonomous travel controlling unit that executes autonomous travel based on the next travel route element and the host vehicle position,
wherein the route element selecting unit includes a cooperative route element selection rule employed when the plurality of work vehicles carry out work travel cooperatively in the area to be worked, and an independent route element selection rule employed when one of the work vehicles acts as an independent work vehicle and carries out independent work travel in the area to be worked; and
when the independent work vehicle is carrying out independent work travel in the area to be worked, and a work vehicle aside from the host vehicle is carrying out circling travel based on the circling route element or is stopped, the route element selecting unit of the independent work vehicle selects the next travel route element based on the independent route element selection rule.

2. The work vehicle automatic traveling system according to claim 1, wherein:
the travel route element set is a mesh line set constituted by mesh lines that divide the area to be worked into a mesh;

points where the mesh lines intersect are set as route changeable points where a route of the work vehicle is permitted to be changed;

the cooperative route element selection rule comprises selecting the next travel route element so that a compound spiral-shaped travel trajectory created by a plurality of spiral-shaped travel trajectories made by the work vehicle covers the area to be worked; and the independent route element selection rule comprises selecting the next travel route element so that the spiral-shaped travel trajectory made by the independent work vehicle covers the area to be worked.

3. The work vehicle automatic traveling system according to claim 1, wherein:

the travel route element set is a parallel line set constituted by mutually-parallel lines that divide the area to be worked into rectangular shapes;

movement from one end of one travel route element to one end of another travel route element is executed through U-turn travel by the work vehicle;

the cooperative route element selection rule comprises excluding a present travel route element where a work vehicle aside from the host vehicle is located, and a travel route element adjacent to the present travel route element, from being selected as the next travel route element; and the independent route element selection rule comprises excluding a travel route element moving toward the work vehicle aside from the host vehicle, located in the outer peripheral area, from being selected as the next travel route element.

4. A work vehicle automatic traveling system for a plurality of work vehicles that carry out work travel cooperatively in a work site while exchanging data, the system comprising:

a host vehicle position calculating unit that calculates a host vehicle position;

a route managing unit that calculates a travel route element set, the travel route element set being an aggregate of multiple travel route elements constituting a travel route covering the area to be worked, and stores the travel route element set so as to be capable of readout; and a route element selecting unit that selects a next travel route element, which is to be traveled next, sequentially from the travel route element set, based on the host vehicle position and a work travel state of another work vehicle of the plurality of work vehicles, wherein:

an other work vehicle positional relationship indicating a positional relationship between the host vehicle and another work vehicle of the plurality of work vehicles is included in the work travel state of the another work vehicle;

the system further comprises an other work vehicle positional relationship calculating unit that calculates the other work vehicle positional relationship;

the other work vehicle positional relationship calculating unit calculates an estimated contact position between the plurality of work vehicles based on the other work vehicle positional relationship; and when the estimated contact position has been calculated, a work vehicle of the plurality of work vehicles that will pass the estimated contact position at a later time is temporarily stopped.

5. The work vehicle automatic traveling system according to claim 4, wherein:

the other work vehicle positional relationship calculating unit calculates the estimated contact position based on the other work vehicle positional relationship and on the travel route elements where the plurality of work vehicles are traveling.

6. A work vehicle automatic traveling system for a plurality of work vehicles that carry out work travel cooperatively in a work site while exchanging data, the system comprising:

one or more processors programmed and/or configured to:

set the work site to an outer peripheral area, and an area to be worked on an inner side of the outer peripheral area;

calculate a host vehicle position;

manage a travel route element set and a circling route element set so as to be capable of readout, the travel route element set being an aggregate of multiple travel route elements constituting a travel route that covers the area to be worked, and the circling route element set being an aggregate of circling route elements constituting a circling route that goes around the outer peripheral area;

based on state information, sequentially select a next travel route element, on which the work vehicle is to travel next, from the travel route element set, or a next circling route element, on which the work vehicle is to travel next, from the circling route element set;

execute autonomous travel based on the next travel route element and the host vehicle position;

include a cooperative route element selection rule employed when the plurality of work vehicles carry out work travel cooperatively in the area to be worked, and an independent route element selection rule employed when one of the work vehicles acts as an independent work vehicle and carries out independent work travel in the area to be worked; and select the next travel route element for the independent work vehicle based on the independent route element selection rule when the independent work vehicle is carrying out independent work travel in the area to be worked, and a work vehicle aside from the host vehicle is carrying out circling travel based on the circling route element or is stopped.

7. The work vehicle automatic traveling system according to claim 6, wherein:

the travel route element set is a mesh line set constituted by mesh lines that divide the area to be worked into a mesh;

points where the mesh lines intersect are set as route changeable points where a route of the work vehicle is permitted to be changed;

the cooperative route element selection rule comprises selecting the next travel route element so that a compound spiral-shaped travel trajectory created by a plurality of spiral-shaped travel trajectories made by the work vehicle covers the area to be worked; and the independent route element selection rule comprises selecting the next travel route element so that the spiral-shaped travel trajectory made by the independent work vehicle covers the area to be worked.

8. The work vehicle automatic traveling system according to claim 6, wherein:

the travel route element set is a parallel line set constituted by mutually-parallel lines that divide the area to be worked into rectangular shapes;

movement from one end of one travel route element to one end of another travel route element is executed through U-turn travel by the work vehicle;

the cooperative route element selection rule comprises excluding a present travel route element where a work vehicle aside from the host vehicle is located, and a travel route element adjacent to the present travel route element, from being selected as the next travel route element; and the independent route element selection rule comprises excluding a travel route element moving toward the work vehicle aside from the host vehicle, located in the outer peripheral area, from being selected as the next travel route element.

9. A work vehicle automatic traveling system for a plurality of work vehicles that carry out work travel cooperatively in a work site while exchanging data, the system comprising:

one or more processors programmed and/or configured to:
  calculate a host vehicle position;
  calculate a travel route element set, the travel route element set being an aggregate of multiple travel route elements constituting a travel route covering an area to be worked, and stores the travel route element set so as to be capable of readout; and
  select a next travel route element, which is to be traveled next, sequentially from the travel route element set, based on the host vehicle position and a work travel state of another work vehicle of the plurality of work vehicles, wherein:

an other work vehicle positional relationship indicating a positional relationship between the host vehicle and another work vehicle of the plurality of work vehicles is included in the work travel state of the another work vehicle;

the one or more processors are programmed and/or configured to calculate the other work vehicle positional relationship;

the one or more processors are programmed and/or configured to calculate an estimated contact position between the plurality of work vehicles based on the other work vehicle positional relationship; and when the estimated contact position has been calculated, a work vehicle of the plurality of work vehicles that will pass the estimated contact position at a later time is temporarily stopped.

10. The work vehicle automatic traveling system according to claim 9, wherein:

the one or more processors are programmed and/or configured to calculate the estimated contact position based on the other work vehicle positional relationship and on the travel route elements where the plurality of work vehicles are traveling.

* * * * *